US012565166B2

(12) United States Patent
    Kim et al.

(10) Patent No.:    US 12,565,166 B2
(45) Date of Patent:        Mar. 3, 2026

(54) LAYOUT CONTROL SYSTEM FOR VEHICLE MODE

(71) Applicant: HYUNDAI MOBIS CO., LTD., Seoul (KR)

(72) Inventors: Kyung Hoon Kim, Seongnam-si (KR); Tae Hun Kim, Seongnam-si (KR); Sung Joon Ahn, Seoul (KR); Hyun Jun An, Gunpo-si (KR); Shin Jik Lee, Hwasung-si (KR); Ji Soo Shin, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 34 days.

(21) Appl. No.: 18/782,759

(22) Filed: Jul. 24, 2024

(65) Prior Publication Data

US 2025/0033586 A1      Jan. 30, 2025

(30) Foreign Application Priority Data

| Jul. 25, 2023 | (KR) | ........................ 10-2023-0097020 |
|---|---|---|
| Jul. 25, 2023 | (KR) | ........................ 10-2023-0097021 |
| Jul. 25, 2023 | (KR) | ........................ 10-2023-0097026 |
| Jul. 25, 2023 | (KR) | ........................ 10-2023-0097027 |

(51) Int. Cl.
    B60R 16/037 (2006.01)
    B60K 35/10 (2024.01)
    B60K 35/81 (2024.01)
    H04W 4/48 (2018.01)

(52) U.S. Cl.
    CPC ............ B60R 16/037 (2013.01); B60K 35/10 (2024.01); B60K 35/81 (2024.01); H04W 4/48 (2018.02)

(58) Field of Classification Search
    CPC ...... B60R 16/037; B60K 35/10; B60K 35/81; H04W 4/48
    See application file for complete search history.

(56) References Cited

U.S. PATENT DOCUMENTS

2024/0294115 A1*  9/2024  Komatsu .............. H04N 9/8205

* cited by examiner

*Primary Examiner* — Yuen Wong
(74) *Attorney, Agent, or Firm* — NSIP Law

(57)        ABSTRACT

A layout control system for a vehicle mode and a method therefor are provided. The layout control system includes: an input interface configured to receive information on a vehicle driving mode; a memory to store a program for controlling a layout of at least one of an in-vehicle display, a steering wheel, a seat for the vehicle driving mode, or any combination thereof; and a processor electrically connected to the memory, wherein, upon execution of the program, the processor controls the layout in at least one of a manual driving mode, a passenger seat entertainment display attachment mode, an operation mode during autonomous driving, a theater mode, a relax mode, or any combination thereof.

14 Claims, 100 Drawing Sheets

| SORT | DRIVE MODE | THEATER MODE | RELAX MODE | AUTONOMOUS DRIVING MODE |
|---|---|---|---|---|
| EXAMPLE | | | | |
| MODE CONVERSION POP-UP | -SET SEAT INDIVIDUAL MODE -DEACTIVATE DISPLAY MOVEMENT | -SET SEAT INDIVIDUAL MODE -DEACTIVATE DISPLAY MOVEMENT | -SET SEAT INDIVIDUAL MODE -DEACTIVATE DISPLAY MOVEMENT | -OPERATE ONLY DRIVER SEAT DURING AUTONOMOUS DRIVING -ACTIVATE DISPLAY MOVEMENT |
| SEAT | Driver / Passenger | Driver / Passenger | Driver / Passenger | Driver / Passenger |
| 27" Display | IN / NO LINKAGE | IN / NO LINKAGE | IN / NO LINKAGE | OUT / NO LINKAGE |
| Steering Wheel | OUT / NO LINKAGE | IN / NO LINKAGE | IN / NO LINKAGE | IN / NO LINKAGE |
| Seat Position | Drive: FRONT / Drive: FRONT | Drive: MIDDLE / Drive: MIDDLE | Relax: WEIGHTLESS / Relax: WEIGHTLESS | Drive: FRONT / Drive: FRONT |

FIG. 7

| MODE | DRIVE | | | THEATER | | | RELAX | | | AUTONOMOUS DRIVING | | |
|---|---|---|---|---|---|---|---|---|---|---|---|---|
| | DISPLAY | S/W | SEAT | DISPLAY | S/W | SEAT | DISPLAY | S/W | SEAT | DISPLAY | S/W | SEAT |
| DISPLAY | IN | OUT | DRIVE | MAINTENANCE | OUT | DRIVE | MAINTENANCE | OUT | DRIVE | IN | OUT | MAINTENANCE |
| THEATER | MAINTENANCE | IN | THEATER | IN | IN | THEATER | MAINTENANCE | MAINTENANCE | THEATER | IN | MAINTENANCE | THEATER |
| RELAX | MAINTENANCE | IN | RELAX | MAINTENANCE | MAINTENANCE | RELAX | IN | IN | RELAX | IN | MAINTENANCE | RELAX |
| AUTONOMOUS DRIVING | OUT | IN | MAINTENANCE | OUT | MAINTENANCE | MAINTENANCE | IN | MAINTENANCE | DRIVE | OUT(IN) | IN | DRIVE |

FIG. 9

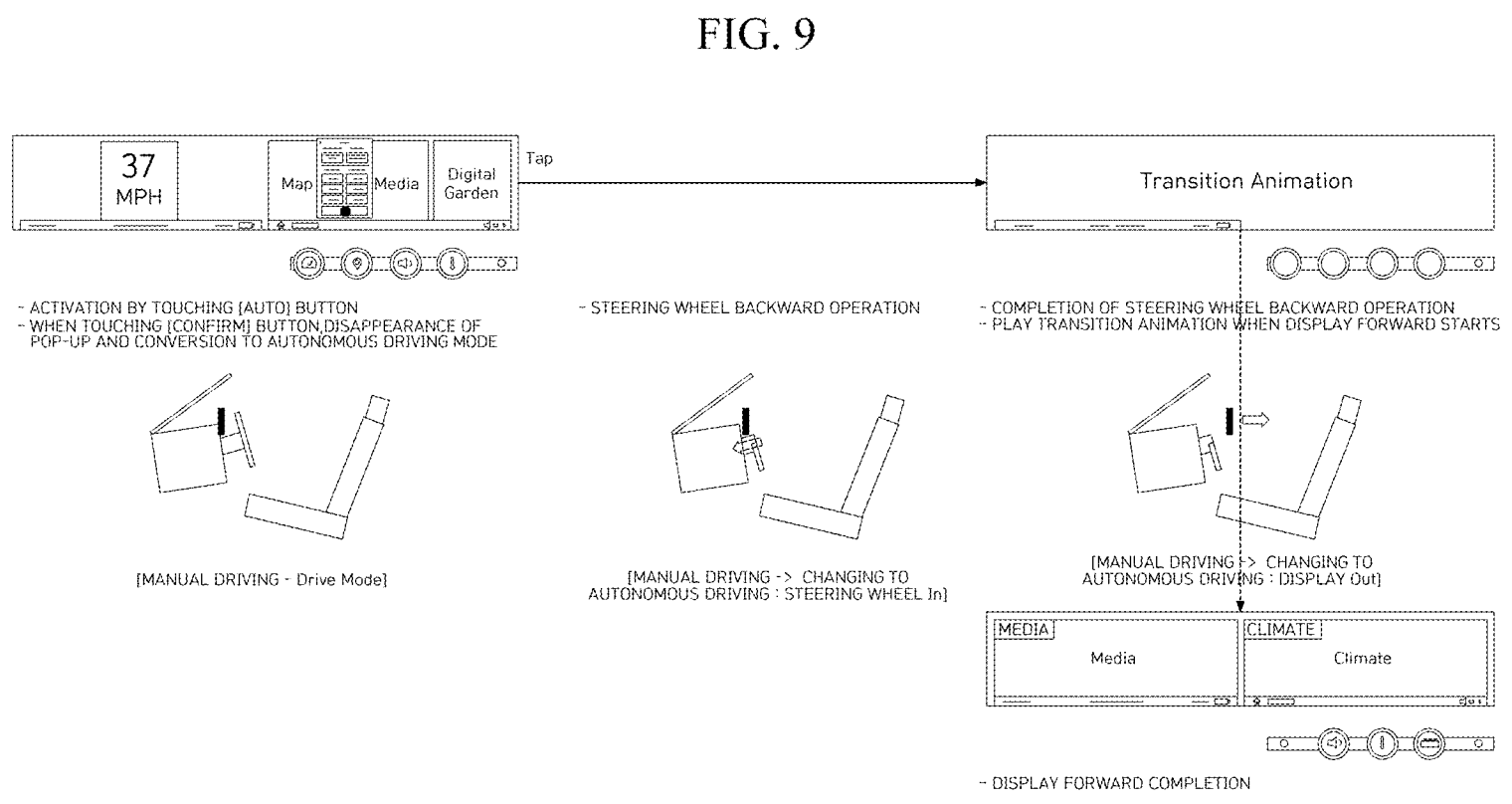

Transition Animation

Tap

37 MPH

Map | Media | Digital Garden

- ACTIVATION BY TOUCHING [AUTO] BUTTON
- WHEN TOUCHING [CONFIRM] BUTTON,DISAPPEARANCE OF POP-UP AND CONVERSION TO AUTONOMOUS DRIVING MODE

[MANUAL DRIVING - Drive Mode]

- STEERING WHEEL BACKWARD OPERATION

[MANUAL DRIVING -> CHANGING TO AUTONOMOUS DRIVING : STEERING WHEEL In]

- COMPLETION OF STEERING WHEEL BACKWARD OPERATION
- PLAY TRANSITION ANIMATION WHEN DISPLAY FORWARD STARTS

[MANUAL DRIVING -> CHANGING TO AUTONOMOUS DRIVING : DISPLAY Out]

MEDIA | CLIMATE

Media | Climate

- DISPLAY FORWARD COMPLETION

FIG. 12

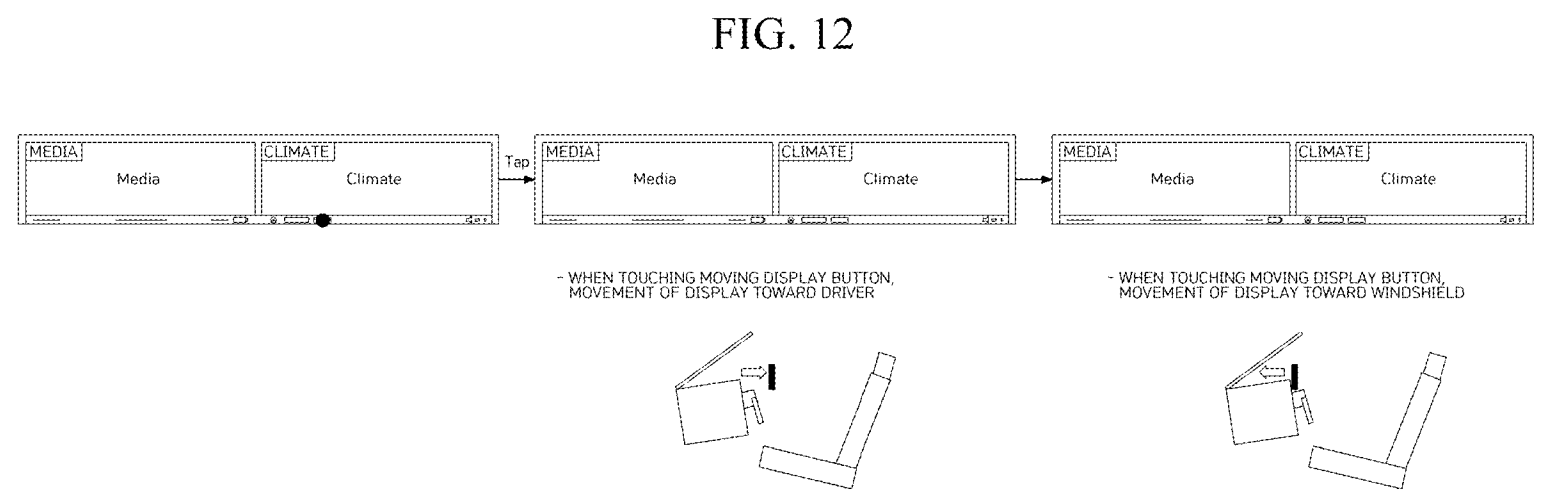

- WHEN TOUCHING MOVING DISPLAY BUTTON, MOVEMENT OF DISPLAY TOWARD DRIVER

- WHEN TOUCHING MOVING DISPLAY BUTTON, MOVEMENT OF DISPLAY TOWARD WINDSHIELD

FIG. 15

| No | Component | Description |
|---|---|---|
| 1 | [X] BUTTON | - WHEN TOUCHING BUTTON, CLOSE POP-UP |
| 2 | AUTONOMOUS DRIVING TOGGLE BUTTON | - AUTONOMOUS DRIVING ON<->OFF TOGGLE BUTTON OPERATION<br>- DISPLAY IN<->OUT TOGGLE BUTTON OPERATION<br>- WHEN TOUCHING [CONFIRM] BUTTON AT THE BOTTOM OF POP-UP, REFLECT CORRESPONDING MODE |
| 3 | AUTONOMOUS DRIVING SETTING BUTTON | - WHEN TURNING ON AUTONOMOUS DRIVING, DISPLAY CORRESPONDING SETTING MENU<br>- OFF -> Warning -> Assist LEVEL SETTING |
| 4 | MODE RADIO BUTTON | - THREE MODE SELECTION BUTTONS ON EACH OF DRIVER SEAT/PASSENGER SEAT<br>- WHEN TOUCHING [CONFIRM] BUTTON AT THE BOTTOM OF POP-UP, REFLECT CORRESPONDING MODE |
| 5 | AUTONOMOUS DRIVING BUTTON | - AUTONOMOUS DRIVING ON<->OFF TOGGLE BUTTON OPERATION |
| 6 | DISPLAY MOVEMENT BUTTON | - DIM CORRESPONDING BUTTON WHEN TURNING OFF AUTONOMOUS DRIVING<br>- AUTOMATICALLY TURN ON DISPLAY MOVEMENT BUTTON WHEN TURNING ON AUTONOMOUS DRIVING |
| 7 | AUTONOMOUS DRIVING SETTING BUTTON | - OFF -> Warning -> Assist LEVEL SETTING |
| 8 | DRIVE MODE BUTTON | - WHEN TOUCHING BUTTON, SELECT CORRESPONDING BUTTON (RADIO BUTTON) |
| 9 | THEATER MODE BUTTON | - WHEN TOUCHING BUTTON, SELECT CORRESPONDING BUTTON (RADIO BUTTON) |
| 10 | RELAX MODE BUTTON | - WHEN TOUCHING BUTTON, SELECT CORRESPONDING BUTTON (RADIO BUTTON) |
| 11 | CONFIRM MODE BUTTON | - WHEN TOUCHING BUTTON, REFLECT MODE IN POP-UP<br>- NO APPLICATION OF SEAT MODE WITH AUTONOMOUS DRIVING TURNED ON |

FIG. 22

| 12.8" DETACHMENT |
| --- |

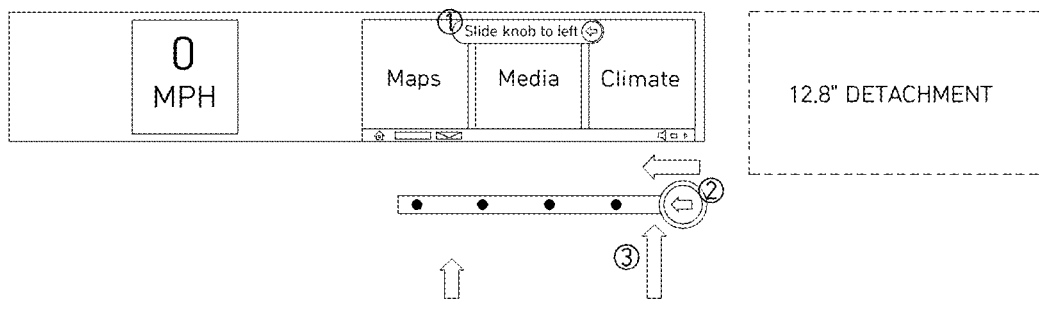

| Description |
| --- |

CASE IN WHICH 12.8" DISPLAY IS DETACHED WHEN KNOB IS IN RIGHTMOST POSITION

| No | Component | Description |
| --- | --- | --- |
| 1 | KNOB MOVEMENT GUIDANCE POP-UP | - DISPLAY KNOB MOVEMENT POP-UP ON 27" DISPLAY AT THE TIME OF 12.8" DETACHMENT<br>- WHEN MANUALLY MOVING KNOB, DISAPPEARANCE OF POP-UP<br>- AFTER 12.8" DETACHMENT, DISAPPEARANCE OF POP-UP WHEN NOT MOVING KNOB FOR 5 SEC<br>- WHEN TOUCHING AREA OTHER THAN POP-UP WHILE DISPLAYING POP-UP, DISAPPEARANCE OF POP-UP<br>Slide knob to left |
| 2 | KNOB IMAGE | - DISPLAY KNOB LEFT MOVEMENT GUIDANCE ICON |
| 3 | RIGHT SOLENOID | - AFTER MOVING KNOB, PREVENT MOVEMENT TO EXTREME RIGHT BY SOLENOID PROTRUSION |

FIG. 23

| AUTONOMOUS DRIVING MODE CONVERSION |
| --- |

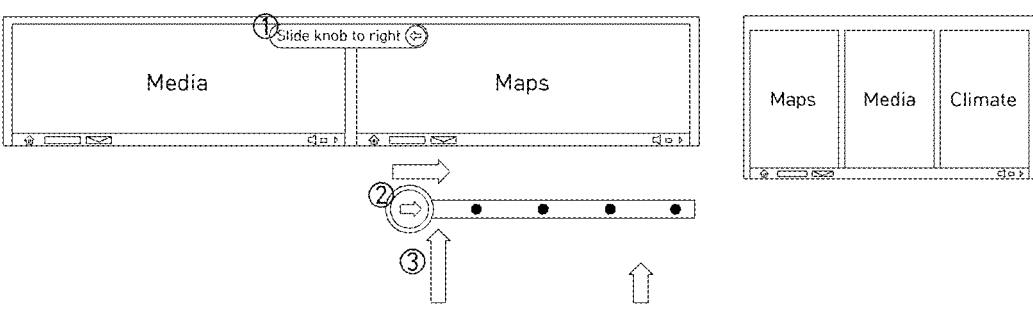

| Description |
| --- |

CASE OF MANUAL DRIVING -> AUTONOMOUS DRIVING MODE CONVERSION WHEN KNOB IS IN LEFTMOST POSITION

| No | Component | Description |
| --- | --- | --- |
| 1 | KNOB MOVEMENT GUIDANCE POP-UP | - DISPLAY KNOB MOVEMENT POP-UP ON 27" DISPLAY AT THE TIME OF MANUAL DRIVING -> AUTONOMOUS DRIVING MODE CONVERSION<br>- WHEN MANUALLY MOVING KNOB, DISAPPEARANCE OF POP-UP<br>- AFTER COMPLETION OF AUTONOMOUS DRIVING MODE CONVERSION, DISAPPEARANCE OF POP-UP WHEN NOT MOVING KNOB FOR 5 SEC<br>- WHEN TOUCHING AREA OTHER THAN POP-UP WHILE DISPLAYING POP-UP, DISAPPEARANCE OF POP-UP<br><br>⇨  Slide knob to right |
| 2 | KNOB IMAGE | - DISPLAY KNOB RIGHT MOVEMENT GUIDANCE ICON ⇨ |
| 3 | LIFT SOLENOID | - AFTER MOVING KNOB, PREVENT MOVEMENT TO EXTREME LIFT BY SOLENOID PROTRUSION |

| 12.8" DETACHMENT |
| --- |

| Description |
| --- |

CASE IN WHICH 12.8" DISPLAY IS DETACHED WHEN KNOB IS IN RIGHTMOST POSITION

| No | Component | Description |
| --- | --- | --- |
| 1 | KNOB MOVEMENT | - AUTOMATIC PUSH AND LOCKING FOR KNOB AT THE TIME OF 12.8" DETACHMENT |
| 2 | RIGHT SOLENOID | - AFTER MOVING KNOB, PREVENT MOVEMENT TO EXTREME RIGHT BY SOLENOID PROTRUSION |

FIG. 27

| AUTONOMOUS DRIVING MODE CONVERSION |
|---|

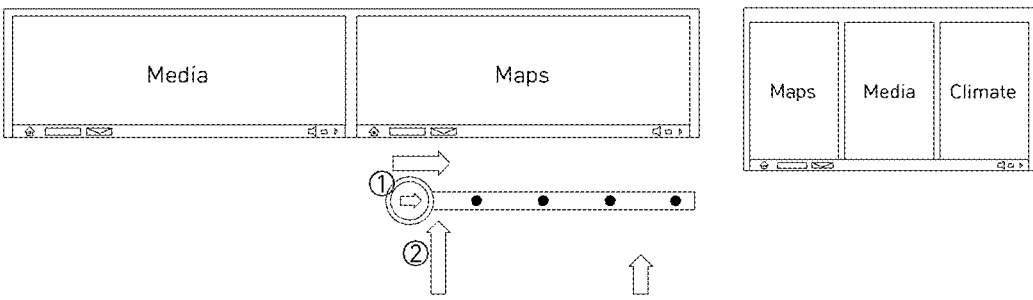

| Description |
|---|

CASE OF MANUAL DRIVING -> AUTONOMOUS DRIVING MODE CONVERSION WHEN KNOB IS IN LEFTMOST POSITION

| No | Component | Description |
|---|---|---|
| 1 | KNOB MOVEMENT | - AUTOMATIC PUSH AND LOCKING FOR KNOB AT THE TIME OF MANUAL DRIVING -> AUTONOMOUS DRIVING MODE CONVERSION |
| 2 | LEFT SOLENOID | - AFTER MOVING KNOB, PREVENT MOVEMENT TO EXTREME LEFT BY SOLENOID PROTRUSION |

FIG. 28

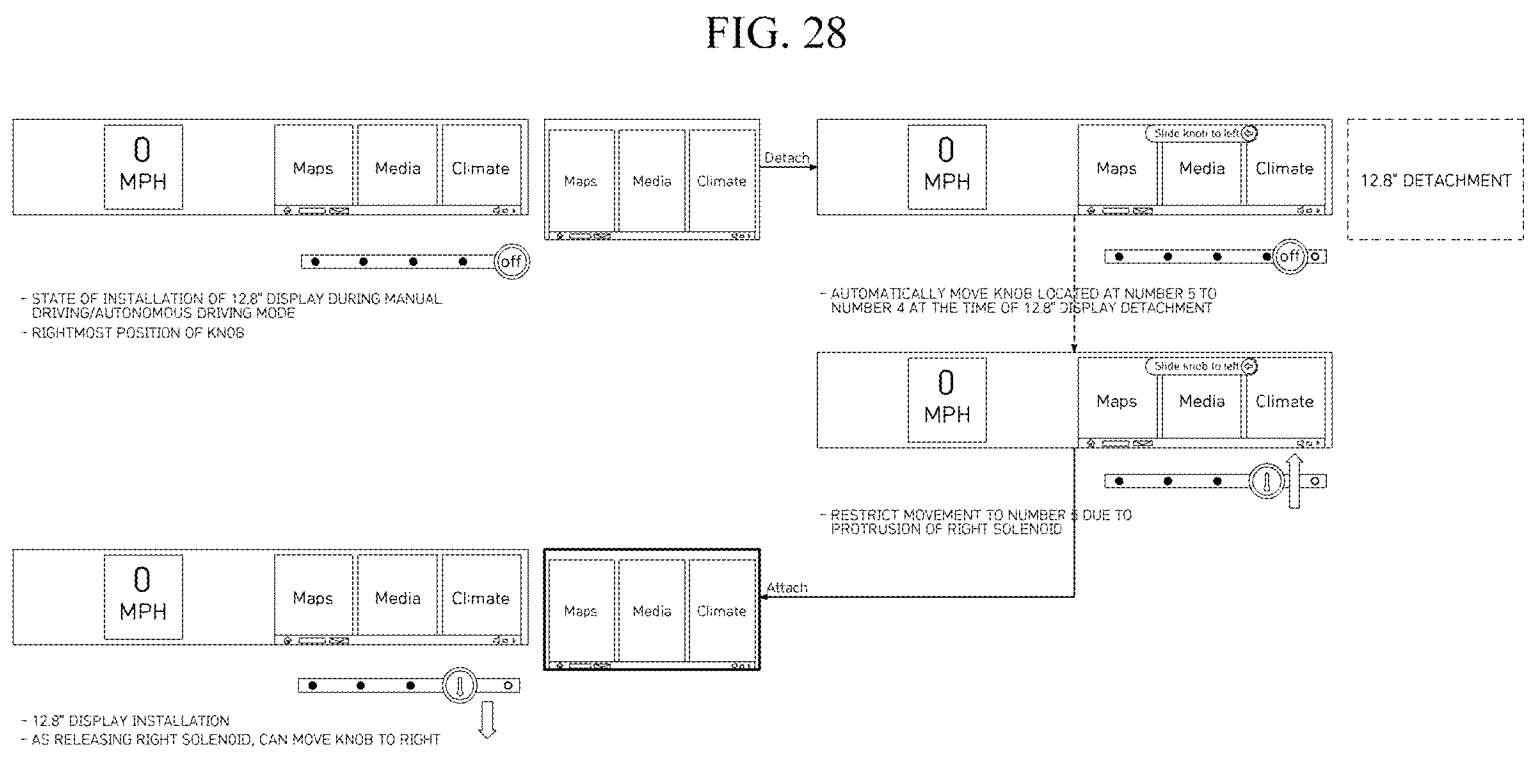

- STATE OF INSTALLATION OF 12.8" DISPLAY DURING MANUAL DRIVING/AUTONOMOUS DRIVING MODE
- RIGHTMOST POSITION OF KNOB

- 12.8" DISPLAY INSTALLATION
- AS RELEASING RIGHT SOLENOID, CAN MOVE KNOB TO RIGHT

- AUTOMATICALLY MOVE KNOB LOCATED AT NUMBER 5 TO NUMBER 4 AT THE TIME OF 12.8" DISPLAY DETACHMENT

- RESTRICT MOVEMENT TO NUMBER 5 DUE TO PROTRUSION OF RIGHT SOLENOID 12.8" DETACHMENT

FIG. 31

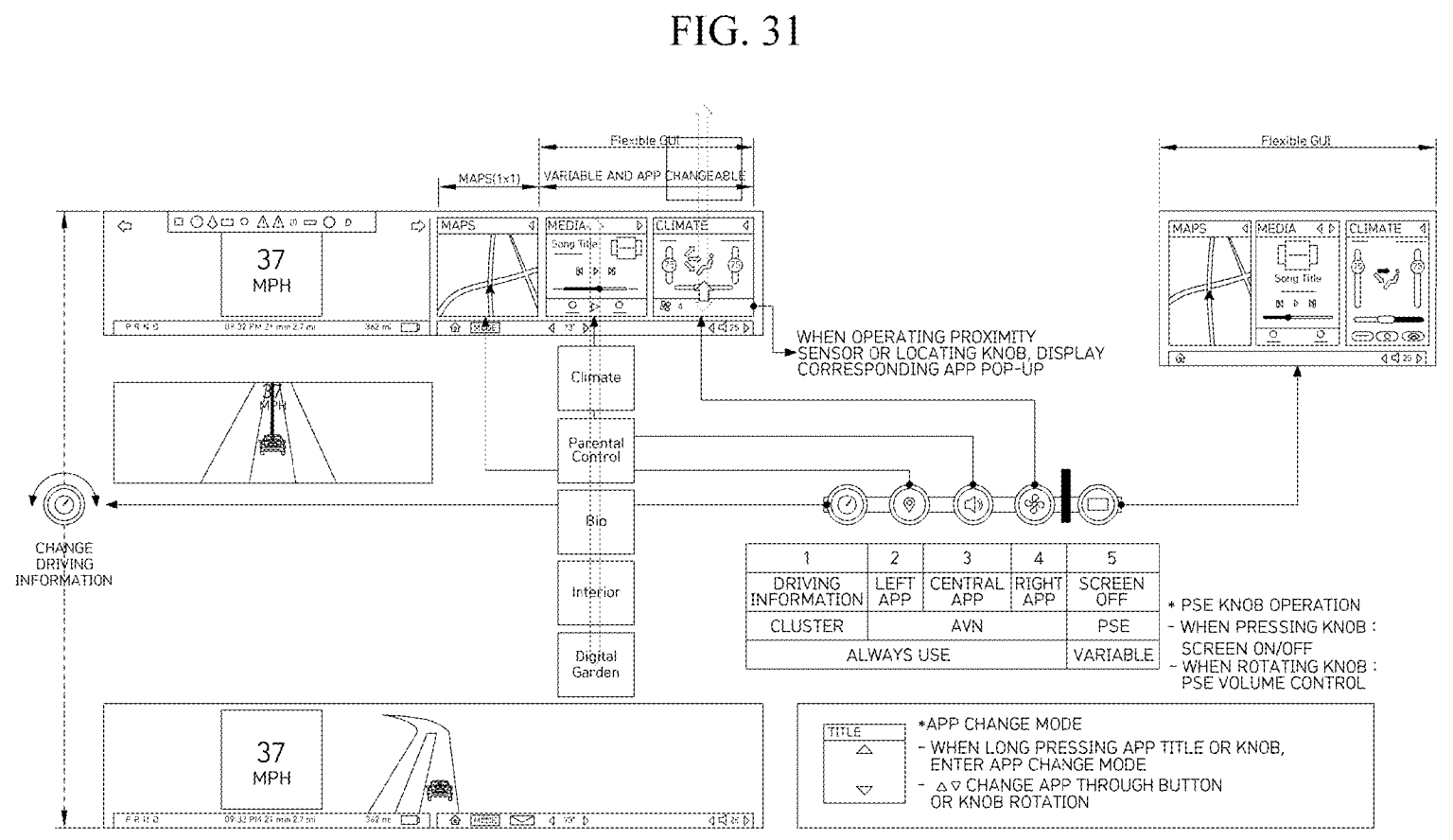

Flexible GUI

Flexible GUI
VARIABLE AND APP CHANGEABLE
MAPS(1x1)

MAPS    MEDIA    CLIMATE
Song Title

37 MPH

MAPS    MEDIA    CLIMATE
Song Title

WHEN OPERATING PROXIMITY
SENSOR OR LOCATING KNOB, DISPLAY
CORRESPONDING APP POP-UP

Climate
Parental Control
Bio
Interior
Digital Garden

37 MPH

CHANGE DRIVING INFORMATION

| | 1 | 2 | 3 | 4 | 5 |
|---|---|---|---|---|---|
| | DRIVING INFORMATION | LEFT APP | CENTRAL APP | RIGHT APP | SCREEN OFF |
| | CLUSTER | | AVN | | PSE |
| | | ALWAYS USE | | | VARIABLE |

* PSE KNOB OPERATION
- WHEN PRESSING KNOB :
  SCREEN ON/OFF
- WHEN ROTATING KNOB :
  PSE VOLUME CONTROL

* APP CHANGE MODE
- WHEN LONG PRESSING APP TITLE OR KNOB,
  ENTER APP CHANGE MODE
- △▽ CHANGE APP THROUGH BUTTON
  OR KNOB ROTATION

TITLE
△
▽

Figure 40:
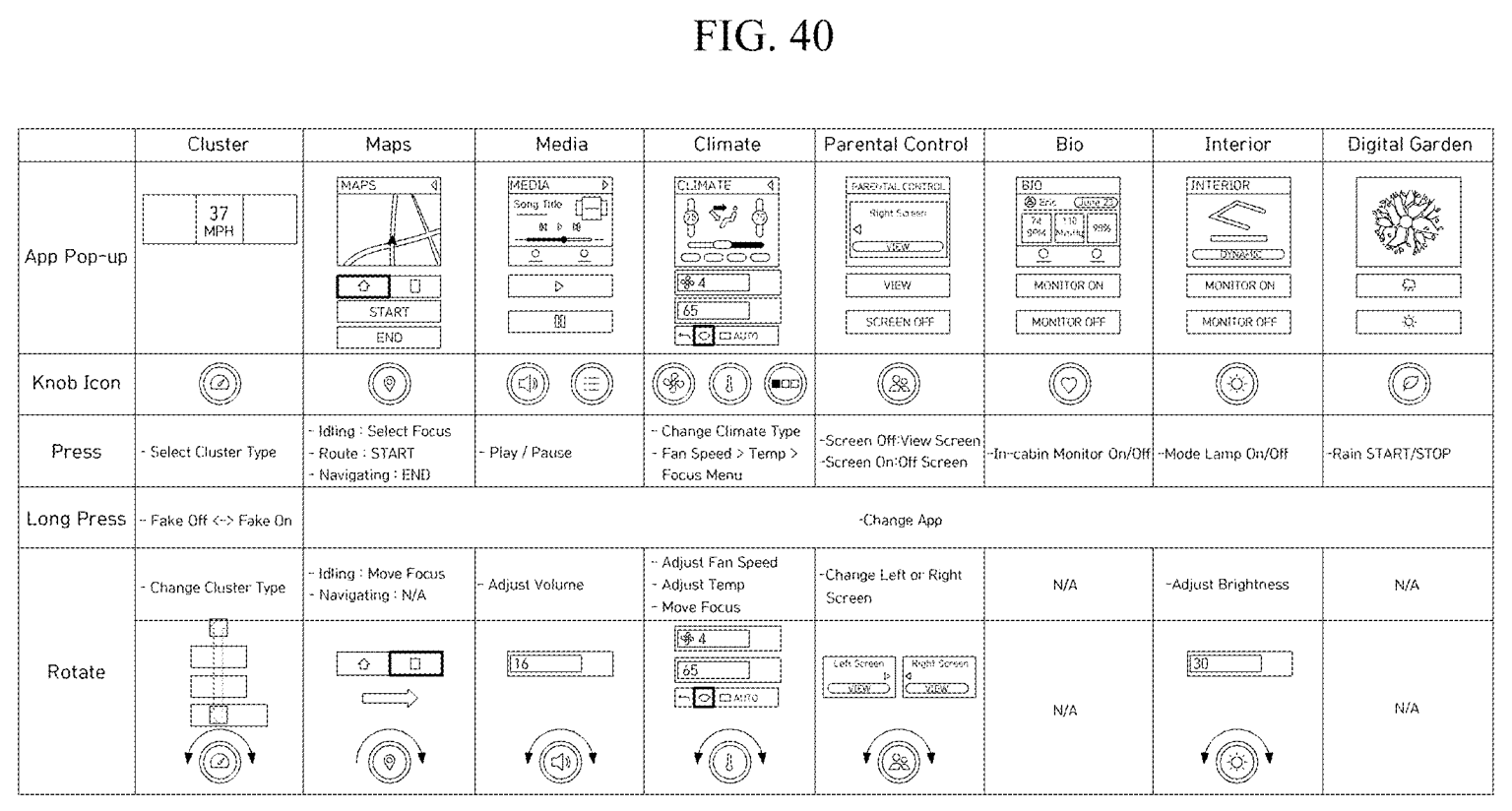

| | Cluster | Maps | Media | Climate | Parental Control | Bio | Interior | Digital Garden |
|---|---|---|---|---|---|---|---|---|
| App Pop-up | 37 MPH | MAPS / START / END | MEDIA / Song Title | CLIMATE | PARENTAL CONTROL / Right Screen / VIEW / SCREEN OFF | BIO / MONITOR ON / MONITOR OFF | INTERIOR / MONITOR ON / MONITOR OFF | |
| Knob Icon | | | | | | | | |
| Press | - Select Cluster Type | - Idling : Select Focus<br>- Route : START<br>- Navigating : END | - Play / Pause | - Change Climate Type<br>- Fan Speed > Temp ><br>Focus Menu | - Screen Off:View Screen<br>- Screen On:Off Screen | - In-cabin Monitor On/Off | - Mode Lamp On/Off | - Rain START/STOP |
| Long Press | - Fake Off <-> Fake On | | | | - Change App | | | |
| Rotate | - Change Cluster Type | - Idling : Move Focus<br>- Navigating : N/A | - Adjust Volume<br>16 | - Adjust Fan Speed<br>- Adjust Temp<br>- Move Focus | - Change Left or Right<br>Screen | N/A | - Adjust Brightness<br>30 | N/A |

FIG. 43

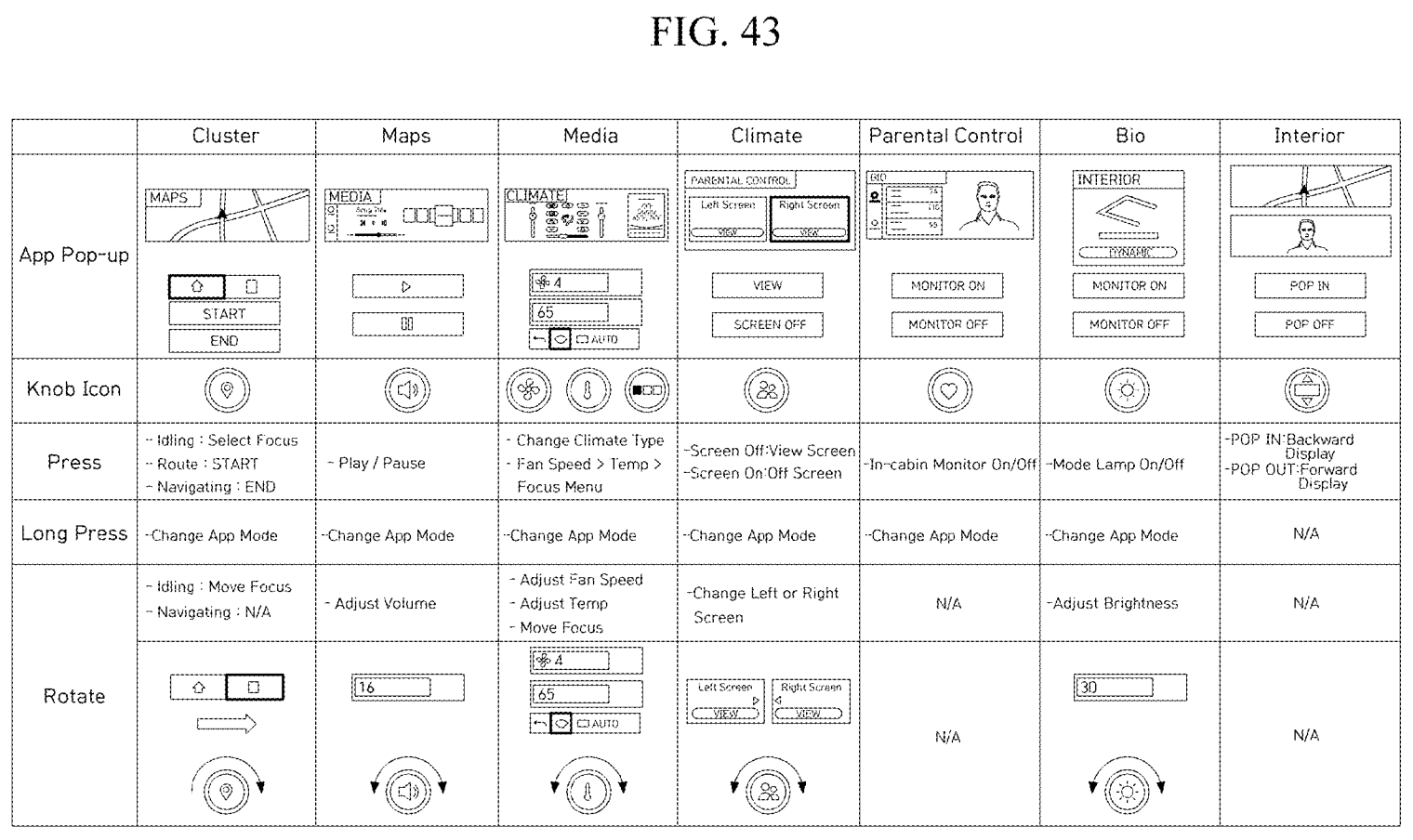

| | Cluster | Maps | Media | Climate | Parental Control | Bio | Interior |
|---|---|---|---|---|---|---|---|
| App Pop-up | | | | | | | |
| Knob Icon | | | | | | | |
| Press | -- Idling : Select Focus<br>- Route : START<br>- Navigating : END | - Play / Pause | - Change Climate Type<br>- Fan Speed > Temp ><br>Focus Menu | -Screen Off>View Screen<br>-Screen On>Off Screen | -In-cabin Monitor On/Off | -Mode Lamp On/Off | -POP IN:Backward<br>Display<br>-POP OUT>Forward<br>Display |
| Long Press | -Change App Mode | -Change App Mode | -Change App Mode | -Change App Mode | -Change App Mode | -Change App Mode | N/A |
| Rotate | - Idling : Move Focus<br>- Navigating : N/A | - Adjust Volume | - Adjust Fan Speed<br>- Adjust Temp<br>- Move Focus | -Change Left or Right<br>Screen | N/A | -Adjust Brightness | N/A |

| No | Component | Description |
|---|---|---|
| 1 | PRND | - DISPLAY PRND STATUS |
| 2 | AUTONOMOUS DRIVING TOGGLE BUTTON | - WHEN DRIVING (NAVIGATION) STARTS, DISPLAY INFORMATION<br>- ESTIMATED ARRIVAL TIME/REMAINING TIME/REMAINING DISTANCE<br>- HH:MM AM/PM / HH:MM min / OO mi |
| 3 | DISTANCE AVAILABLE FOR DRIVING | - OOO mi |
| 4 | REMAINING BATTERY | - DISPLAY VEHICLE BATTERY ICON |
| 5 | HOME BUTTON | - WHEN TOUCHING BUTTON, OPERATE CLEAR HOME<br>- CLUSTER MAINTENANCE/APP DISAPPEARANCE<br>- WHEN LONG PRESSING BUTTON, CALL THEME SELECTION POP-UP |
| 6 | MODE BUTTON | - WHEN TOUCHING BUTTON, CALL MODE CONVERSION POP-UP<br>- WHEN TOUCHED DURING POP-UP CALL, DISAPPEARANCE OF POP-UP |
| 8 | TEMPERATURE CONTROL BUTTON | - WHEN TOUCHING◁ ▷BUTTON, INCREASES AND DECREASES BY 1 DEGREE |
| 9 | CURRENT SETTING TEMPERATURE BUTTON | - DISPLAY CURRENTLY SET TEMPERATURE<br>- (MINIMUM 60 ~ MAXIMUM 90/DEFAULT 75)<br>- WHEN TOUCHING BUTTON, DISPLAY AIR-CONDITIONING POP-UP |
| 10 | AIR-CONDITIONING POP-UP (TOGGLE BUTTON) | - AIR VOLUME/FRONT DEFROST/REAR DEFROST/INDOOR AND OUTDOOR AIR CONVERSION/MODE SETTING/ A/C /SYNC BUTTON |
| 11 | MINI MUSIC PLAYER | - WHEN MEDIA APP MOVES TO BACKGROUND WHILE PLAYING MUSIC, DISPLAY MINI MUSIC PLAYER ACCORDING TO POSITION OF TOP APP |
| 13 | VOLUME CONTROL BUTTON | - WHEN TOUCHING◁ ▷BUTTON, INCREASE/DECREASE VOLUME LEVEL BY 1 |
| 14 | CURRENT SETTING VOLUME BUTTON | - DISPLAY CURRENTLY SET VOLUME VALUE<br>- WHEN TOUCHING BUTTON, DISPLAY VOLUME SETTING POP-UP<br>- WHEN LONG PRESSING BUTTON, MUTE TOGGLE OPERATION<br><br>◁ 25 ◁→ ◁ × |
| 10 | CURRENT KNOB POSITION IMAGE | - IMAGE SHOWING POSITION OF KNOB WHEN LOCATED AT NUMBER 1/2/3/4  ☐ |

FIG. 54

FIG. 56
| 1 x 1 |
|---|
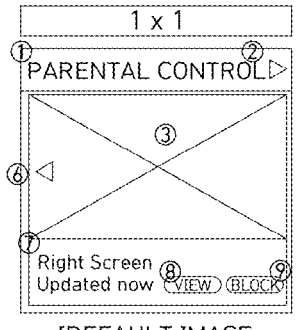
[DEFAULT IMAGE
BEFORE CAPTURE]
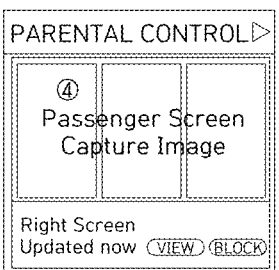
[CAPTURE IMAGE]
| 2 x 1 |
|---|
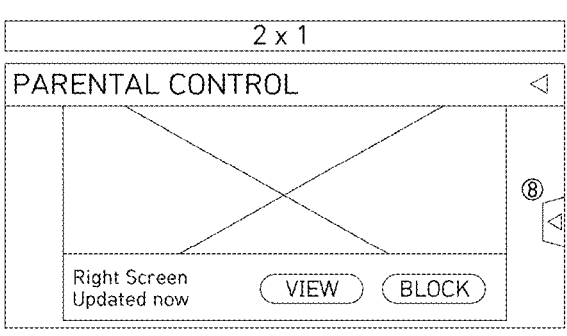
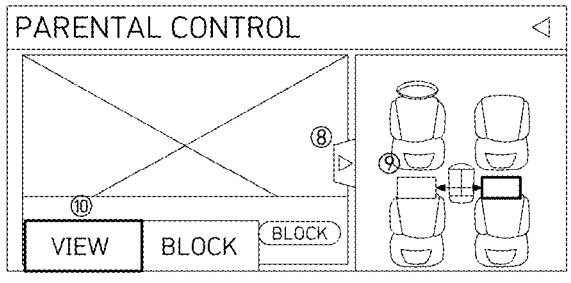
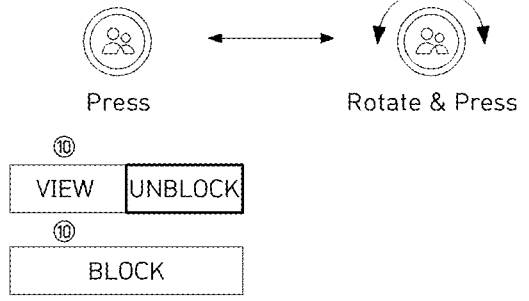

FIG. 57

SCREEN DESCRIPTION a. 27" PARENTAL CONTROL SCREEN

| No | Component | Description |
|---|---|---|
| 1 | APP TITLE | - DISPLAY PARENTAL CONTROL TEXT |
| 2 | APP ZOOM BUTTON | - WHEN TOUCHING BUTTON, ENLARGE<->REDUCE CORRESPONDING APP SIZE TOGGLE OPERATION |
| 3 | DEFAULT IMAGE | - DISPLAY DEFAULT IMAGE BEFORE CAPTURE |
| 4 | CAPTURE IMAGE | - WHEN TOUCHING [VIEW] BUTTON, CAPTURE AND THEN DISPLAY CORRESPONDING RSE SCREEN |
| 5 | VIDEO | - WHEN TOUCHING [VIEW] BUTTON, DISPLAY WHEN PLAYING CORRESPONDING RSE VIDEO |
| 6 | LEFT AND RIGHT DISPLAY ◁▷ BUTTON | - WHEN TOUCHING BUTTON, DISPLAY LEFT RSE/RIGHT RSE INFORMATION |
| 7 | RSE DISPLAY INFORMATION | - DISPLAY LEFT RSE/RIGHT RSE INFORMATION : Left Screen / Right Screen<br>- CAPTURE TIME : Updated now : Updated OO min/hr/day ago |
| 8 | RSE POSITION VIEW/CLOSE BUTTON | - WHEN TOUCHING BUTTON, DISPLAY RSE POSITION |
| 9 | RSE BUTTON | - WHEN TOUCHING BUTTON, DISPLAY LEFT IMAGE AFTER FOCUSING CORRESPONDING RSE<br>- WHEN ROTATING KNOB AND PRESSING IT AFTER FOCUS MOVEMENT, DISPLAY LEFT IMAGE |
| 10 | KNOB POP-UP | - WHEN TOUCHING BUTTON, CAPTURE AND THEN DISPLAY RSE SCREEN<br>- BLOCK <-> UNBLOCK DISPLAY TOGGLE<br>- FOR VIDEO, DISPLAY BLOCK |

FIG. 59

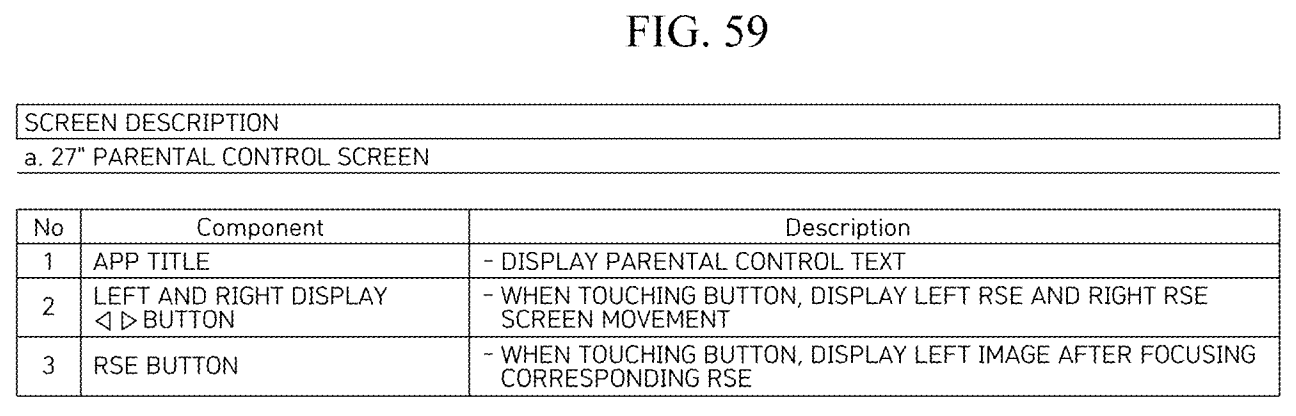

SCREEN DESCRIPTION
a. 27" PARENTAL CONTROL SCREEN

| No | Component | Description |
|----|-----------|-------------|
| 1 | APP TITLE | - DISPLAY PARENTAL CONTROL TEXT |
| 2 | LEFT AND RIGHT DISPLAY ◁▷ BUTTON | - WHEN TOUCHING BUTTON, DISPLAY LEFT RSE AND RIGHT RSE SCREEN MOVEMENT |
| 3 | RSE BUTTON | - WHEN TOUCHING BUTTON, DISPLAY LEFT IMAGE AFTER FOCUSING CORRESPONDING RSE |

FIG. 63

SCREEN DESCRIPTION
a. 27" PARENTAL CONTROL SCREEN

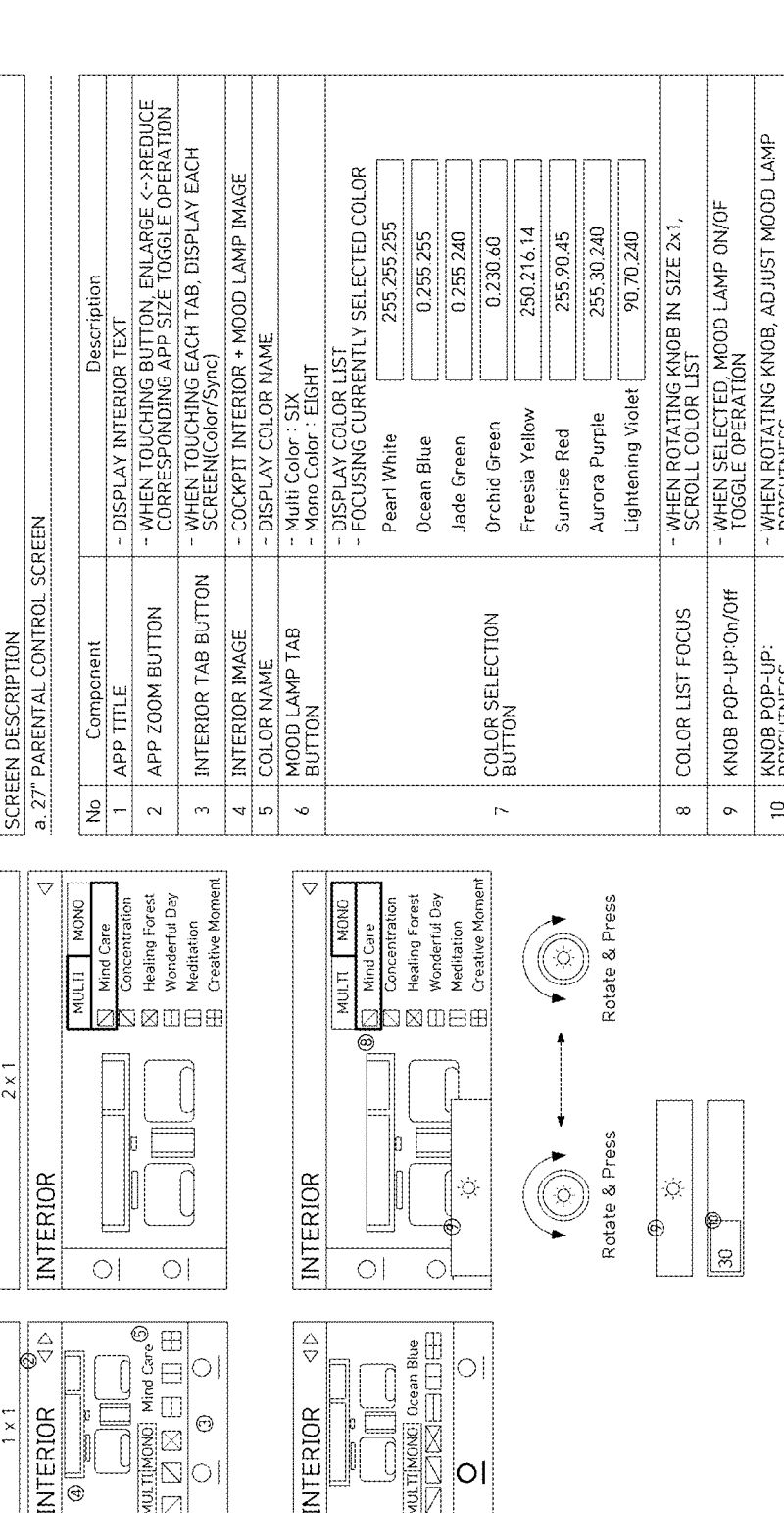

| No | Component | Description |
|----|-----------|-------------|
| 1 | APP TITLE | - DISPLAY INTERIOR TEXT |
| 2 | APP ZOOM BUTTON | - WHEN TOUCHING BUTTON, ENLARGE <->REDUCE CORRESPONDING APP SIZE TOGGLE OPERATION |
| 3 | INTERIOR TAB BUTTON | - WHEN TOUCHING EACH TAB, DISPLAY EACH SCREEN(Color/Sync) |
| 4 | INTERIOR IMAGE | - COCKPIT INTERIOR + MOOD LAMP IMAGE |
| 5 | COLOR NAME | - DISPLAY COLOR NAME |
| 6 | MOOD LAMP TAB BUTTON | - Multi Color : SIX<br>- Mono Color : EIGHT |
| 7 | COLOR SELECTION BUTTON | - DISPLAY COLOR LIST<br>- FOCUSING CURRENTLY SELECTED COLOR<br><br>Pearl White   255.255.255<br>Ocean Blue   0.255.255<br>Jade Green   0.255.240<br>Orchid Green   0.230.60<br>Freesia Yellow   250.216.14<br>Sunrise Red   255.90.45<br>Aurora Purple   255.30.240<br>Lightening Violet   90.70.240 |
| 8 | COLOR LIST FOCUS | - WHEN ROTATING KNOB IN SIZE 2x1, SCROLL COLOR LIST |
| 9 | KNOB POP-UP:On/Off | - WHEN SELECTED, MOOD LAMP ON/OF TOGGLE OPERATION |
| 10 | KNOB POP-UP: BRIGHTNESS | - WHEN ROTATING KNOB, ADJUST MOOD LAMP BRIGHTNESS |

FIG. 64

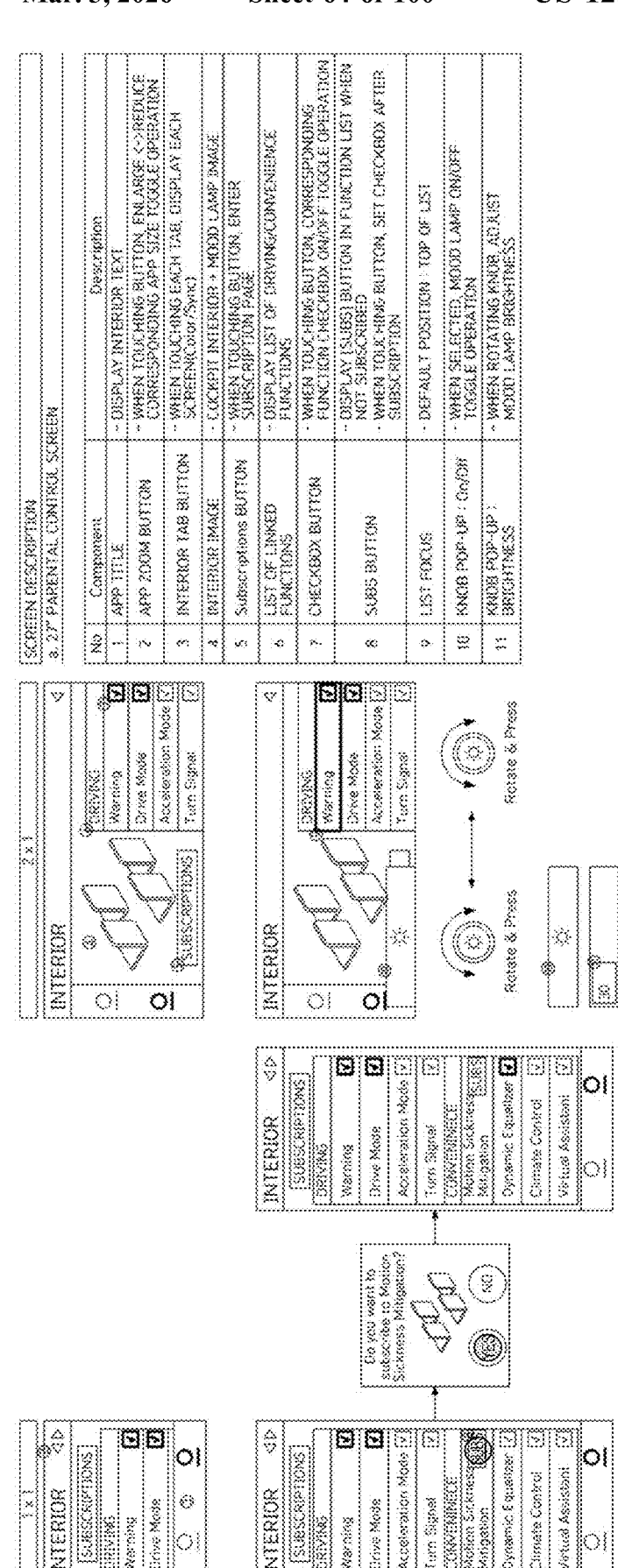

SCREEN DESCRIPTION
3. 27' PARENTAL CONTROL SCREEN

| No | Component | Description |
|---|---|---|
| 1 | APP TITLE | - DISPLAY INTERIOR TEXT |
| 2 | APP ZOOM BUTTON | - WHEN TOUCHING BUTTON, ENLARGE <->REDUCE CORRESPONDING APP SIZE TOGGLE OPERATION |
| 3 | INTERIOR TAB BUTTON | - WHEN TOUCHING EACH TAB, DISPLAY EACH SCREEN(Color/Sync) |
| 4 | INTERIOR IMAGE | - COCKPIT INTERIOR + MOOD LAMP IMAGE |
| 5 | Subscriptions BUTTON | - WHEN TOUCHING BUTTON, ENTER SUBSCRIPTION PAGE |
| 6 | LIST OF LINKED FUNCTIONS | - DISPLAY LIST OF DRIVING/CONVENIENCE FUNCTIONS |
| 7 | CHECKBOX BUTTON | - WHEN TOUCHING BUTTON, CORRESPONDING FUNCTION + CHECKBOX ON/OFF TOGGLE OPERATION |
| 8 | SUBS BUTTON | - DISPLAY (SUBS) BUTTON IN FUNCTION LIST WHEN NOT SUBSCRIBED<br>- WHEN TOUCHING BUTTON, SET CHECKBOX AFTER SUBSCRIPTION |
| 9 | LIST FOCUS | - DEFAULT POSITION : TOP OF LIST |
| 10 | KNOB POP-UP / On/Off | - WHEN SELECTED, MOOD LAMP ON/OFF TOGGLE OPERATION |
| 11 | KNOB POP-UP / BRIGHTNESS | - WHEN ROTATING KNOB, ADJUST MOOD LAMP BRIGHTNESS |

FIG. 65

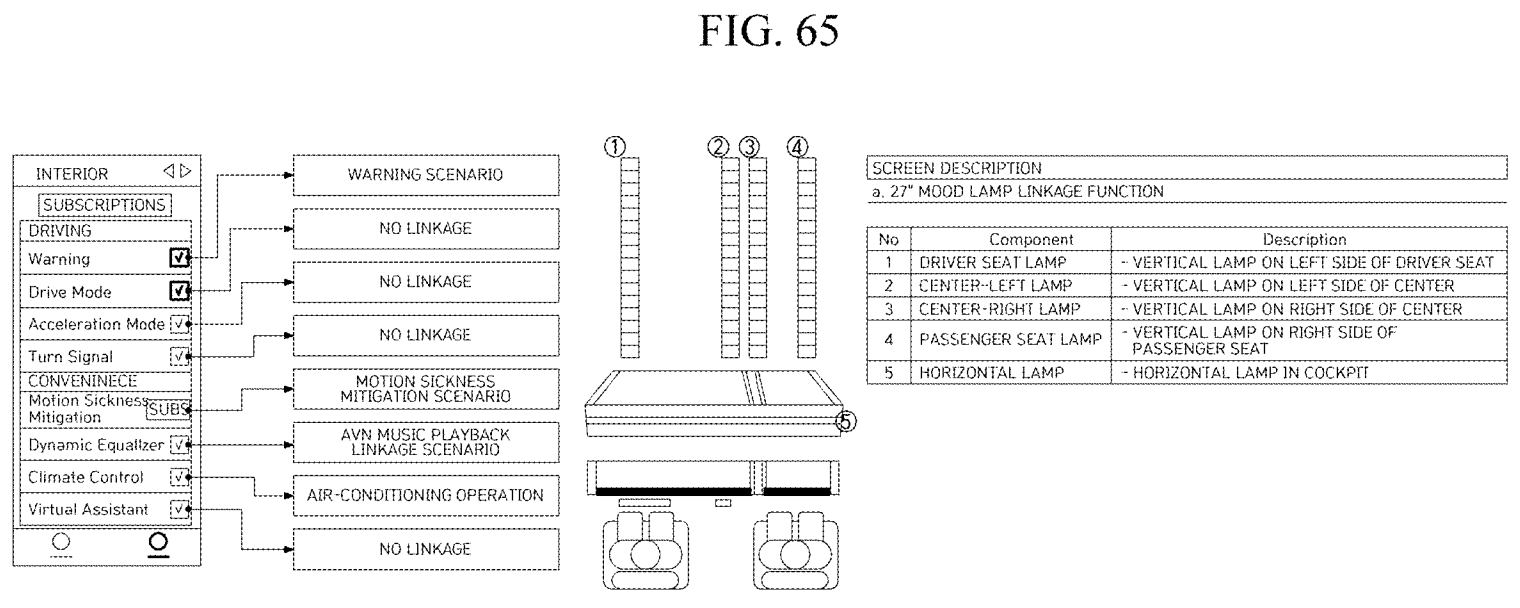

SCREEN DESCRIPTION
a. 27" MOOD LAMP LINKAGE FUNCTION

| No | Component | Description |
|----|-----------|-------------|
| 1 | DRIVER SEAT LAMP | - VERTICAL LAMP ON LEFT SIDE OF DRIVER SEAT |
| 2 | CENTER-LEFT LAMP | - VERTICAL LAMP ON LEFT SIDE OF CENTER |
| 3 | CENTER-RIGHT LAMP | - VERTICAL LAMP ON RIGHT SIDE OF CENTER |
| 4 | PASSENGER SEAT LAMP | - VERTICAL LAMP ON RIGHT SIDE OF PASSENGER SEAT |
| 5 | HORIZONTAL LAMP | - HORIZONTAL LAMP IN COCKPIT |

WARNING SCENARIO

NO LINKAGE

NO LINKAGE

NO LINKAGE

MOTION SICKNESS MITIGATION SCENARIO

AVN MUSIC PLAYBACK LINKAGE SCENARIO

AIR-CONDITIONING OPERATION

NO LINKAGE

INTERIOR

[SUBSCRIPTIONS]

DRIVING
Warning
Drive Mode
Acceleration Mode
Turn Signal

CONVENINECE
Motion Sickness Mitigation
Dynamic Equalizer
Climate Control
Virtual Assistant

FIG.69

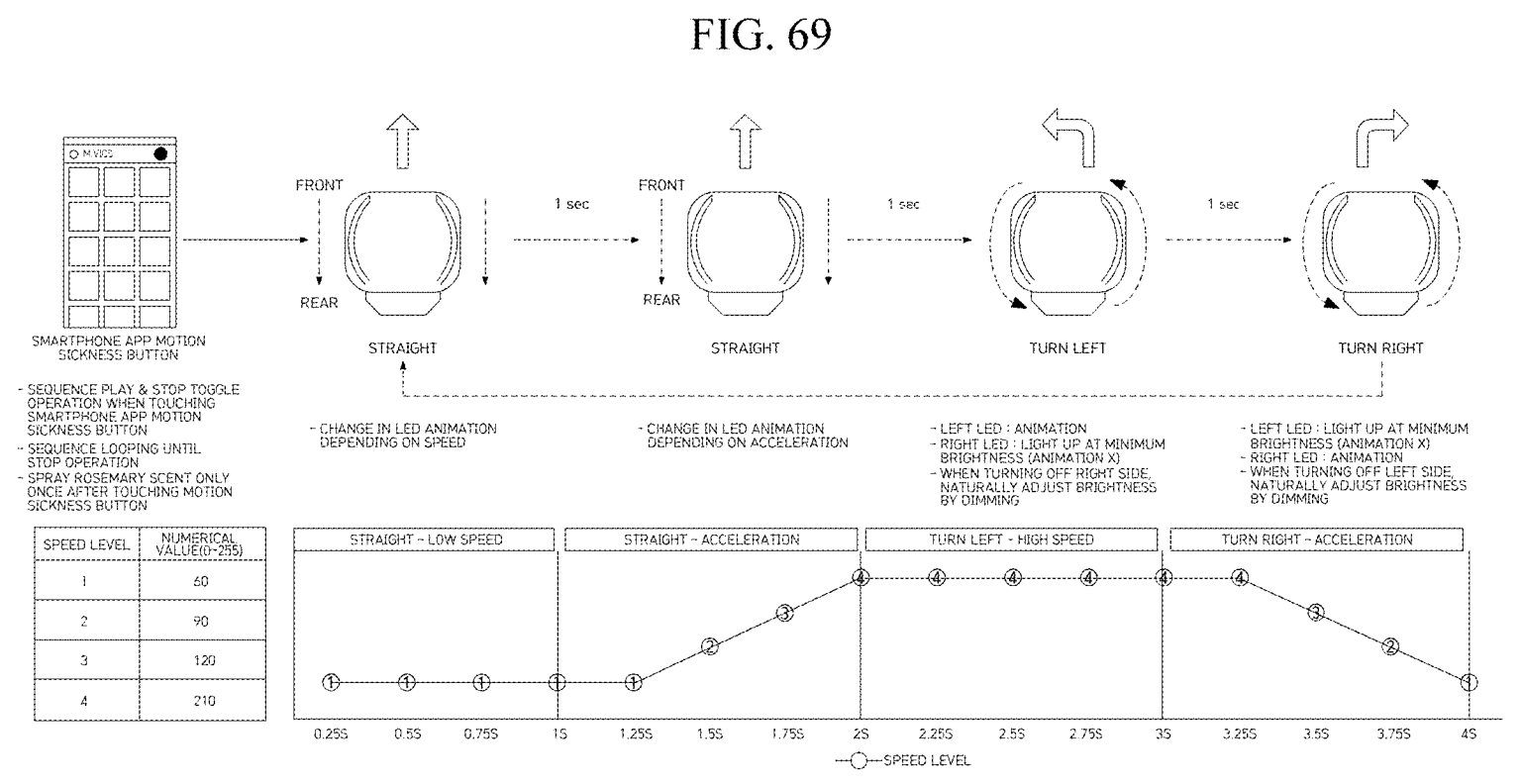

FRONT — REAR — STRAIGHT
FRONT — REAR — STRAIGHT
FRONT — STRAIGHT
TURN LEFT
TURN RIGHT 1 sec

SMARTPHONE APP MOTION SICKNESS BUTTON

- SEQUENCE PLAY & STOP TOGGLE OPERATION WHEN TOUCHING SMARTPHONE APP MOTION SICKNESS BUTTON
- SEQUENCE LOOPING UNTIL STOP OPERATION
- SPRAY ROSEMARY SCENT ONLY ONCE AFTER TOUCHING MOTION SICKNESS BUTTON

- CHANGE IN LED ANIMATION DEPENDING ON SPEED

- CHANGE IN LED ANIMATION DEPENDING ON ACCELERATION

- LEFT LED : ANIMATION
- RIGHT LED : LIGHT UP AT MINIMUM BRIGHTNESS (ANIMATION X)
- WHEN TURNING OFF RIGHT SIDE, NATURALLY ADJUST BRIGHTNESS BY DIMMING

- LEFT LED : LIGHT UP AT MINIMUM BRIGHTNESS (ANIMATION X)
- RIGHT LED : ANIMATION
- WHEN TURNING OFF LEFT SIDE, NATURALLY ADJUST BRIGHTNESS BY DIMMING

STRAIGHT - LOW SPEED | STRAIGHT - ACCELERATION | TURN LEFT - HIGH SPEED | TURN RIGHT - ACCELERATION 0.25S 0.5S 0.75S 1S 1.25S 1.5S 1.75S 2S 2.25S 2.5S 2.75S 3S 3.25S 3.5S 3.75S 4S

SPEED LEVEL

| SPEED LEVEL | NUMERICAL VALUE(0~255) |
|---|---|
| 1 | 60 |
| 2 | 90 |
| 3 | 120 |
| 4 | 210 |

Figure 71:
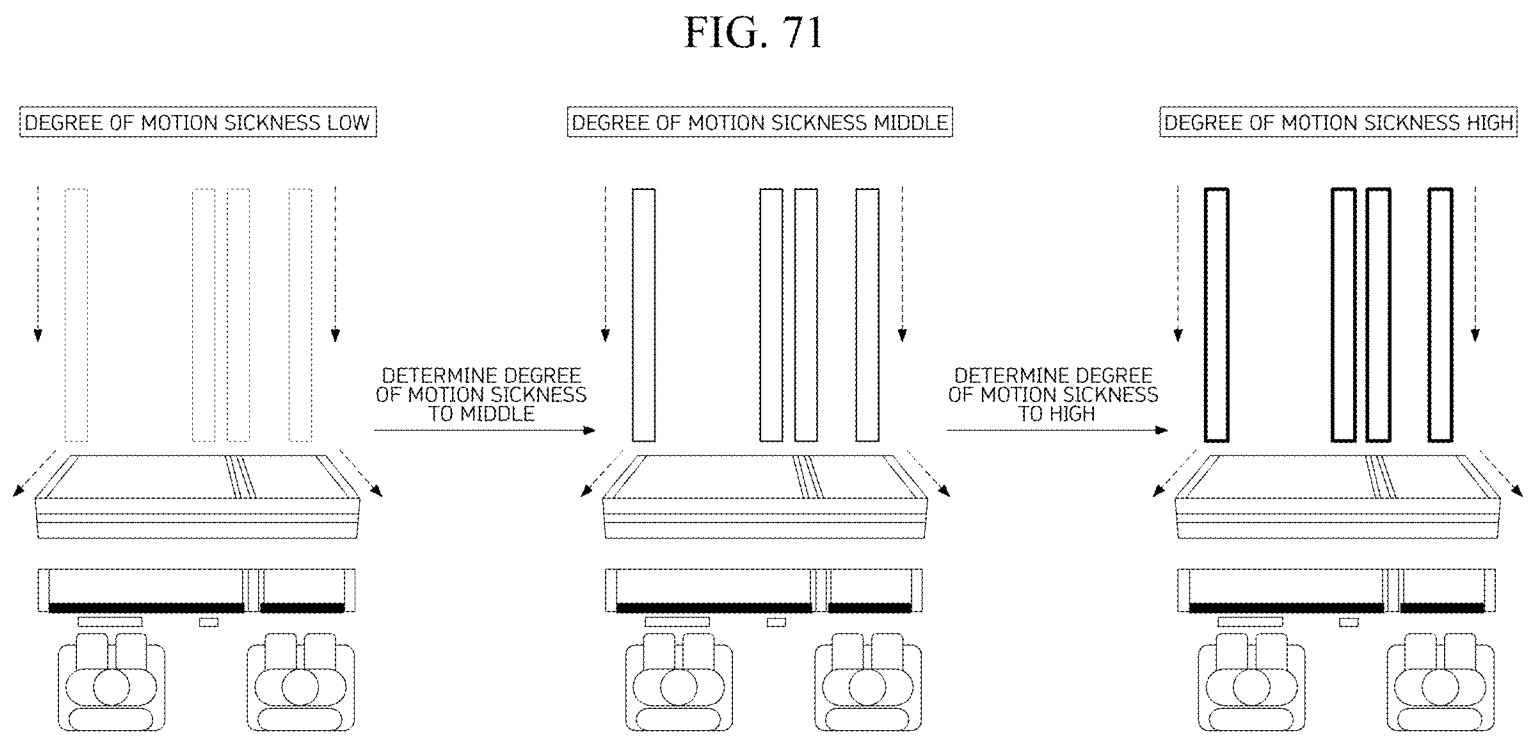

DEGREE OF MOTION SICKNESS LOW

DETERMINE DEGREE OF MOTION SICKNESS TO MIDDLE

DEGREE OF MOTION SICKNESS MIDDLE

DETERMINE DEGREE OF MOTION SICKNESS TO HIGH

DEGREE OF MOTION SICKNESS HIGH (A)                                        (B)

FIG. 80

LARGE SCREEN DISPLAY

AUXILIARY DISPLAY

OPERATION MECHANISM ASSEMBLY

INTEGRATED CONTROLLER

CONTROLLER

Figure 83:
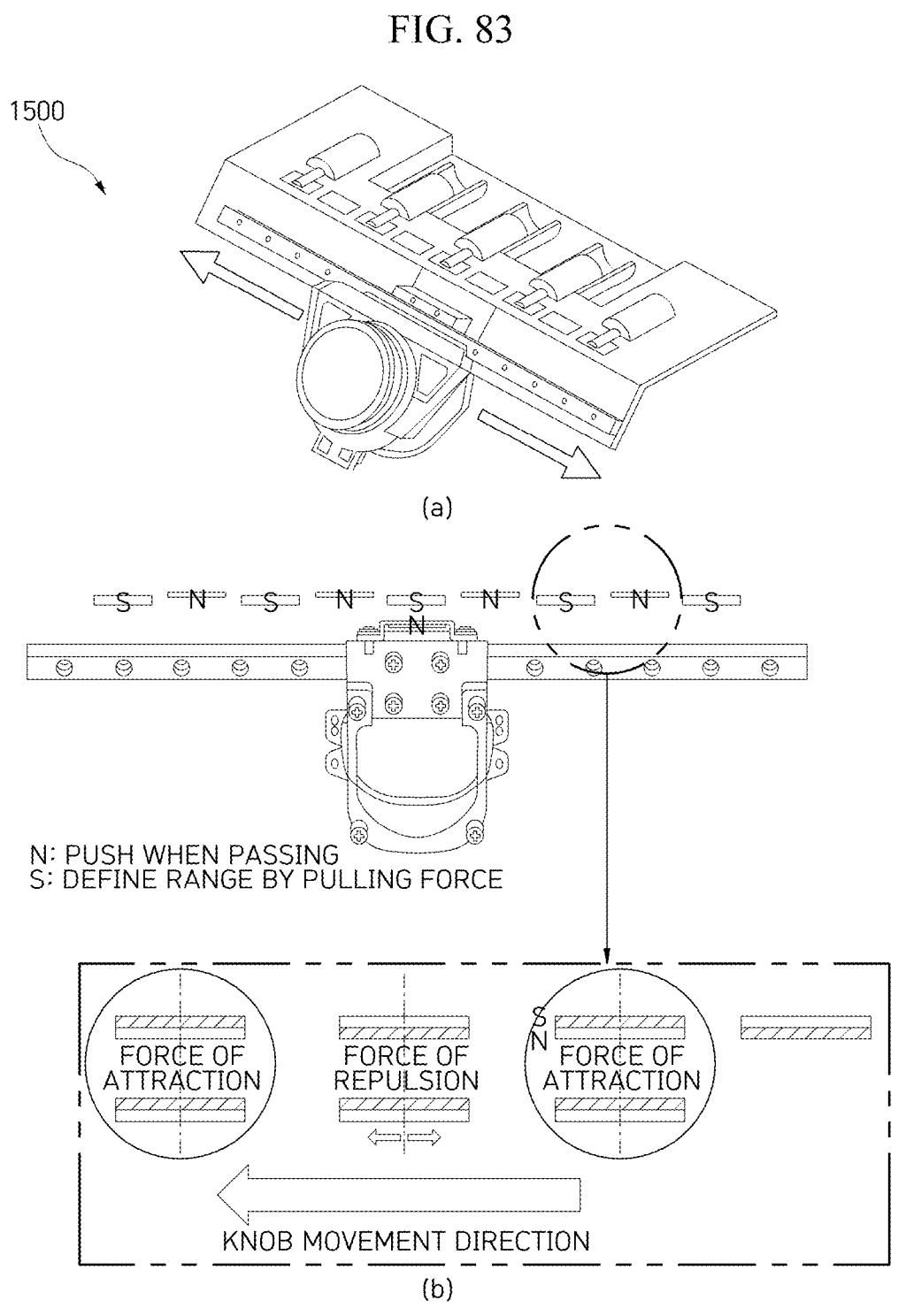

N: PUSH WHEN PASSING
S: DEFINE RANGE BY PULLING FORCE

FORCE OF ATTRACTION    FORCE OF REPULSION    FORCE OF ATTRACTION

KNOB MOVEMENT DIRECTION (b)

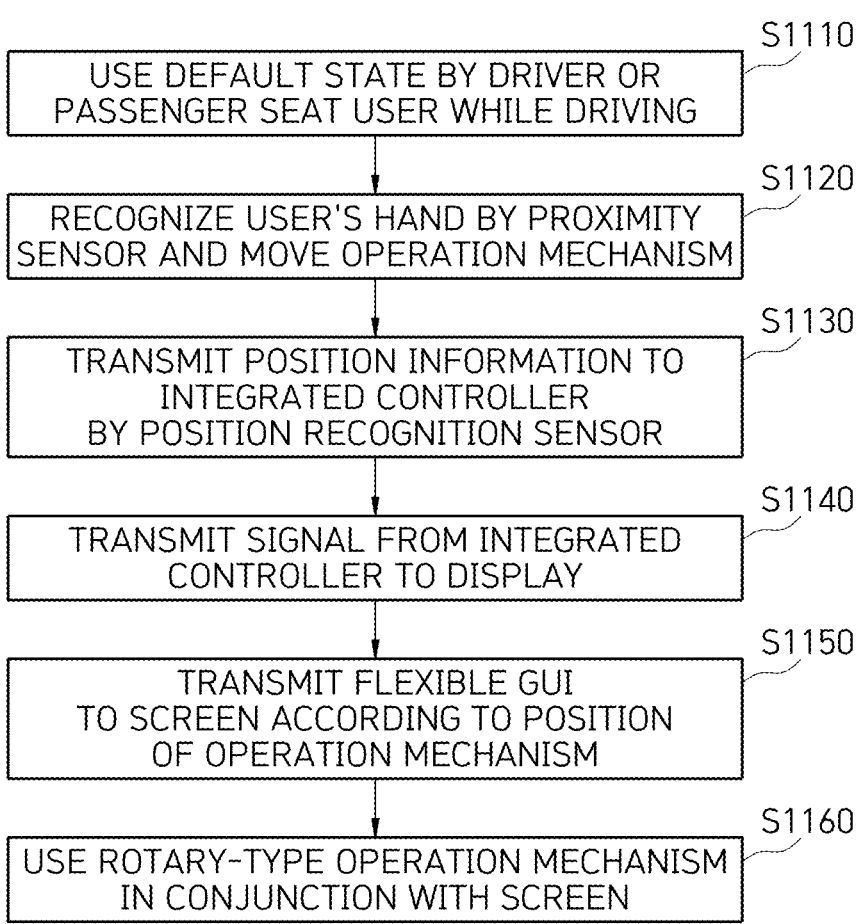

USE DEFAULT STATE BY DRIVER OR
PASSENGER SEAT USER WHILE DRIVING — S1110

RECOGNIZE USER'S HAND BY PROXIMITY
SENSOR AND MOVE OPERATION MECHANISM — S1120

TRANSMIT POSITION INFORMATION TO
INTEGRATED CONTROLLER
BY POSITION RECOGNITION SENSOR — S1130

TRANSMIT SIGNAL FROM INTEGRATED
CONTROLLER TO DISPLAY — S1140

TRANSMIT FLEXIBLE GUI
TO SCREEN ACCORDING TO POSITION
OF OPERATION MECHANISM — S1150

USE ROTARY-TYPE OPERATION MECHANISM
IN CONJUNCTION WITH SCREEN — S1160

(a)

N: PUSH WHEN PASSING
S: DEFINE RANGE BY PULLING FORCE

FORCE OF ATTRACTION   FORCE OF REPULSION   FORCE OF ATTRACTION

KNOB MOVEMENT DIRECTION (b)

LARGE SCREEN DISPLAY

AUXILIARY DISPLAY

OPERATION MECHANISM ASSEMBLY

INTEGRATED CONTROLLER

FIG. 98

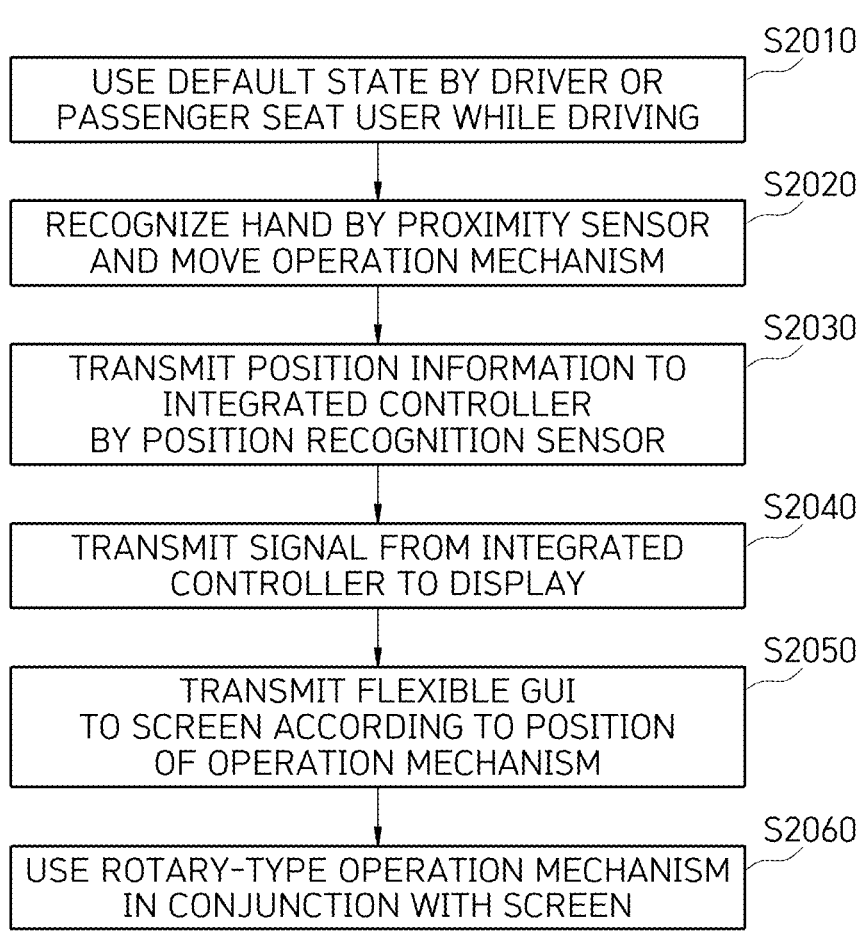

S2010
USE DEFAULT STATE BY DRIVER OR
PASSENGER SEAT USER WHILE DRIVING

S2020
RECOGNIZE HAND BY PROXIMITY SENSOR
AND MOVE OPERATION MECHANISM

S2030
TRANSMIT POSITION INFORMATION TO
INTEGRATED CONTROLLER
BY POSITION RECOGNITION SENSOR

S2040
TRANSMIT SIGNAL FROM INTEGRATED
CONTROLLER TO DISPLAY

S2050
TRANSMIT FLEXIBLE GUI
TO SCREEN ACCORDING TO POSITION
OF OPERATION MECHANISM

S2060
USE ROTARY-TYPE OPERATION MECHANISM
IN CONJUNCTION WITH SCREEN

FIG. 99

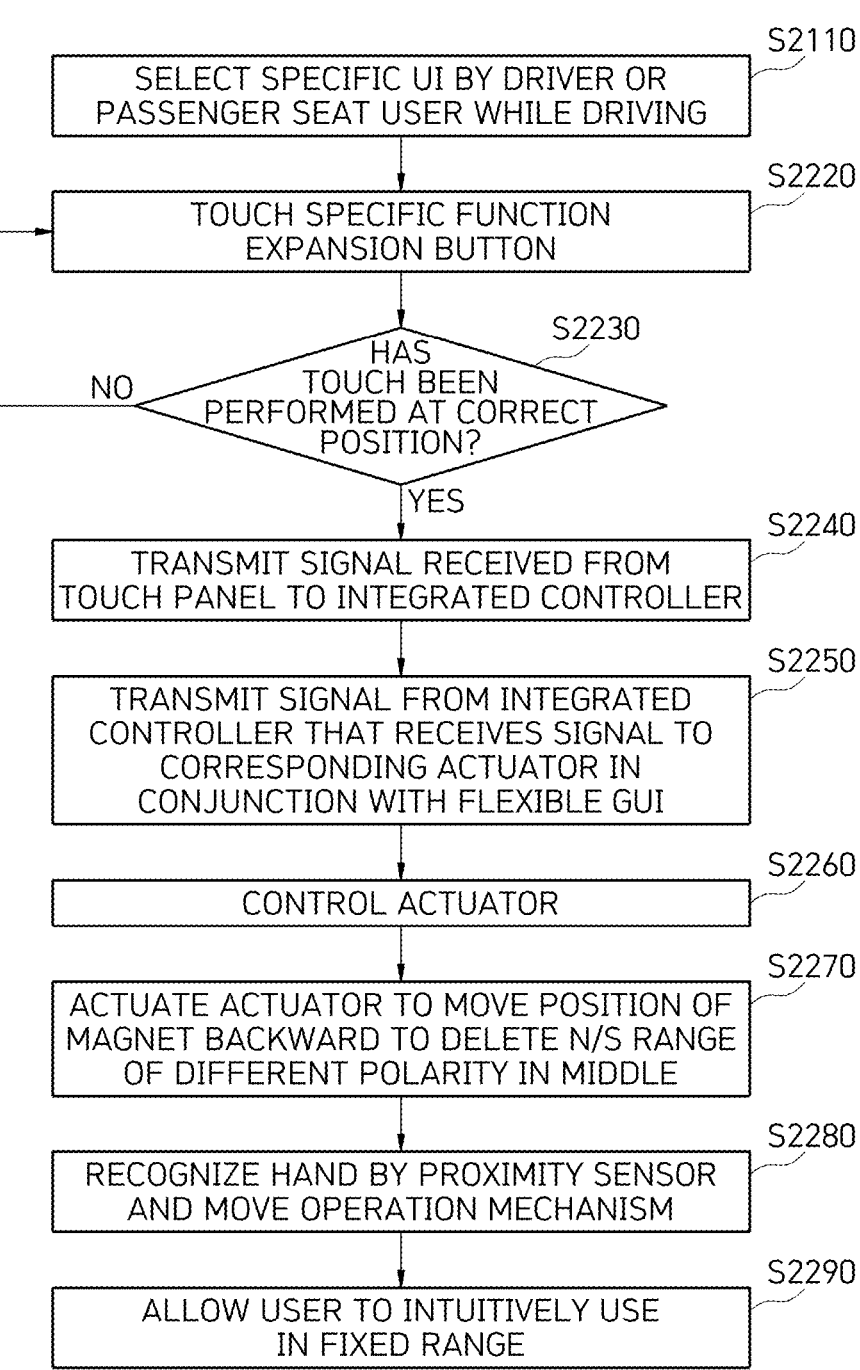

S2110
SELECT SPECIFIC UI BY DRIVER OR
PASSENGER SEAT USER WHILE DRIVING

S2220
TOUCH SPECIFIC FUNCTION
EXPANSION BUTTON

S2230
HAS
TOUCH BEEN
PERFORMED AT CORRECT
POSITION?

NO

YES

S2240
TRANSMIT SIGNAL RECEIVED FROM
TOUCH PANEL TO INTEGRATED CONTROLLER

S2250
TRANSMIT SIGNAL FROM INTEGRATED
CONTROLLER THAT RECEIVES SIGNAL TO
CORRESPONDING ACTUATOR IN
CONJUNCTION WITH FLEXIBLE GUI

S2260
CONTROL ACTUATOR

S2270
ACTUATE ACTUATOR TO MOVE POSITION OF
MAGNET BACKWARD TO DELETE N/S RANGE
OF DIFFERENT POLARITY IN MIDDLE

S2280
RECOGNIZE HAND BY PROXIMITY SENSOR
AND MOVE OPERATION MECHANISM

S2290
ALLOW USER TO INTUITIVELY USE
IN FIXED RANGE

LAYOUT CONTROL SYSTEM FOR VEHICLE MODE

CROSS-REFERENCE TO RELATED APPLICATION(S)

This application claims priority to and the benefit under 35 USC § 119 of Korean Patent Application No. 10-2023-0097020 filed on Jul. 25, 2023, Korean Patent Application No. 10-2023-0097021 filed on Jul. 25, 2023, Korean Patent Application No. 10-2023-0097026 filed on Jul. 25, 2023, and Korean Patent Application No. 10-2023-0097027 filed on Jul. 25, 2023, in the Korean Intellectual Property Office, the entire disclosures of which are incorporated herein by reference for all purposes.

BACKGROUND

1. Field

The present disclosure relates to a layout control system for each vehicle mode.

2. Description of the Related Art

Conventionally, a method has been proposed to partition areas of a display placed in a vehicle and change the content displayed in each area in response to the user's command input.

However, conventionally, there is a limitation in that automatic control functions for displays, steering wheels, and vehicle seats are not provided in each driving mode (e.g., autonomous driving mode, manual driving mode, or mode in progress of charging).

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

Various embodiments are directed to a layout control system for each vehicle mode, which is capable of increasing convenience and stability for users by automatically controlling a layout of a display, a steering wheel, and a seat in vehicle driving mode, i.e., an autonomous driving mode, a manual driving mode, a theater mode, and a relax mode.

In a general aspect of the disclosure, a layout control system for a vehicle mode, includes: an input interface configured to receive information on a vehicle driving mode; a memory configured to store a program for controlling a layout of at least one of an in-vehicle display, a steering wheel, a seat for the vehicle driving mode, or any combination thereof; and a processor electrically connected to the memory, wherein, upon execution of the program, the processor is configured to control the layout in at least one of a manual driving mode, a passenger seat entertainment display attachment mode, an operation mode during autonomous driving, a theater mode, a relax mode, or any combination thereof.

In response to the processor being configured to control the layout in the manual driving mode, the processor may be further configured to: transmit a command to cause the in-vehicle display to be in a backward state, the in-vehicle display being located in a first preset area, to cause the steering wheel to be in an out state where the steering wheel protrudes out of a cockpit; and control a position of the seat.

In response to the processor being configured to control the layout in the passenger seat entertainment display attachment mode, the processor may be further configured to transmit a command to allocate a range for controlling an operation of a passenger seat entertainment display among operating ranges of a sliding knob.

In response to the processor being configured to control the layout in the operation mode during autonomous driving, the processor may be further configured to: transmit a command to cause the in-vehicle display to be in a forward state where the in-vehicle display is located in a second preset area; and cause the steering wheel to be in an in state where the steering wheel is positioned in a cockpit.

In response to the processor being configured to control the layout in the theater mode, the processor may be further configured to: transmit a command to cause the in-vehicle display to be in a backward state where the in-vehicle display is located in a first preset area; cause the steering wheel to be in an in state where the steering wheel is stored in a cockpit; and control a position of the seat such that the distance between the seat and the in-vehicle display comprises a preset distance.

In response to the processor being configured to control the layout in the relax mode, the processor may be further configured to: transmit a command to cause the in-vehicle display to be in a backward state where the in-vehicle display is located in a first preset area; cause the steering wheel to be in an in state where the steering wheel is positioned in a cockpit; cause the distance between the seat and the in-vehicle display to be a preset distance; and control a backrest of the seat at a preset angle.

The processor may be further configured to: automatically convert the vehicle driving mode based on driving situation monitoring information; and transmit a command to control the layout of the in-vehicle display, the steering wheel, and the seat in response to the converted mode.

In another general aspect of the disclosure, a method for a layout control system for a vehicle mode, includes: receiving information on a vehicle driving mode; storing a program in memory for controlling a layout of at least one of an in-vehicle display, a steering wheel, a seat for the vehicle driving mode, or any combination thereof; and upon execution of the program, controlling the layout in at least one of a manual driving mode, a passenger seat entertainment display attachment mode, an operation mode during autonomous driving, a theater mode, a relax mode, or any combination thereof.

In response to the controlling of the layout in the manual driving mode, the method may further comprise: transmitting a command to cause the in-vehicle display to be in a backward state, the in-vehicle display being located in a first preset area, to cause the steering wheel to be in an out state where the steering wheel protrudes out of a cockpit; and controlling a position of the seat.

In response to the controlling of the layout in the passenger seat entertainment display attachment mode, the method may further comprise transmitting a command to allocate a range for controlling an operation of a passenger seat entertainment display among operating ranges of a sliding knob.

In response to the controlling of the layout in the operation mode during autonomous driving, the method may further comprise: transmitting a command to cause the in-vehicle display to be in a forward state where the in-vehicle display is located in a second preset area; and causing the steering wheel to be in an in state where the steering wheel is positioned in a cockpit.

In response to the controlling of the layout in the theater mode, the method may further comprise: transmitting a command to cause the in-vehicle display to be in a backward state where the in-vehicle display is located in a first preset area; causing the steering wheel to be in an in state where the steering wheel is stored in a cockpit; and controlling a position of the seat such that the distance between the seat and the in-vehicle display comprises a preset distance.

In response to the controlling of the layout in the relax mode, the method may further comprise: transmitting a command to cause the in-vehicle display to be in a backward state where the in-vehicle display is located in a first preset area; causing the steering wheel to be in an in state where the steering wheel is positioned in a cockpit; causing the distance between the seat and the in-vehicle display to be a preset distance; and controlling a backrest of the seat at a preset angle.

The method may further comprise: automatically converting the vehicle driving mode based on driving situation monitoring information; and transmitting a command to control the layout of the in-vehicle display, the steering wheel, and the seat in response to the converted mode.

BRIEF DESCRIPTION OF THE DRAWINGS

FIG. 4 illustrates a layout for each mode according to the embodiment of the present disclosure.

FIG. 5 illustrates a specific state of the layout for each mode according to the embodiment of the present disclosure.

FIG. 7 illustrates a definition of moving at the time of mode conversion according to the embodiment of the present disclosure.

FIG. 9 illustrates a process of change in mode from manual driving to autonomous driving according to the embodiment of the present disclosure.

FIG. 12 illustrates a process of display movement according to the embodiment of the present disclosure.

FIG. 15 illustrates a button function on the mode conversion pop-up according to another embodiment of the present disclosure.

FIG. 22 illustrates knob control depending on the detachment of the passenger seat entertainment display according to still another embodiment of the present disclosure.

FIG. 23 illustrates knob control depending on the autonomous driving mode conversion according to still another embodiment of the present disclosure.

FIG. 27 illustrates knob's automatic movement by the autonomous driving mode conversion according to still another embodiment of the present disclosure.

FIG. 28 illustrates a process of knob's automatic movement by the detachment of the passenger seat entertainment display according to still another embodiment of the present disclosure.

FIG. 31 illustrates a display and knob layout in manual driving mode according to yet another embodiment of the present disclosure.

FIG. 35 illustrates a display and knob layout in autonomous driving mode according to yet another embodiment of the present disclosure.

FIG. 40 illustrates a definition of knob operation in the manual driving mode according to still yet another embodiment of the present disclosure.

FIG. 43 illustrates a definition of knob operation in the autonomous driving mode according to still yet another embodiment of the present disclosure.

FIG. 48 illustrates knob operating range maintenance in the manual driving mode according to still yet another embodiment of the present disclosure.

FIG. 49 illustrates a process of resizing apps on a passenger seat entertainment display according to still yet another embodiment of the present disclosure.

FIG. 52 illustrates a configuration of the in-vehicle display to display the current knob position according to the further embodiment of the present disclosure.

FIG. 54 illustrates a process of displaying knob position information using ambient light according to the further embodiment of the present disclosure.

FIG. 56 illustrates a display control screen in 1×1 and 2×1 modes according to another further embodiment of the present disclosure.

FIG. 57 illustrates a configuration of the display control screen according to another further embodiment of the present disclosure.

FIG. 59 illustrates a configuration of the display control screen according to another further embodiment of the present disclosure.

FIG. 63 illustrates a screen configuration of an interior application according to still another further embodiment of the present disclosure.

FIG. 64 illustrates a sync screen of the interior application according to still another further embodiment of the present disclosure.

FIG. 65 illustrates ambient light according to still another further embodiment of the present disclosure.

FIG. 69 illustrates mood lamp control using driving information according to still another further embodiment of the present disclosure.

FIG. 70 illustrates ambient light control for mitigating motion sickness linked to rotation according to still another further embodiment of the present disclosure.

FIG. 71 illustrates ambient light control considering the degree of motion sickness according to still another further embodiment of the present disclosure.

FIG. 80 is a view for explaining an internal configuration of a moving vehicle according to the embodiment of the present disclosure.

FIGS. 82 and 83 are views for explaining an operation of the console operation device using solenoids according to the embodiment of the present disclosure.

FIG. 85 is a diagram for explaining display control division of the console operation device using solenoids according to the embodiment of the present disclosure.

FIGS. 86 to 88 are views for explaining control of operation mechanism of the console operation device using solenoids according to the embodiment of the present disclosure.

FIG. 89 is a flowchart for explaining a basic operation method of the console operation device using solenoids according to the embodiment of the present disclosure.

FIG. 98 is a flowchart for explaining a basic operation method of the console operation device using actuators according to the embodiment of the present disclosure.

FIG. 99 is a flowchart for explaining a method of limiting and controlling the operation mechanism of the console operation device using actuators according to the embodiment of the present disclosure.

DETAILED DESCRIPTION

The above and other objects, advantages, and features of the present disclosure and methods of achieving them will become apparent with reference to the embodiments described below in detail in conjunction with the accompanying drawings.

The present disclosure may, however, be embodied in different forms and should not be construed as limited to the embodiments set forth herein. The following embodiments are provided solely to facilitate the purpose, configuration and effect of the disclosure to those of ordinary skill in the art to which the present disclosure pertains, and the scope of the present disclosure is defined by the appended claims.

Meanwhile, the terms used herein are for the purpose of describing the embodiments and are not intended to limit the disclosure. As used herein, the singular forms "a", "an" and "the" are intended to include the plural forms as well, unless context clearly indicates otherwise. It will be understood that the terms "comprises"/"includes" and/or "comprising"/ "including" when used in the specification, specify the presence of stated components, steps, motions, and/or elements, but do not preclude the presence or addition of one or more other components, steps, motions, and/or elements.

Figure 1:
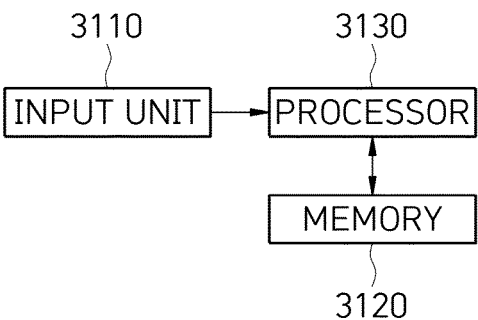
FIG. 1 illustrates a layout control system for each vehicle mode according to an embodiment of the present disclosure.

FIG. 1 illustrates a layout control system for each vehicle mode according to an embodiment of the present disclosure.

Referring to FIG. 1, the layout control system for each vehicle mode according to the embodiment of the present disclosure includes an input unit 3110 that receives information on a vehicle driving mode, a memory 3120 that stores a program for controlling the layout of at least one of an in-vehicle display, a steering wheel, and a seat for the vehicle driving mode, and a processor 3130 that executes the program. The processor 3130 transmits a command to control the layout in at least one of a manual driving mode, a passenger seat entertainment display attachment mode, an operation mode during autonomous driving, a theater mode, and a relax mode.

When the processor 3130 is intended to control the layout in the manual driving mode, the processor 3130 transmits the command to cause the in-vehicle display to be in a backward state where it is located in a first preset area, to cause the steering wheel to be in an out state where it protrudes out of the cockpit, and to control the position of the seat.

When the processor 3130 is intended to control the layout in the passenger seat entertainment display attachment mode, the processor 3130 transmits the command to allocate a range for controlling the operation of the passenger seat entertainment display among the operating ranges of the sliding knob.

When the processor 3130 is intended to control the layout in the operation mode during autonomous driving, the processor 3130 transmits the command to cause the in-vehicle display to be in a forward state where it is located in a second preset area and to cause the steering wheel to be in an in state where it is stored in the cockpit.

When the processor 3130 is intended to control the layout in the theater mode, the processor 3130 transmits the command to cause the in-vehicle display to be in the backward state where it is located in the first preset area, to cause the steering wheel to be in the in state where it is stored in the cockpit, and to control the position of the seat such that the distance between the seat and the in-vehicle display is a preset distance.

When the processor 3130 is intended to control the layout in the relax mode, the processor 3130 transmits the command to cause the in-vehicle display to be in the backward state where it is located in the first preset area, to cause the steering wheel to be in the in state where it is stored in the cockpit, to cause the distance between the seat and the in-vehicle display to be a preset distance, and to control the backrest of the seat at a preset angle.

The processor 3130 automatically converts the vehicle driving mode based on the driving situation monitoring information and transmits the command to control the layout of the in-vehicle display, steering wheel, and seat in response to the converted mode.

Figure 2:
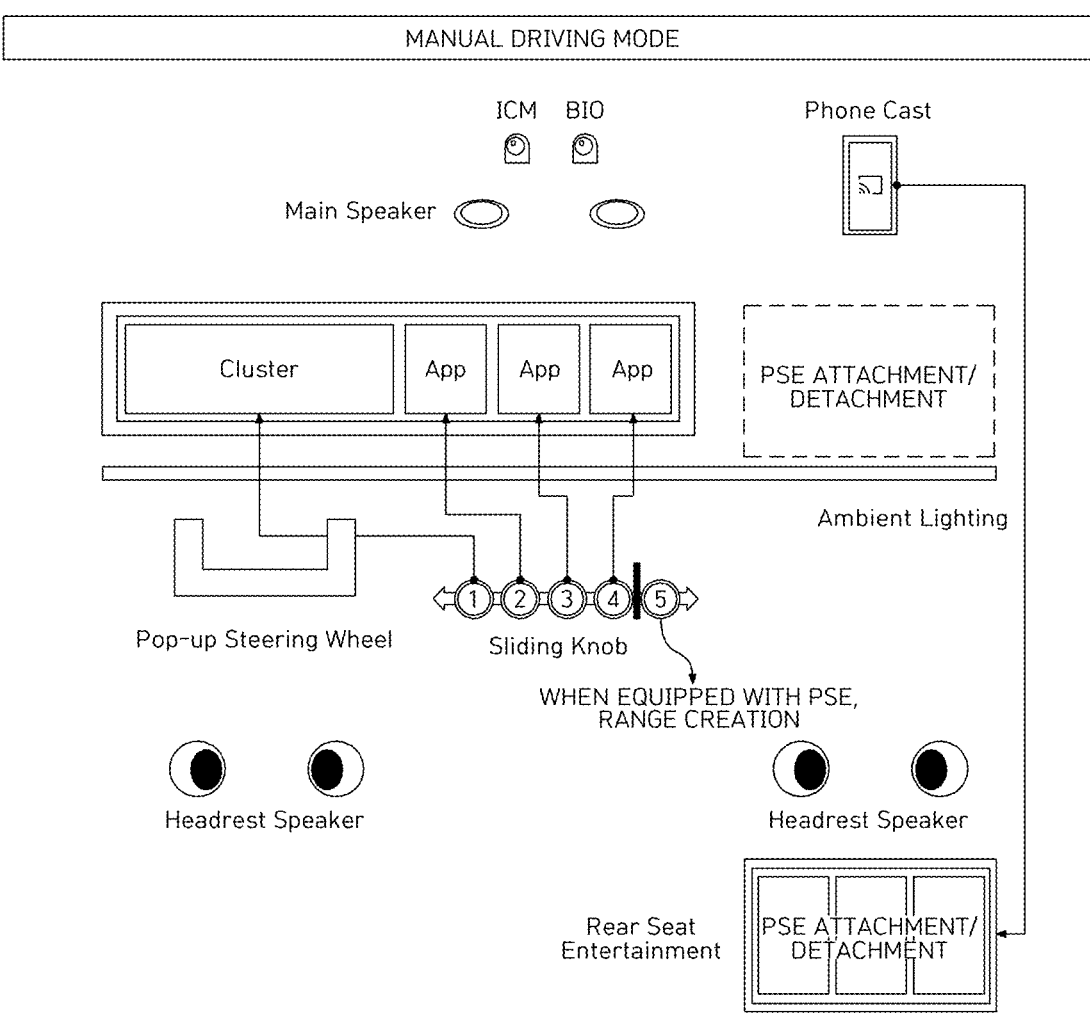
FIG. 2 illustrates a configuration in manual driving mode according to the embodiment of the present disclosure.

FIG. 2 illustrates a configuration in the manual driving mode according to the embodiment of the present disclosure.

In the manual driving mode, the pop-up steering wheel protrudes from the cockpit to be in the out state, the driver seat display is divided into a cluster area and an app area to display content, and the sliding knob has an operating area defined to correspond to each area of the driver seat display. The passenger seat entertainment (PSE) display may be connected to a phone, and may be placed in the preset area on the passenger seat and rear seat as a single display regardless of the manual driving or autonomous driving.

Figure 3:
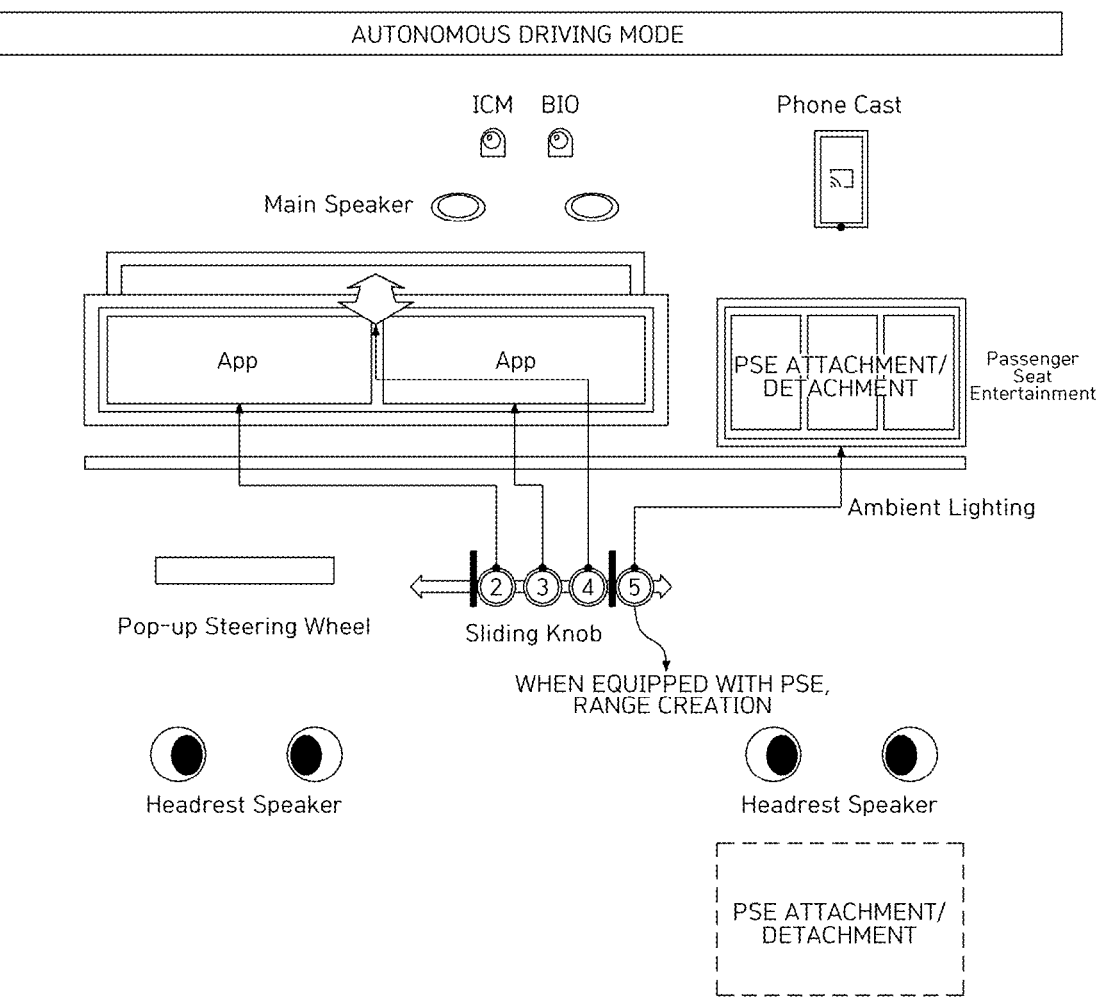
FIG. 3 illustrates a configuration in autonomous driving mode according to the embodiment of the present disclosure.

FIG. 3 illustrates a configuration in the autonomous driving mode according to the embodiment of the present disclosure.

In the autonomous driving mode, the pop-up steering wheel is stored in the cockpit to be in the in state, and the driver seat display is moved from the first preset area (backward state) to the second preset area (forward state) and is divided into an app area to display content As the passenger seat entertainment display is installed, the operating range of the sliding knob is changed to correspond to each area of the driver seat display and the area of the passenger seat entertainment display.

Figure 4:
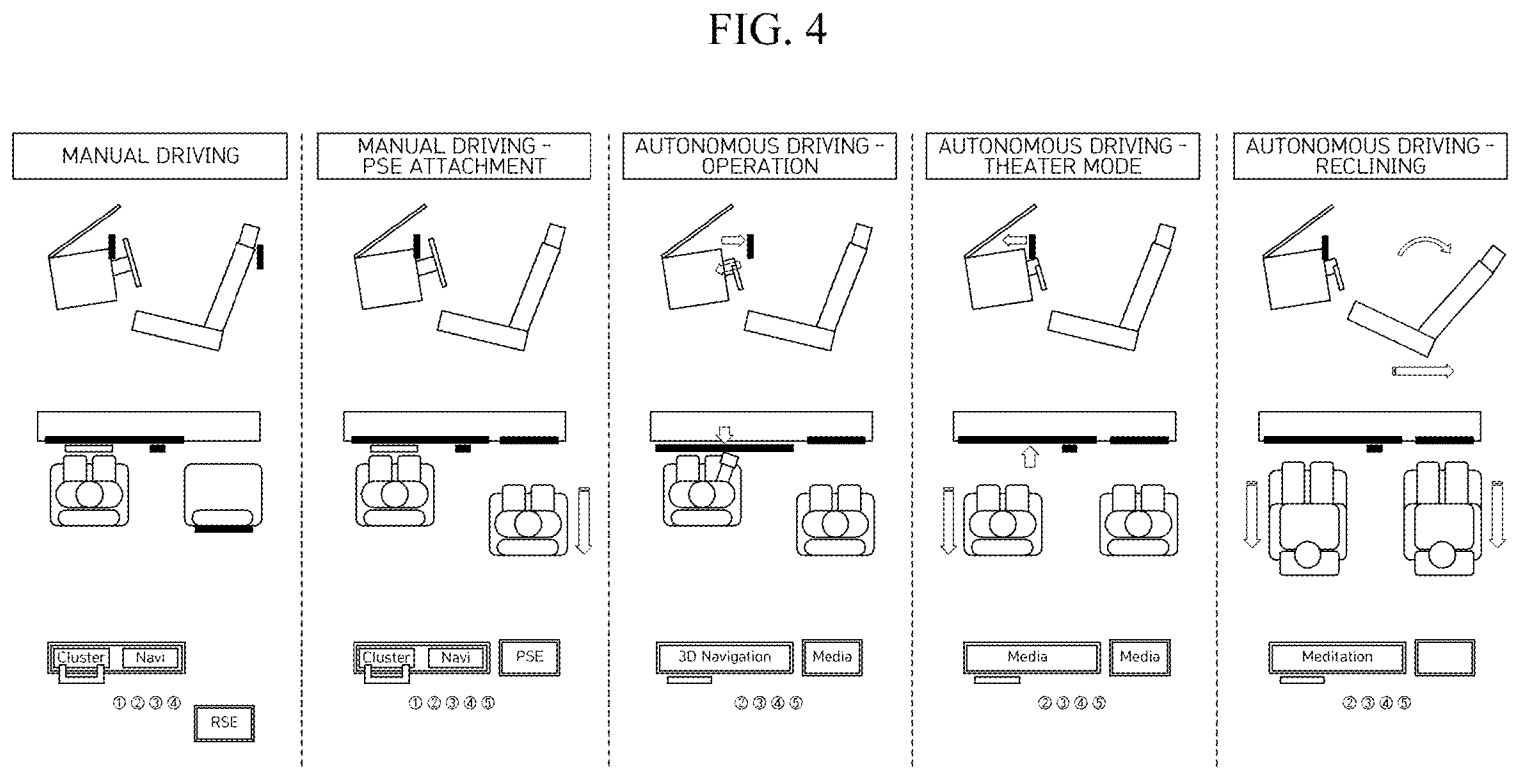

FIG. 4 illustrates the layout for each mode according to the embodiment of the present disclosure. FIG. 5 illustrates a specific state of the layout for each mode according to the embodiment of the present disclosure.

The driver and passenger seats may be individually controllable, and the in-vehicle display (driver seat display) is moved forward and backward in conjunction with the in/out of the steering wheel. The driver and passenger seats may be individually controllable through an app on a smartphone connected thereto.

The manual driving mode is a mode established by the driver for directly driving. The in-vehicle display is controlled to be in the backward state where it is located in the first preset area, and the steering wheel is controlled to be in the out state where it protrudes out of the cockpit.

When the passenger seat entertainment display is installed in the manual driving mode, the in-vehicle display (driver seat display) is controlled to be in the backward state where it is located in the first preset area, the steering wheel is controlled to be in the out state where it protrudes out of the cockpit, the passenger seat is controlled to move away from the passenger seat entertainment display or to adjust the backrest angle thereof.

In the operation mode during autonomous driving, the in-vehicle display (driver seat display) is controlled to be in the forward state where it is located in the second preset area, so that the in-vehicle display, compared to the manual driving mode, is moved toward the driver seat to be close enough to reach the hand, making it easier to operate, and the steering wheel is controlled to be in the in state where it is stored in the cockpit.

In the theater mode (which is a mode used during charging or autonomous driving), the in-vehicle display (driver seat display) is controlled to be in the backward state where it is located in the first preset area, the steering wheel is controlled to be in the in state where it is stored in the cockpit, and the driver seat is controlled to move away from the in-vehicle display or to adjust the backrest angle thereof.

In the relax mode, the in-vehicle display is controlled to be in the backward state where it is located in the first preset area, the steering wheel is controlled to be in the in state where it is stored in the cockpit, and the driver seat and passenger seat are moved backward to be spaced apart from the display placement area by a preset distance or the backrest angle of each thereof are changed to a preset angle. For example, the position of the seat is changed to a weightless state, making it a mode that is convenient for rest.

Figure 6:
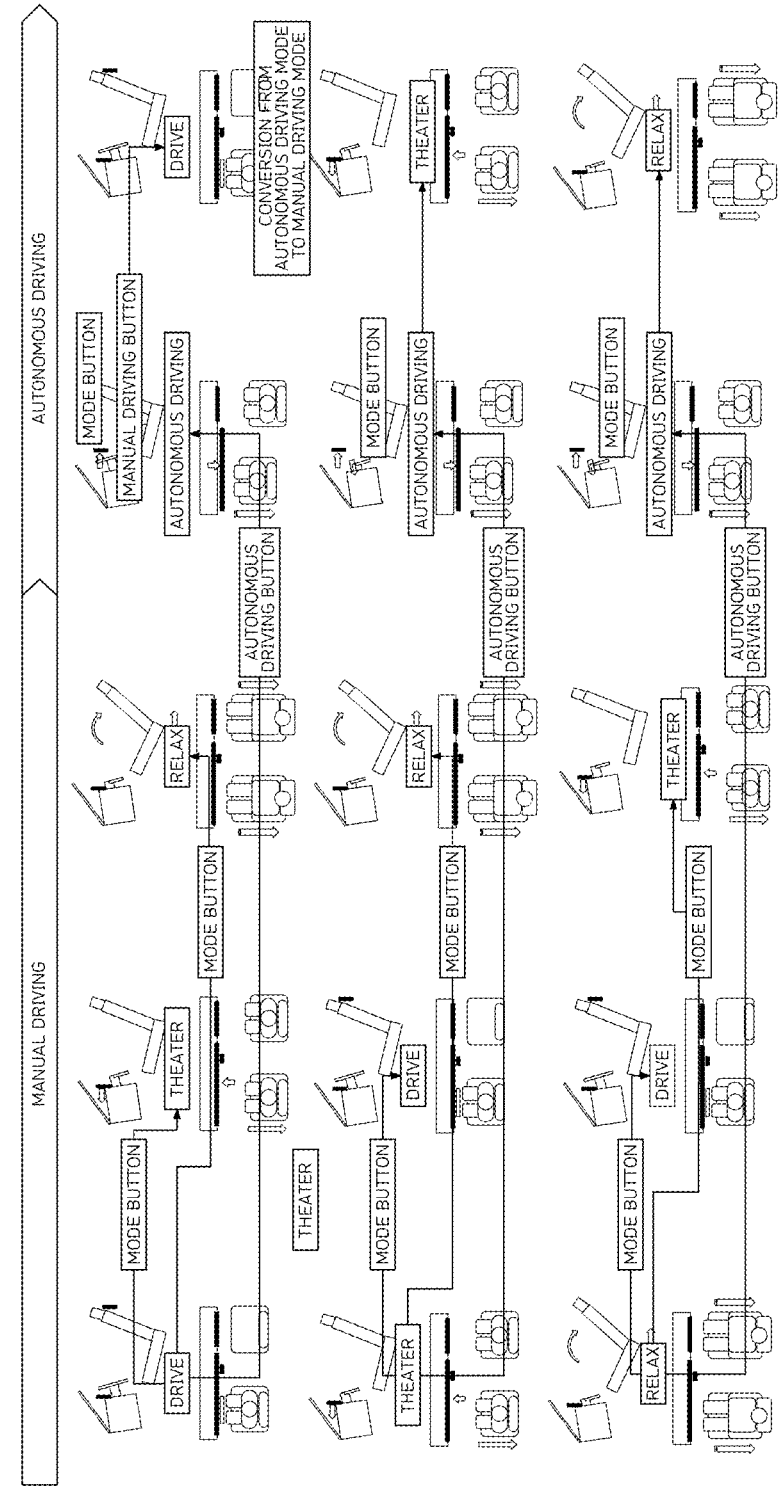
FIG. 6 illustrates conversion between modes according to the embodiment of the present disclosure.

FIG. 6 illustrates conversion between modes according to the embodiment of the present disclosure. FIG. 7 illustrates a definition of moving at the time of mode conversion according to the embodiment of the present disclosure.

IN in the display means that the display is controlled to be in the backward state where it is located in the first preset area, and OUT in the display means that the display is controlled to be in the forward state where it is located in the second preset area.

OUT in the S/W means that the pop-up steering wheel protrudes out of the cockpit, and IN in the S/W means that the pop-up steering wheel is stored in the cockpit.

The positioning of the seat is controlled for each driving mode, and the distance between the seat and the front display placement area, the backrest angle of the seat, and the like are controlled.

Figure 8:
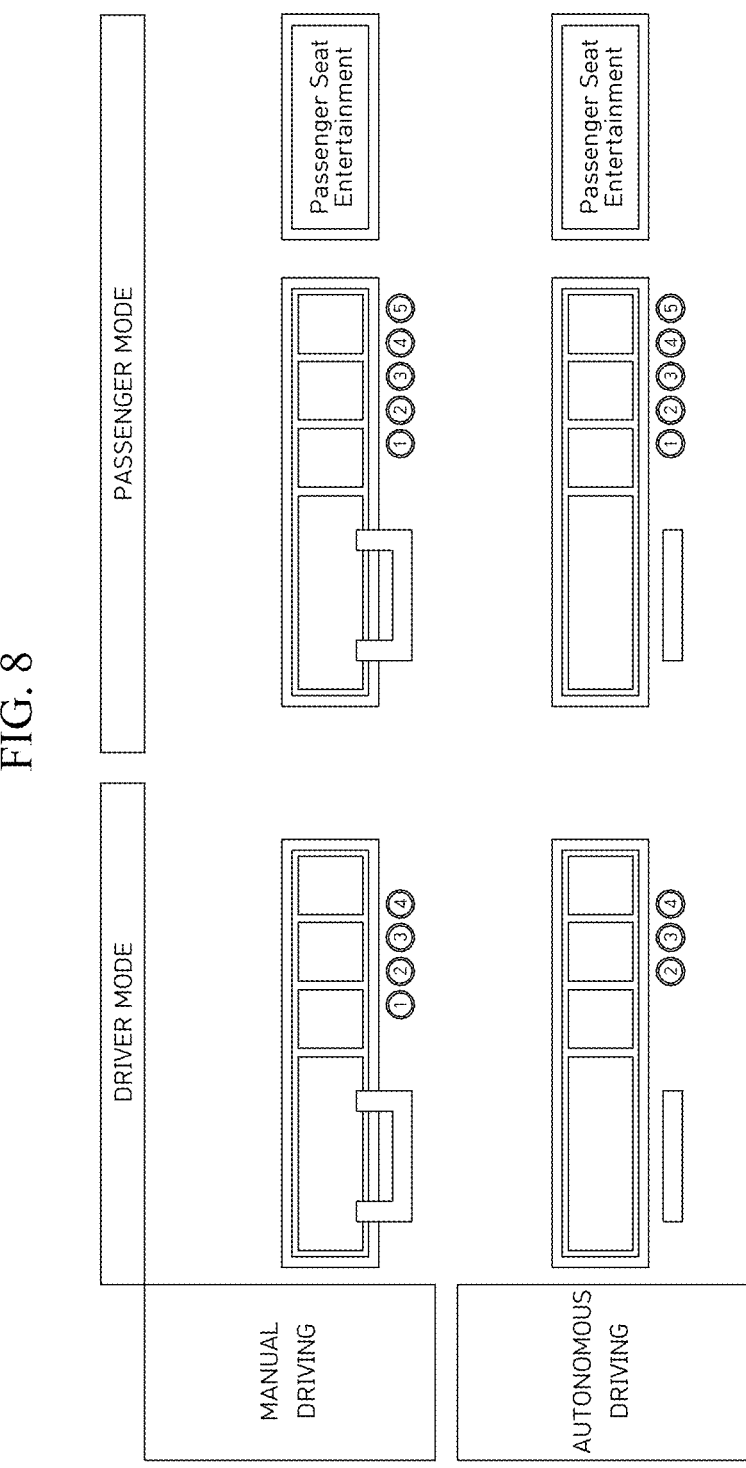
FIG. 8 illustrates conversion between manual driving and autonomous driving according to the embodiment of the present disclosure.

FIG. 8 illustrates conversion between manual driving and autonomous driving according to the embodiment of the present disclosure.

The pop-up steering wheel remains in the out state in the manual driving mode, and the pop-up steering wheel remains in the in state in the autonomous driving mode.

In the driver mode, the driving area of the sliding knob is set to correspond to each partitioned area of the in-vehicle display (driver seat display). On the other hand, in the passenger mode, the driving area of the sliding knob is set to correspond to each partitioned area of the in-vehicle display (driver seat display) and passenger seat entertainment.

FIG. 9 illustrates a process of change in mode from manual driving to autonomous driving according to the embodiment of the present disclosure.

It is activated by touching the AUTO button, and when the CONFIRM button is touched, the pop-up disappears and it is converted to the autonomous driving mode.

In the process of mode conversion, the steering wheel is operated backward and stored in the cockpit, and when the backward operation of the steering wheel is completed, the in-vehicle display is moved to be in the forward state where it is located in the second preset area, and the transition animation is played.

When the forward operation of the in-vehicle display is completed, the distance between the in-vehicle display and the driver is narrowed, increasing the convenience of operation.

Figure 10:
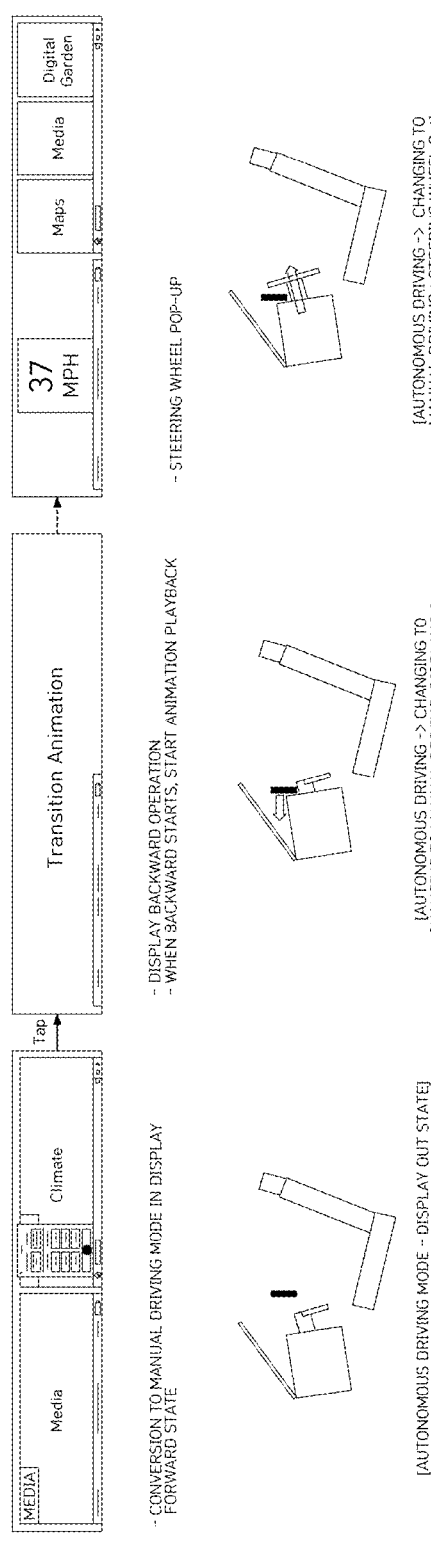
FIG. 10 illustrates a process of change in mode from autonomous driving to manual driving (display forward state) according to the embodiment of the present disclosure.

FIG. 10 illustrates a process of change in mode from autonomous driving to manual driving (display forward state) according to the embodiment of the present disclosure.

In the process of mode conversion, the in-vehicle display is moved from the second preset area to the first preset area to be in the backward state, and the transition animation is played when the backward operation starts.

When the backward operation of the in-vehicle display is completed, the steering wheel pops up from inside the cockpit to be in the out state.

Figure 11:
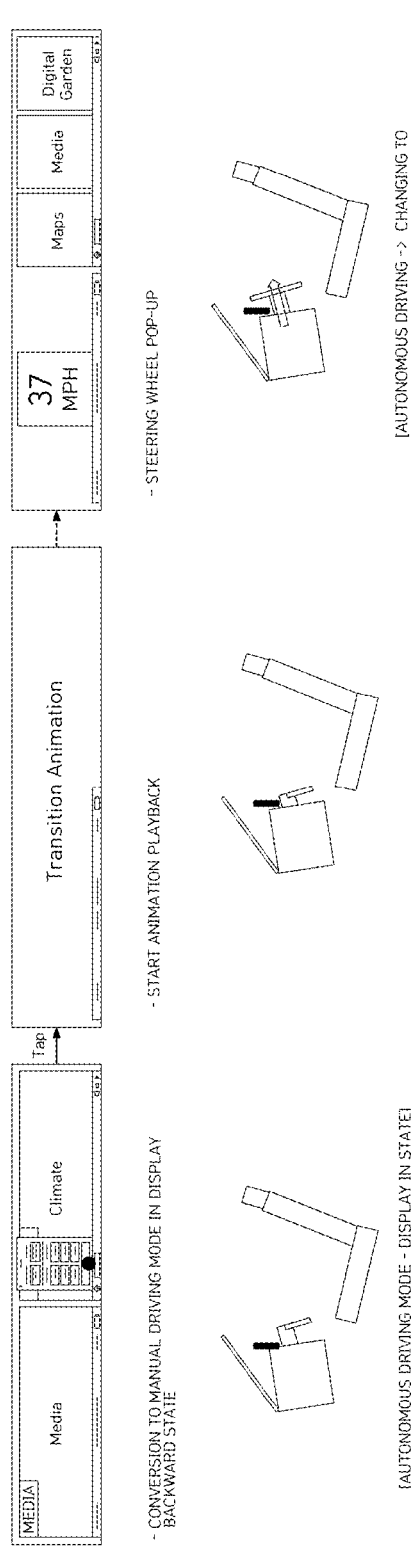
FIG. 11 illustrates a process of change in mode from autonomous driving to manual driving (display backward state) according to the embodiment of the present disclosure.

FIG. 11 illustrates a process of change in mode from autonomous driving to manual driving (display backward state) according to the embodiment of the present disclosure.

In the process of mode conversion, since the in-vehicle display remains in the backward state in the first preset area, the transition animation is played, and the steering wheel pops up from inside the cockpit to be in the out state.

FIG. 12 illustrates a process of display movement according to the embodiment of the present disclosure.

When the moving display button is touched, the in-vehicle display is moved forward toward the driver seat, increasing the driver's convenience of operation. When the moving display button is touched again, the in-vehicle display is moved backward toward the windshield.

Figure 13:
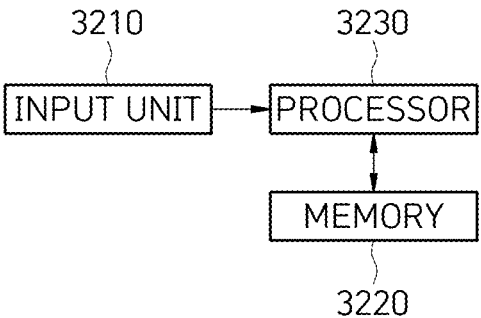
FIG. 13 illustrates a pop-up control system with regard to vehicle mode conversion according to another embodiment of the present disclosure.

FIG. 13 illustrates a pop-up control system with regard to vehicle mode conversion according to another embodiment of the present disclosure.

The pop-up control system with regard to vehicle mode conversion according to another embodiment of the present disclosure includes an input unit 3210 that receives input information on a vehicle driving mode, a memory 3220 that stores a program for performing display pop-up control for conversion of the vehicle driving mode based on the input information, and a processor 3230 that executes the program. The processor 3230 controls a pop-up menu for moving an in-vehicle display to be activated and displayed when converting from manual driving mode to autonomous driving mode.

When a passenger seat entertainment display is installed in the manual driving mode, the processor 3230 controls a pop-up menu for selecting a detailed driving mode in the passenger seat to be displayed on the passenger seat entertainment display or the screen of a smartphone communicatively connected thereto.

When the pop-up menu for moving the in-vehicle display is selected, the processor 3230 transmits a command to move the in-vehicle display within the driver's arm length area in consideration of the convenience of operation during autonomous driving.

The processor 3230 allocates driving mode control rights when a pop-up is executed by the driver seated in the driver seat, but does not allocate driving mode control rights when a pop-up is executed by the passenger seated in the passenger seat.

The processor 3230 transmits a display control command to activate a pop-up menu for setting the level of the autonomous driving mode.

When converting to the manual driving mode, the processor 3230 transmits a display control command to deactivate the pop-up menu for moving the in-vehicle display.

Figure 14:
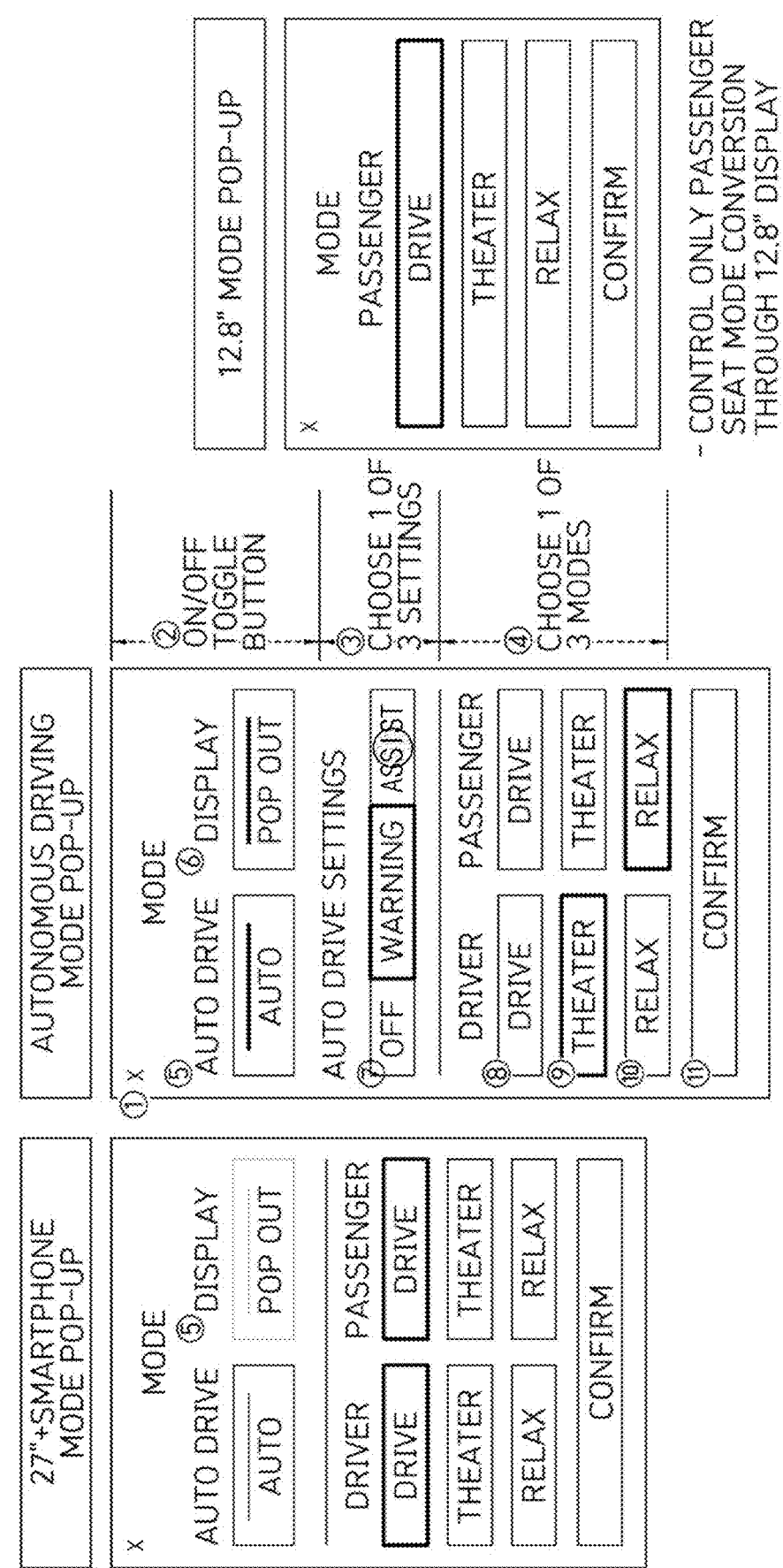
FIG. 14 illustrates a mode conversion pop-up screen according to another embodiment of the present disclosure.
Figure 16:
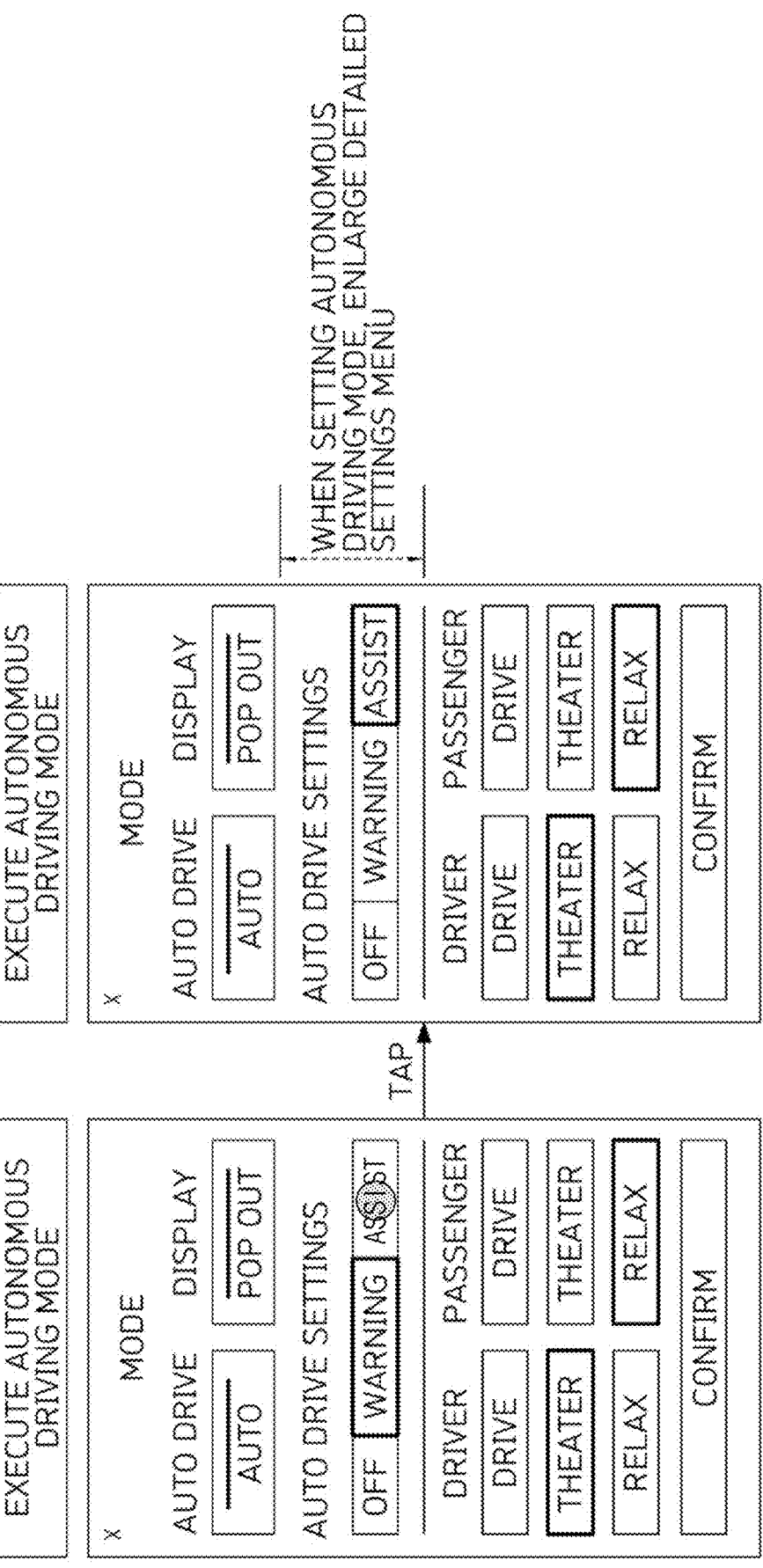
FIG. 16 illustrates a pop-up screen in autonomous driving mode operation according to another embodiment of the present disclosure.

FIG. 14 illustrates a mode conversion pop-up screen according to another embodiment of the present disclosure. FIG. 15 illustrates a button function on the mode conversion pop-up according to another embodiment of the present disclosure. FIG. 16 illustrates a pop-up screen in autonomous driving mode operation according to another embodiment of the present disclosure.

The driver seat, passenger seat, and autonomous driving mode conversion may be controllable through the in-vehicle display (driver seat display) and the smartphone.

The passenger seat mode conversion may be controllable through the passenger seat entertainment display.

1 refers to the [X] button. When the button is touched, the pop-up is closed.

2 refers to the autonomous driving toggle button. The toggle button is operated for conversion between autonomous driving ON and OFF, and the toggle button is operated for display IN and OUT. When the [CONFIRM] button at the bottom of the pop-up is touched, the corresponding mode is reflected.

3 refers to the autonomous driving setting button. When the autonomous driving is turned on, the corresponding setting menu is displayed. The autonomous driving mode may be set to an autonomous driving level such as OFF, Warning, or Assist.

4 refers to the mode radio button. Three mode selection buttons are provided on each of the driver seat and the passenger seat. When the [CONFIRM] button at the bottom of the pop-up is touched, the corresponding mode is reflected.

5 refers to the autonomous driving button. The autonomous driving ON/OFF toggle button is operated.

6 refers to the display movement button. That button is dimmed when the autonomous driving is turned off, and the display movement button is automatically turned on when the autonomous driving is turned on.

7 refers to the autonomous driving setting button, which may be set to a level such as OFF, Warning, or Assist.

8 refers to the DRIVE mode button, 9 refers to the THEATER mode button, and 10 refers to the RELAX mode button. When the button is touched, the layout control of the steering wheel, display, and seat position for the corresponding mode is performed.

11 refers to the CONFIRM button. When the button is touched, the mode in the pop-up is reflected. When the autonomous driving is in an ON state, the seat mode is not applied.

Figure 17:
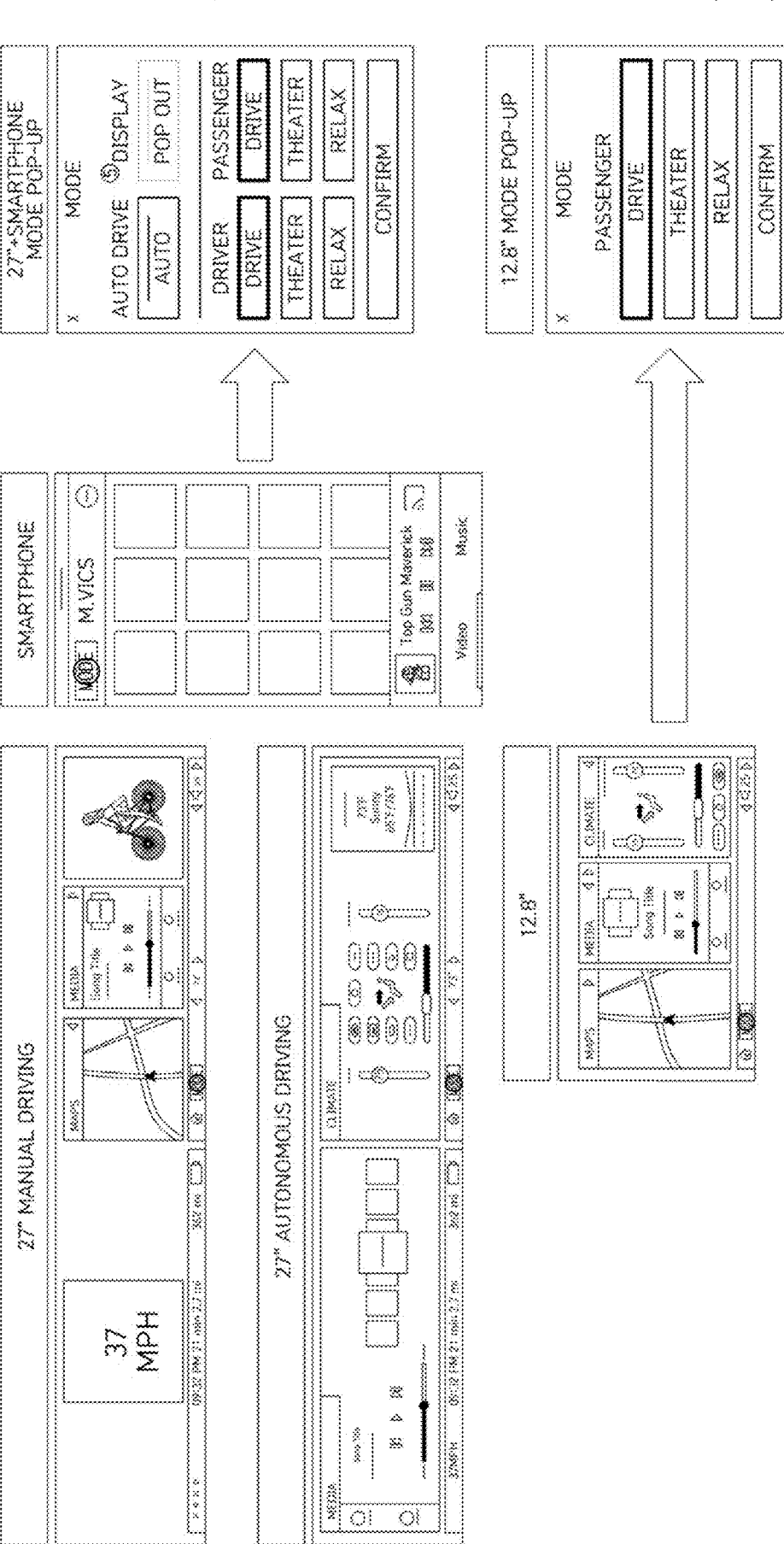
FIG. 17 illustrates a pop-up call process on an in-vehicle display, passenger seat entertainment display, and smartphone according to another embodiment of the present disclosure.

FIG. 17 illustrates a pop-up call process on the in-vehicle display, passenger seat entertainment display, and smartphone according to another embodiment of the present disclosure.

FIG. 17 illustrates the in-vehicle display during manual driving, the in-vehicle display during autonomous driving, the passenger seat entertainment display, and the mode pop-up entry path on the smartphone.

Figure 18:
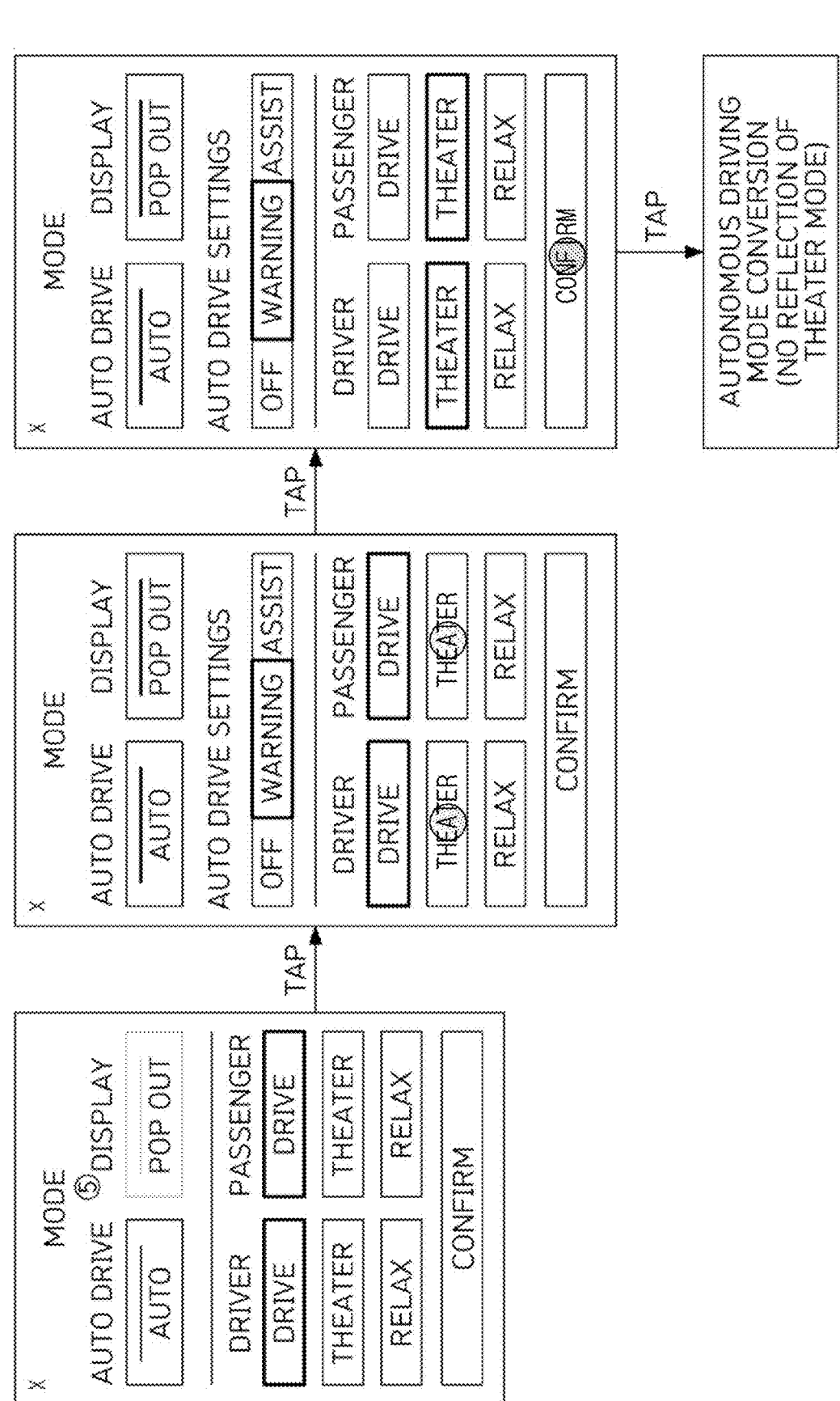
FIG. 18 illustrates a mode conversion pop-up process according to another embodiment of the present disclosure.

FIG. 18 illustrates a mode conversion pop-up process according to another embodiment of the present disclosure.

When the AUTO button is turned off, it enters the manual driving mode so that the display POP UP button is deactivated. When the AUTO button is touched and turned on, the POP OUT button is automatically activated.

If the POP OUT button is touched and turned off when the autonomous driving mode is confirmed and the mode change is not completed, the AUTO button is automatically turned off.

One of the seat modes may be selected on each of the driver seat and the passenger seat. When the seat mode is selected and the CONFIRM is then completed, the mode is applied.

When the CONFIRM button is touched, the function set in the pop-up is executed. When the autonomous driving mode is turned on, the mode application priority is highest. The Display Pop Out button is activated after the autonomous driving mode is confirmed.

Figure 19:
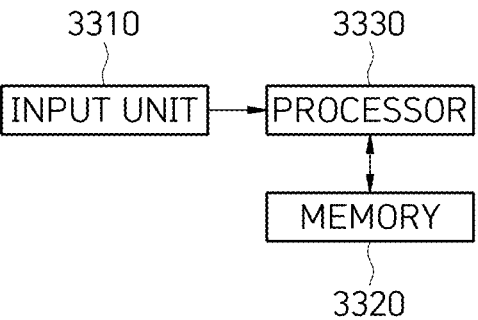
FIG. 19 illustrates a system for controlling knob operating ranges with regard to vehicle mode conversion according to still another embodiment of the present disclosure.

FIG. 19 illustrates a system for controlling knob operating ranges with regard to vehicle mode conversion according to still another embodiment of the present disclosure.

The system for controlling knob operating ranges with regard to vehicle mode conversion according to still another embodiment of the present disclosure includes an input unit 3310 that receives input information on a vehicle driving mode, a memory 3320 that stores a program for controlling a knob operating range based on the input information, and a processor 3330 that executes the program. The processor 3330 uses input information about passenger seat entertainment display detachment and autonomous driving mode conversion to transmit a control command to vary the operating range of the knob allocated to the area of an in-vehicle display.

For the autonomous driving mode conversion, the processor 3330 sets a knob range corresponding to the selection area for forward and backward movement of the in-vehicle display.

The processor 3330 controls a message of guidance regarding the movement of the knob to be displayed when the passenger seat entertainment display is detached, and controls the message to disappear when a preset time elapses after the knob is moved or the passenger seat entertainment display is detached.

When the passenger seat entertainment display is detached, the processor 3330 transmits a solenoid protrusion command signal to limit the movement of the knob to the control range of the passenger seat entertainment display.

For the autonomous driving mode conversion, the processor 3330 controls a message of guidance regarding the movement of the knob to be displayed and controls the message to disappear when a preset time elapses after the knob is moved or the autonomous driving mode conversion starts.

For the autonomous driving mode conversion, the processor 3330 transmits a solenoid protrusion command to limit the movement of the knob to the cluster control range on the in-vehicle display.

When the passenger seat entertainment display is detached, the processor 3330 automatically moves the knob to an area other than the control range on the passenger seat entertainment display and transmits a solenoid protrusion command signal.

For the autonomous driving mode conversion, the processor 3330 automatically moves the knob to an area other than the cluster control range on the in-vehicle display and transmits a solenoid protrusion command signal.

Figure 20:
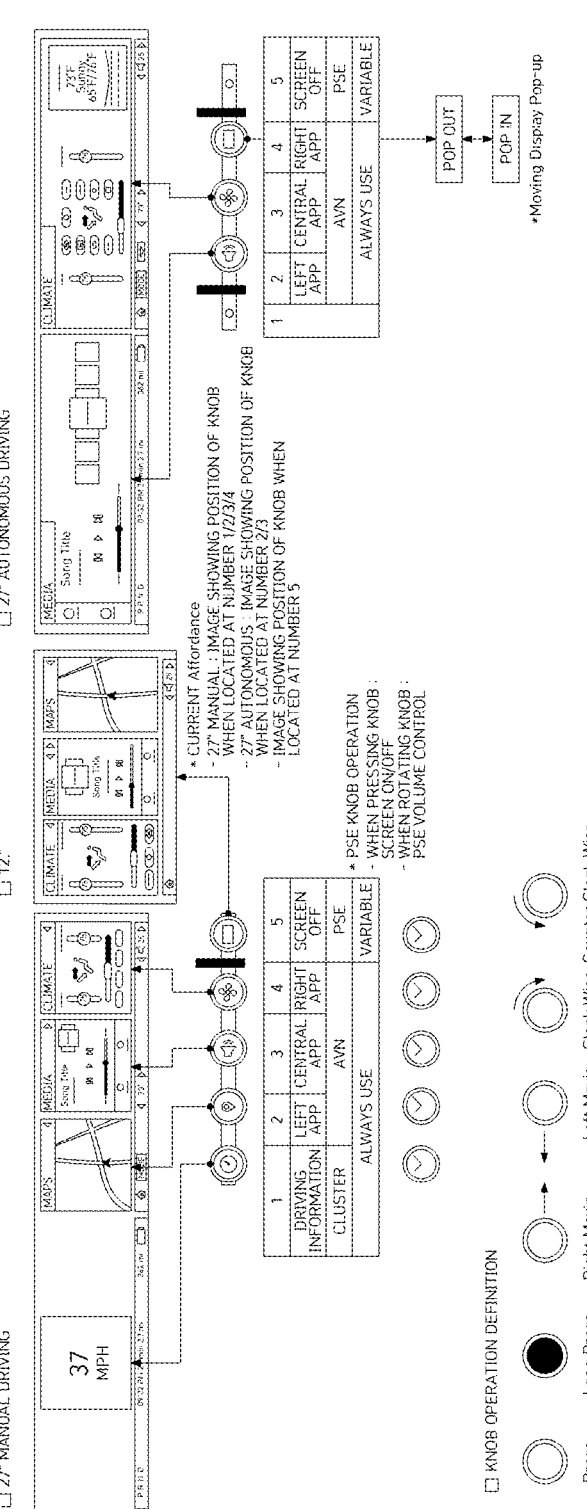
FIG. 20 illustrates a definition of a knob operating range according to still another embodiment of the present disclosure.

FIG. 20 illustrates a definition of the knob operating range according to still another embodiment of the present disclosure.

In the manual driving mode, it is assumed that the cluster, map, media, and air-conditioning menus are displayed on the area of the in-vehicle display, and the air-conditioning, media, and map menus are displayed on the passenger seat entertainment display.

The cluster, map, media, and air-conditioning menus on the in-vehicle display correspond to areas 1 to 4 of the knob movement range, and the knob performs function control input for the corresponding menu in that area.

In the passenger seat entertainment display area 5, the screen ON/OFF is controlled when the knob is pressed, and the volume of the passenger seat entertainment display is controlled when the knob is rotated.

In the autonomous driving mode, areas 1 and 5 of the knob movement range are not used, and control input signals are received through the knob for media, air-conditioning, and in-vehicle display moving in areas 2 to 4.

Figure 21:
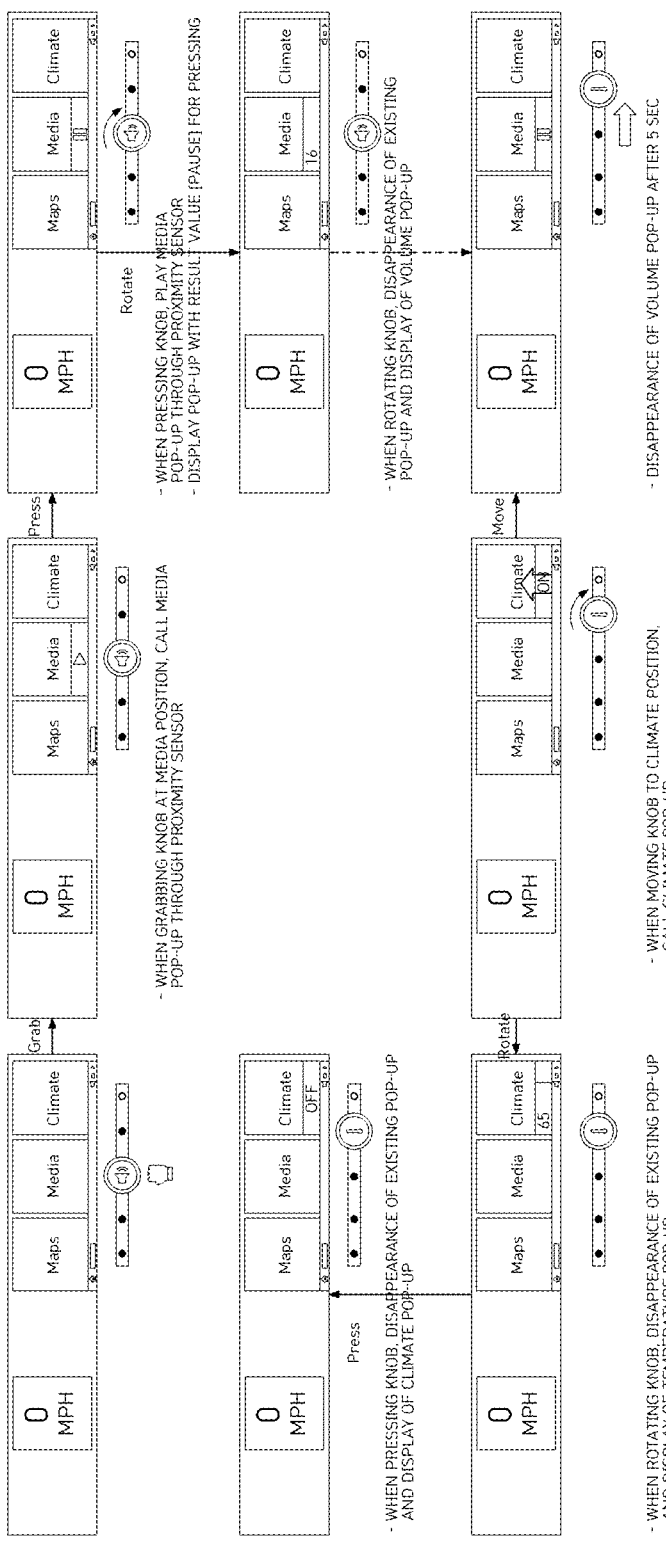
FIG. 21 illustrates a process of controlling variable knob ranges according to still another embodiment of the present disclosure.

FIG. 21 illustrates a process of controlling variable knob ranges according to still another embodiment of the present disclosure.

When the knob is grabbed in the lower area of the media on the in-vehicle display, a media pop-up is called through the proximity sensor.

When the knob is pressed, the media is played, and the result value (pause) for pressing is displayed in a pop-up.

When the knob is rotated, the existing displayed pop-up disappears, a volume pop-up is displayed, and the displayed volume pop-up disappears after a preset time.

When the knob is moved to the air-conditioning area, a pop-up of the air-conditioning menu is called. When the knob is rotated, the existing pop-up disappears and a temperature pop-up is displayed.

FIG. 22 illustrates knob control depending on the detachment of the passenger seat entertainment display according to still another embodiment of the present disclosure.

When the knob is located in the rightmost area of the movement range thereof and the passenger seat entertainment display is detached, a knob movement pop-up is displayed on the in-vehicle display.

When the knob is moved manually or the knob is not moved for a preset time after detaching the passenger seat entertainment display, the pop-up disappears.

When a touch signal is applied to an area other than the pop-up while displaying the pop-up, the pop-up disappears.

After the knob is moved, the solenoid protrudes to prevent the movement of the knob to the rightmost area of the knob movement range.

FIG. 23 illustrates knob control depending on the autonomous driving mode conversion according to still another embodiment of the present disclosure.

When the knob is located in the leftmost area of the movement range thereof and it is converted to the autonomous driving mode, a knob movement pop-up is displayed on the in-vehicle display.

When the knob is moved manually or the knob is not moved for a preset time from the time of conversion to the autonomous driving mode, the pop-up disappears.

When a touch signal is applied to an area other than the pop-up while displaying the pop-up, the pop-up disappears.

After the knob is moved, the solenoid protrudes to prevent the movement of the knob to the leftmost area of the knob movement range.

Figure 24:
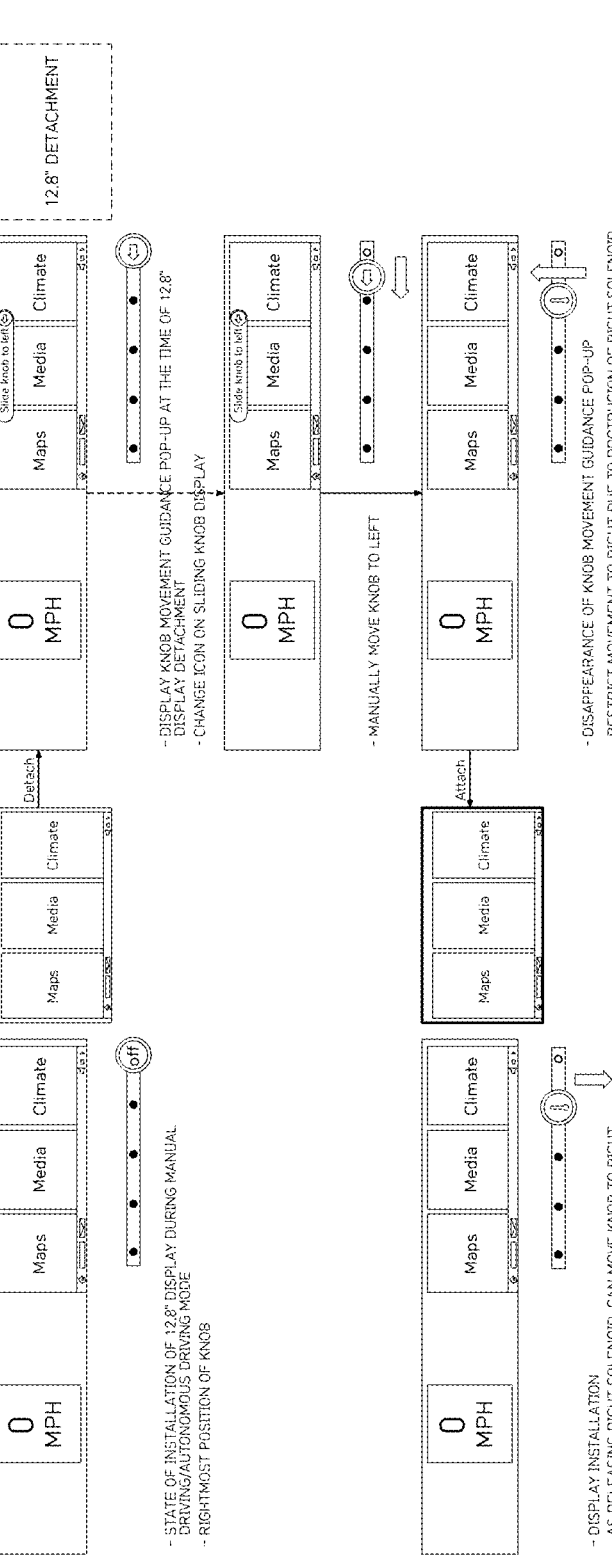
FIG. 24 illustrates a process of knob control depending on the detachment of the passenger seat entertainment display according to still another embodiment of the present disclosure.

FIG. 24 illustrates a process of knob control depending on the detachment of the passenger seat entertainment display according to still another embodiment of the present disclosure.

In the manual driving/autonomous driving mode, it is assumed that the knob is located in the rightmost area of the movement range thereof with the passenger seat entertainment display installed.

When the passenger seat entertainment display is detached, a knob movement pop-up is displayed on the in-vehicle display, and the icon is changed and displayed on the sliding knob display. When the knob is manually moved to the left, the knob movement guidance pop-up disappears, and the solenoid protrudes to the left in the rightmost area to restrict the knob from moving to the rightmost area.

When the passenger seat entertainment display is installed, the solenoid that has protruded is operated again and released, thereby enabling the knob to move to the rightmost area.

Figure 25:
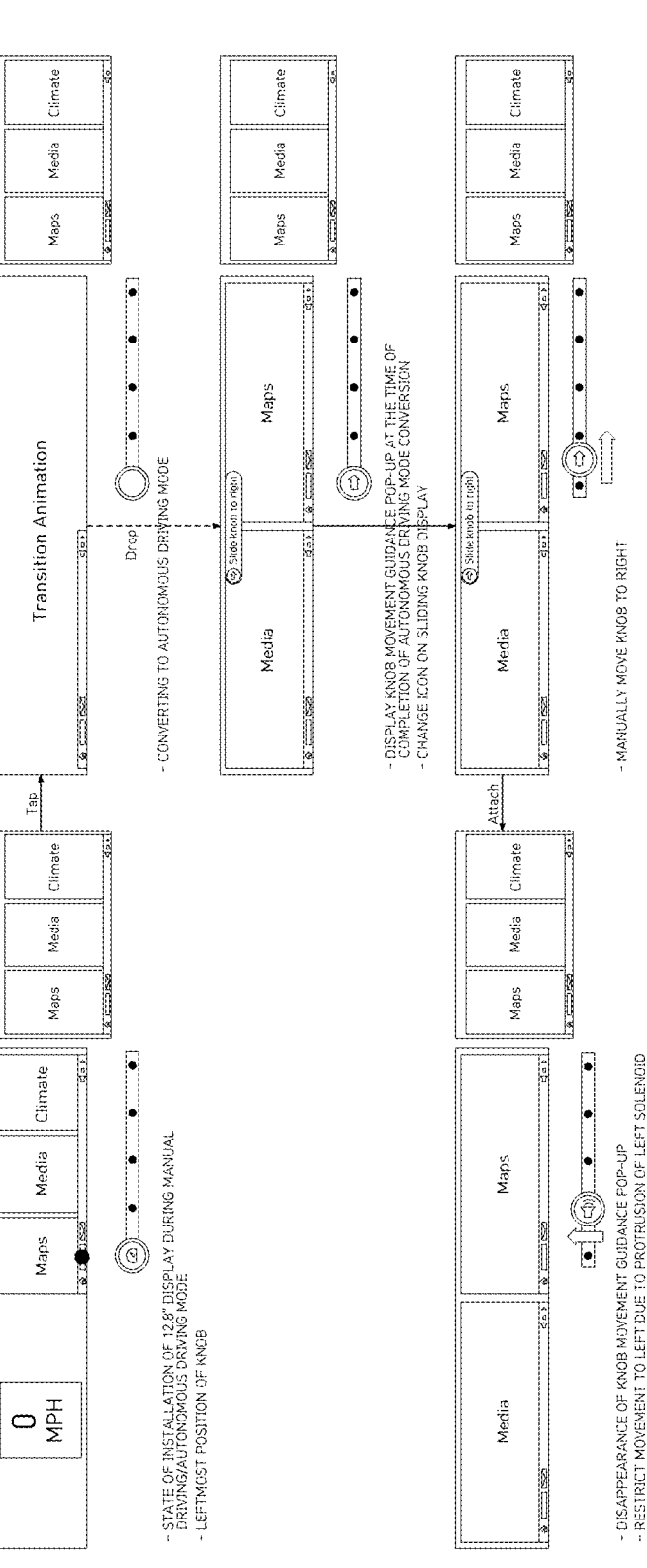
FIG. 25 illustrates a process of knob control depending on the autonomous driving mode conversion according to still another embodiment of the present disclosure.

FIG. 25 illustrates a process of knob control depending on the autonomous driving mode conversion according to still another embodiment of the present disclosure.

In the manual driving/autonomous driving mode, it is assumed that the knob is located in the leftmost area of the movement range thereof with the passenger seat entertainment display installed.

When it is converted to the autonomous driving mode, a knob movement pop-up is displayed on the in-vehicle display, and the icon is changed and displayed on the sliding knob display. When the knob is manually moved to the right, the knob movement guidance pop-up disappears, and the solenoid protrudes to the right in the leftmost area to restrict the knob from moving to the leftmost area.

Figure 26:
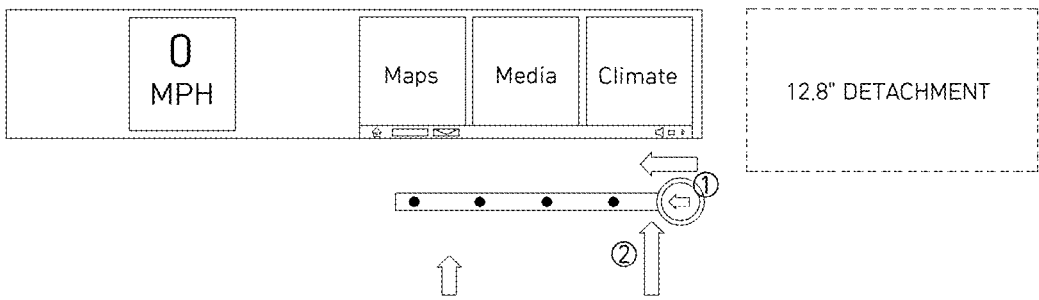
FIG. 26 illustrates knob's automatic movement by the detachment of the passenger seat entertainment display according to still another embodiment of the present disclosure.

FIG. 26 illustrates knob's automatic movement by the detachment of the passenger seat entertainment display according to still another embodiment of the present disclosure.

When the knob is located in the rightmost area of the movement range thereof and the passenger seat entertainment display is detached, automatic pushing and locking are performed on the knob. After the knob is moved, the solenoid protrudes to prevent the movement of the knob to the rightmost area of the knob movement range.

FIG. 27 illustrates knob's automatic movement by the autonomous driving mode conversion according to still another embodiment of the present disclosure.

When the knob is located in the leftmost area of the movement range thereof and it is converted to autonomous driving mode, automatic pushing and locking are performed on the knob. After the knob is moved, the solenoid protrudes to prevent the movement of the knob to the leftmost area of the knob movement range.

FIG. 28 illustrates a process of knob's automatic movement by the detachment of the passenger seat entertainment display according to still another embodiment of the present disclosure.

In the manual driving/autonomous driving mode, it is assumed that the knob is located in the rightmost area of the movement range thereof with the passenger seat entertainment display installed.

When the passenger seat entertainment display is detached, the knob located in area 5 automatically moves to area 4, and the solenoid protrudes to the left in the rightmost area to restrict the knob from moving to the rightmost area (area 5).

When the passenger seat entertainment display is installed, the solenoid that has protruded is operated again and released, thereby enabling the knob to move to the rightmost area (area 5).

Figure 29:
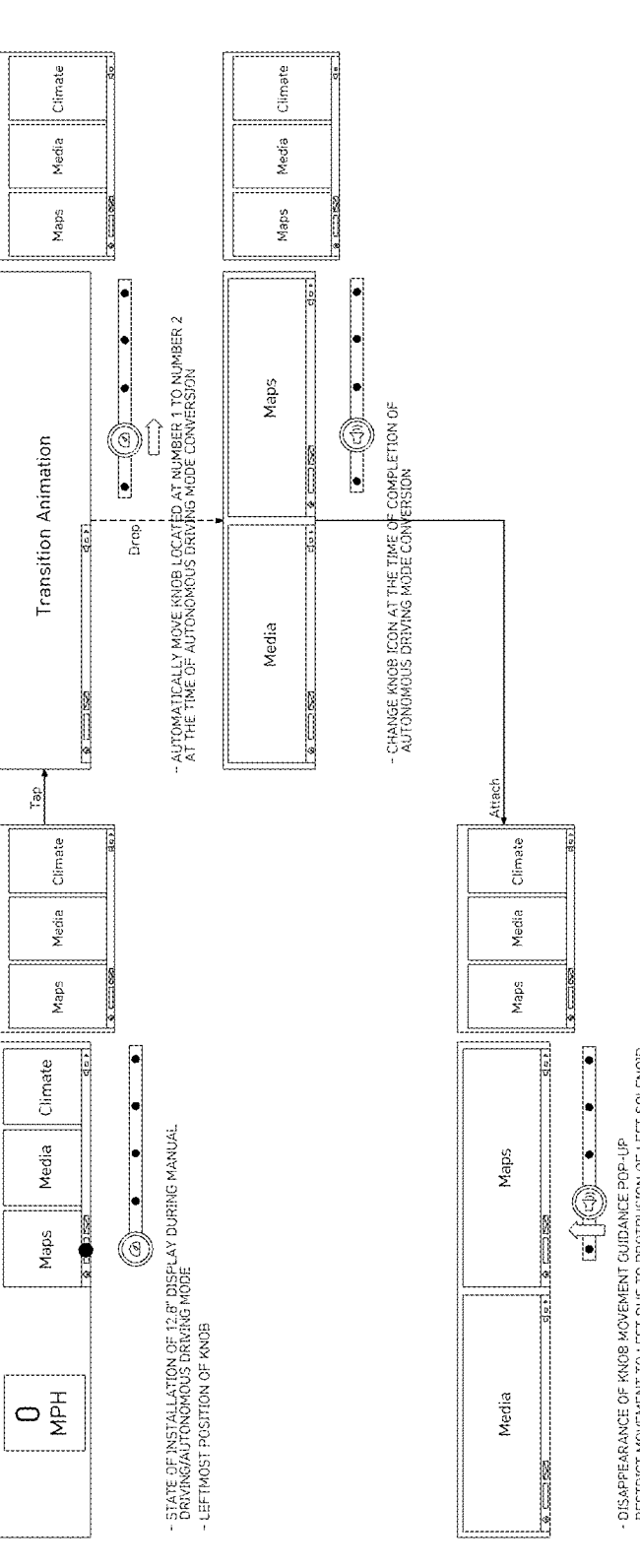
FIG. 29 illustrates a process of knob's automatic movement by the autonomous driving mode conversion according to still another embodiment of the present disclosure.

FIG. 29 illustrates a process of knob's automatic movement by the autonomous driving mode conversion according to still another embodiment of the present disclosure.

In the manual driving/autonomous driving mode, it is assumed that the knob is located in the leftmost area of the movement range thereof with the passenger seat entertainment display installed.

When it is converted to the autonomous driving mode, the knob located in area 1 automatically moves to area 2, and the knob icon changes when the conversion to the autonomous driving mode is completed.

After the mode conversion is completed, the knob movement guidance pop-up disappears, and the solenoid protrudes to the right in the leftmost area to restrict the knob from moving to the leftmost area (area 1).

Figure 30:
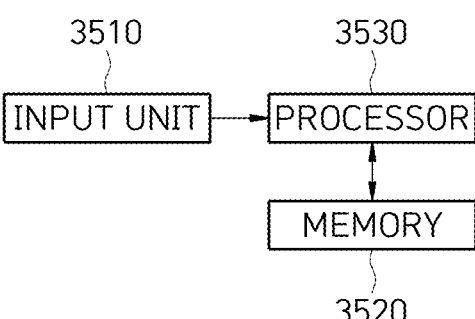
FIG. 30 illustrates a system for changing application placement on a vehicle display according to yet another embodiment of the present disclosure.

FIG. 30 illustrates a system for changing application placement on a vehicle display according to yet another embodiment of the present disclosure.

The system for changing application placement on a vehicle display according to yet another embodiment of the present disclosure includes an input unit 3410 that receives a knob operation signal, a memory 3420 that stores a program for changing the placement of applications displayed on a vehicle display in response to the knob operation signal, and a processor 3430 that executes the program. The processor 3430 uses the knob operation signal input by the operation of a knob performed in some of the partitioned areas of the vehicle display to transmit a control signal for changing the type of application displayed in some areas.

The processor 3430 determines a sort order when entering an app change mode based on the initial criterion for sorting app lists presented by the manufacturer.

The processor 3430 stores the applications placed on the home screen for each user to sort and display the list of apps.

The processor 3430 enters the app change mode in response to the knob operation signal for the long press of the knob, and changes the application in response to the knob operation signal for flicking the list of apps up or down or rotating the knob.

The processor 3430 recommends a list of apps by learning vehicle riding information and user behavior pattern data.

When the knob operation signal for selecting the application already placed on the vehicle display is input, the processor 3430 changes a display area to display the application already placed in the selected area, and changes the applications placed on the left and right of the display area.

FIG. 31 illustrates a display and knob layout in manual driving mode according to yet another embodiment of the present disclosure.

In the manual driving mode, the in-vehicle display (driver seat display) allocates a cluster to a first area, a map to a second area, media to a third area, and an air-conditioning control area to a fourth area. The knob movement range is partitioned into ranges corresponding to the first to fourth areas.

When the passenger seat entertainment display is attached, area 5, which is a portion of the knob movement range, corresponds to the operating area of the passenger seat entertainment display.

In the manual driving mode, when the app title or the knob at the corresponding position is long pressed, it enters the app change mode, and changes the type of application displayed by flicking the list of apps up or down or rotating the knob after entering the app change mode.

Figure 32:
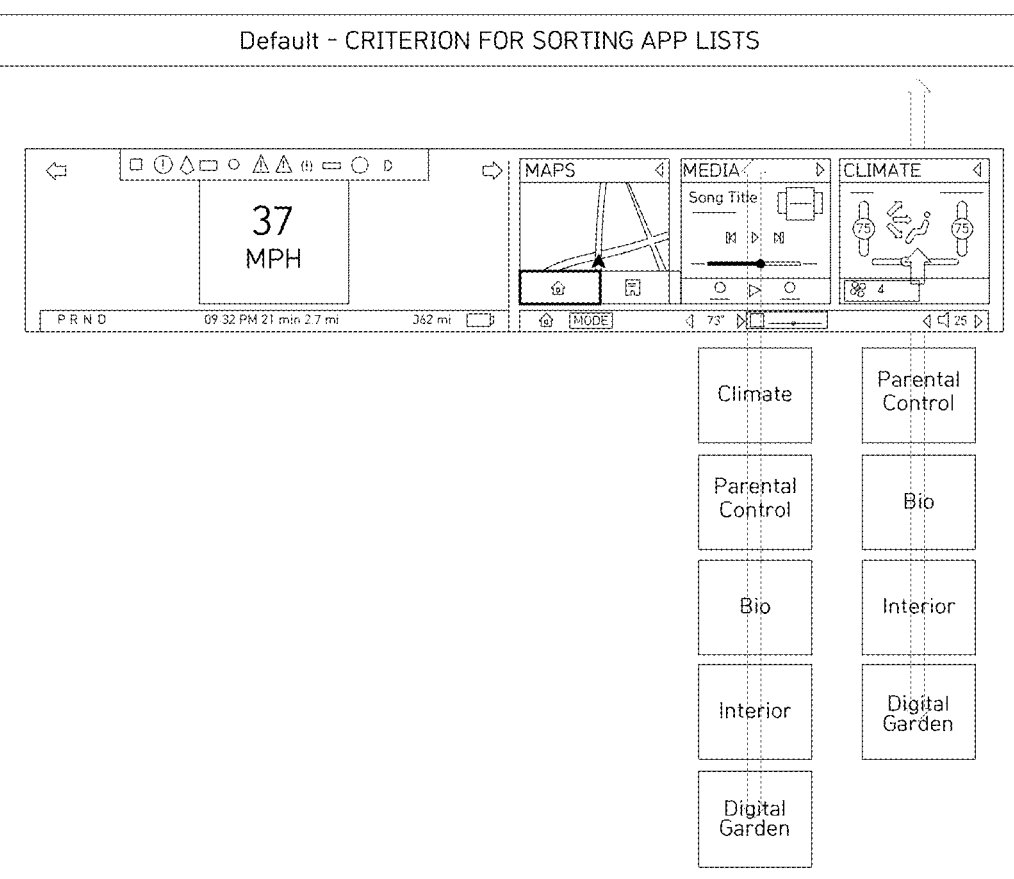
FIG. 32 illustrates a criterion for sorting app lists presented by the manufacturer according to yet another embodiment of the present disclosure.

FIG. 32 illustrates a criterion for sorting app lists presented by the manufacturer according to yet another embodiment of the present disclosure.

Referring to FIG. 32, when entering the app change mode, the initial criterion for sorting app lists may be presented by the manufacturer, and the apps placed on the home screen may be stored for each user. In other words, the default list of apps may consist of a list presented by the manufacturer, which may be profiled for each user.

Figure 33:
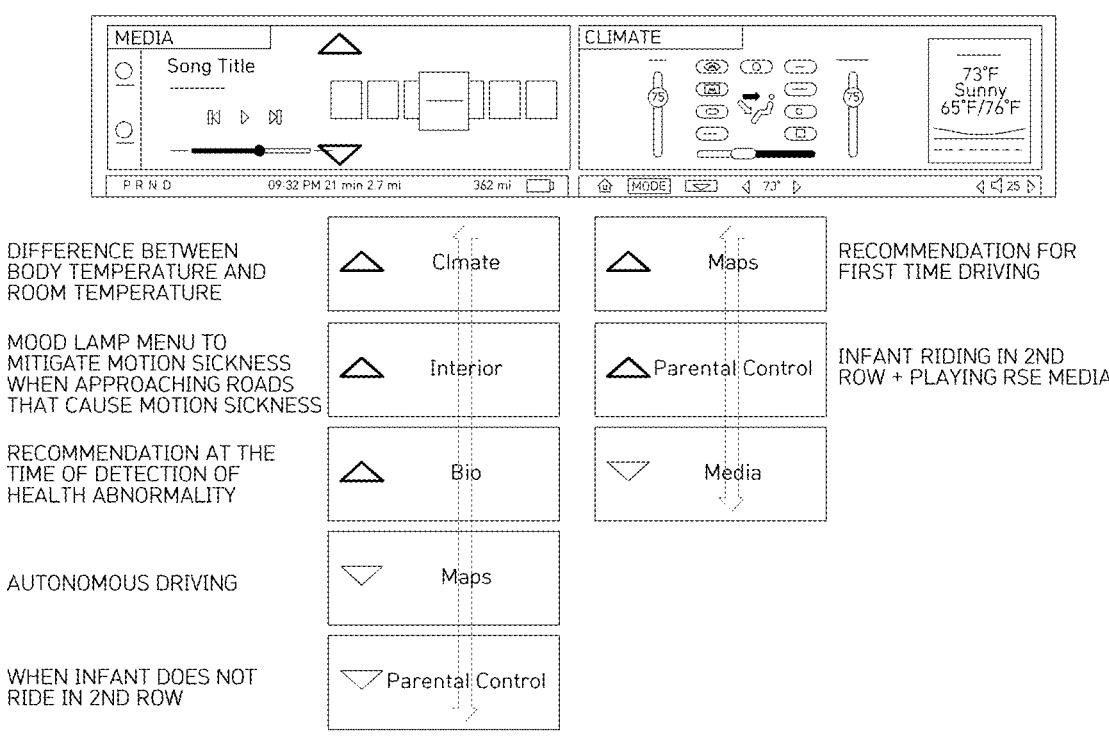
FIG. 33 illustrates a criterion for sorting recommended apps for each situation according to yet another embodiment of the present disclosure.

FIG. 33 illustrates a criterion for sorting recommended apps for each situation according to yet another embodiment of the present disclosure.

When the recommendation function is activated through IVI, the processor 3430 provides a list of recommended apps by learning the user behavior pattern data.

For example, during autonomous driving, when it is determined that there is a low need for use of navigation, so that the [Maps] app is placed at the bottom of the list and there are no infants in the second row, the [Parental Control] app is placed at the bottom of the list.

Whether or not an infant rides is determined using a camera that captures the interior of the vehicle, a seat load sensor, etc., and a list of apps by date, time, and frequency is recommended for each user.

For example, maps, media, and weather are recommended priorly as the apps mostly used during attendance time, and the [Parental Control] app is included in the list of apps with the lowest ranking.

Figure 34:
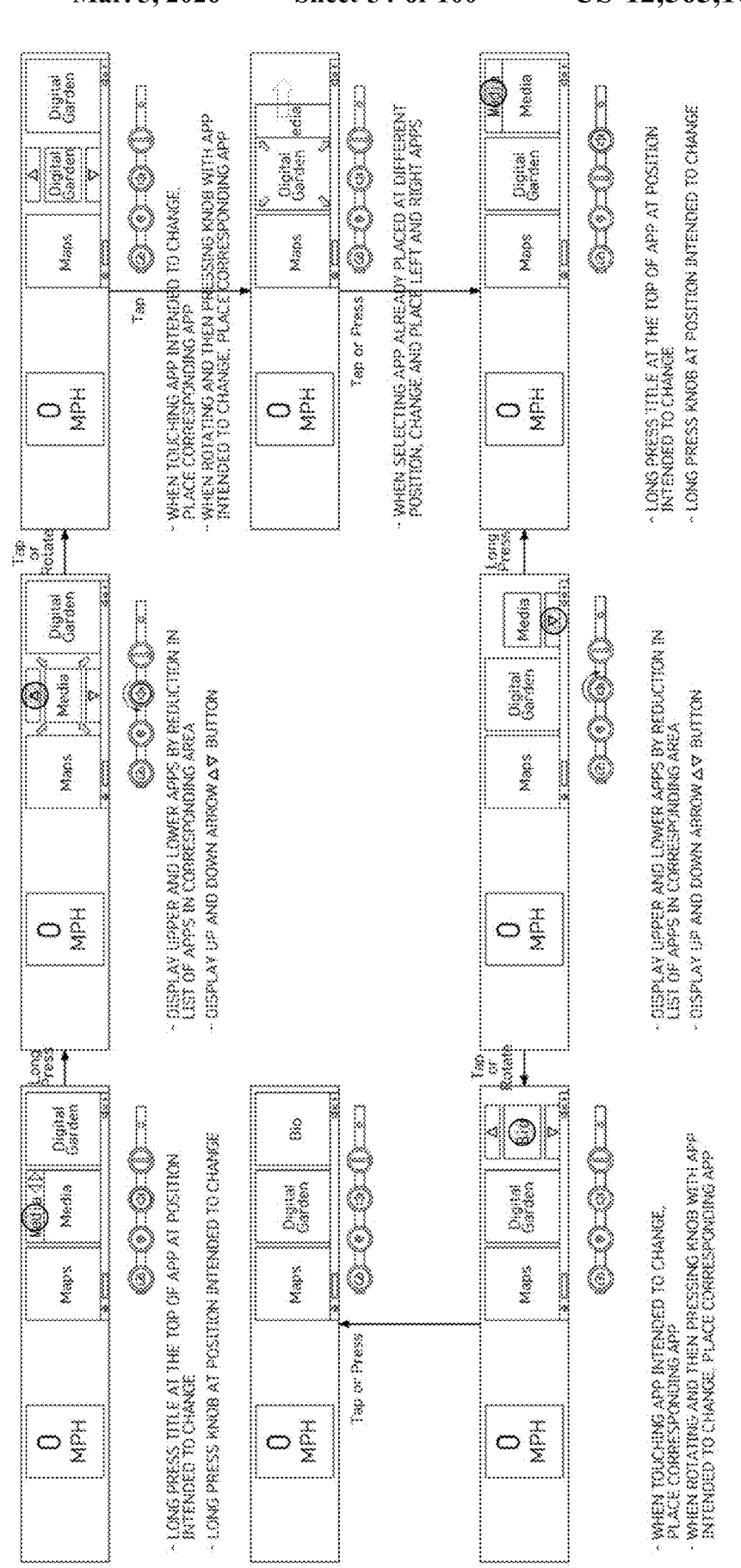
FIG. 34 illustrates a process of changing apps in the manual driving mode according to yet another embodiment of the present disclosure.

FIG. 34 illustrates a process of changing apps in the manual driving mode according to yet another embodiment of the present disclosure.

When the user long presses the title at the top of the app at the position intended to change, or moves the knob to the position of the app intended to change to long press it, the app in the corresponding area is reduced and the list of apps is displayed above and beneath the reduced app.

When the application intended to change is selected and a touch signal is input thereto, that application is placed. Alternatively, when the application intended to change is selected by rotating and pressing the knob, that application is placed.

When the application that is already placed at a different position within the vehicle display is selected, the left and right applications are changed and placed.

Figure 35:
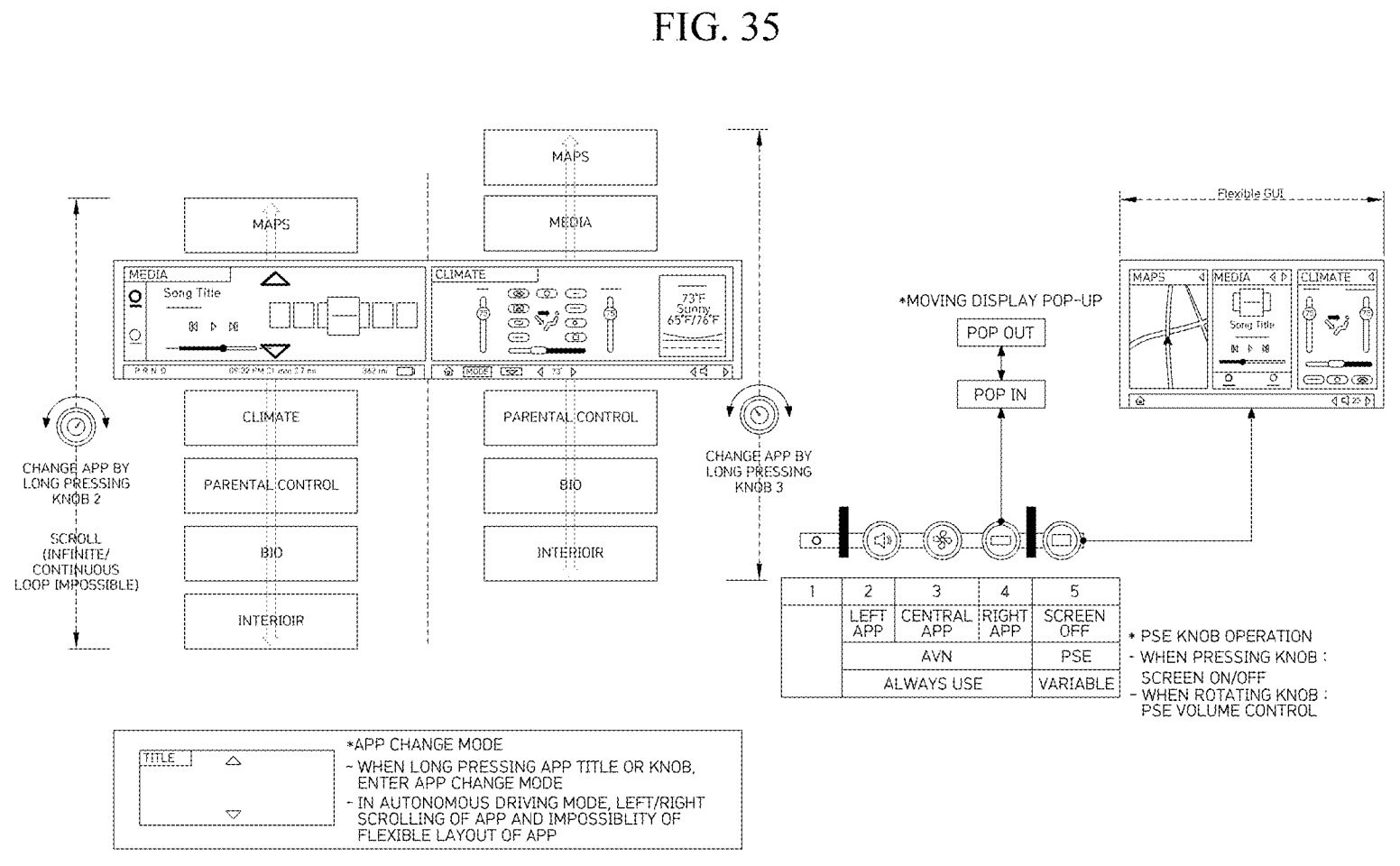

FIG. 35 illustrates a display and knob layout in autonomous driving mode according to yet another embodiment of the present disclosure.

In the autonomous driving mode, area 1 of the knob movement range is deactivated (which is effectively equivalent to deactivated state because the knob is inaccessible due to the protrusion of the solenoid), so that area 2 and area 3 of the knob movement range correspond to the media and the air-conditioning control menu, respectively. Area 4 of the knob movement range is an input range for forward/backward movement control of the vehicle display, and area 5 of the knob movement range is an input range for driving control of the passenger seat entertainment display.

When the knob is long pressed in area 2 or area 3, the application is changed by the rotation of the knob and displayed on the vehicle display.

Figure 36:
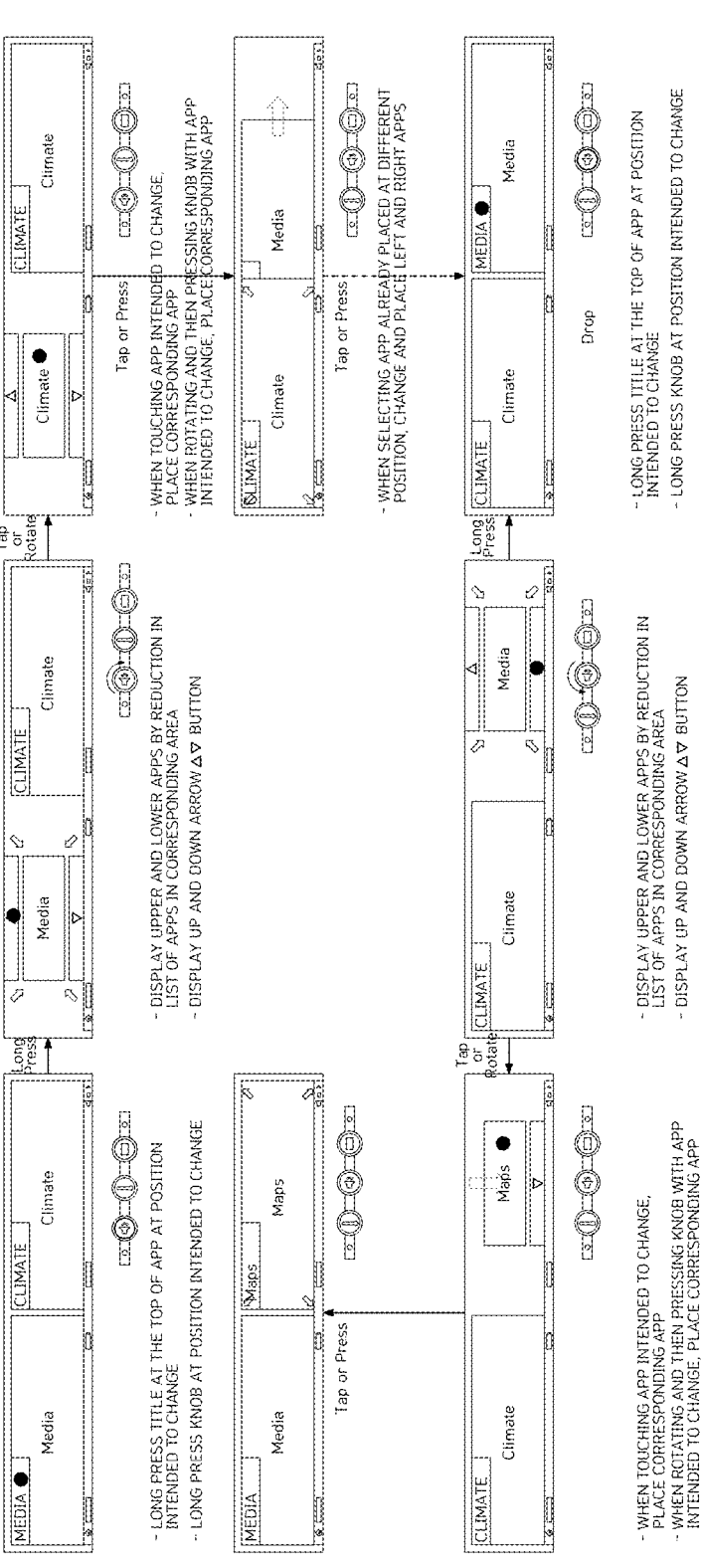
FIG. 36 illustrates a process of changing apps in the autonomous driving mode according to yet another embodiment of the present disclosure.

FIG. 36 illustrates a process of changing apps in the autonomous driving mode according to yet another embodiment of the present disclosure.

In the autonomous driving mode, when the user long presses the title at the top of the app at the position intended to change, or moves the knob to the position of the app intended to change to long press it, the app in the corresponding area is reduced and the list of apps is displayed above and beneath the reduced app.

When the application intended to change is selected and a touch signal is input thereto, that application is placed. Alternatively, when the application intended to change is selected by rotating and pressing the knob, that application is placed.

When the application that is already placed at a different position within the vehicle display is selected, the left and right applications are changed and placed.

Figure 37:
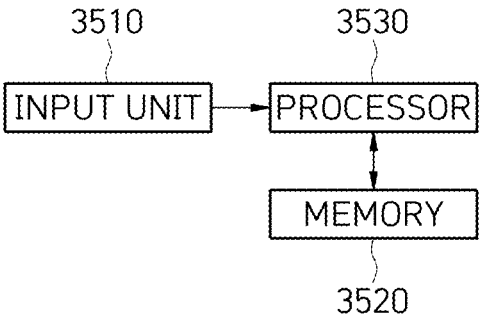
FIG. 37 illustrates a system for controlling knob operating ranges depending on variation in app size according to still yet another embodiment of the present disclosure.

FIG. 37 illustrates a system for controlling knob operating ranges depending on variation in app size according to still yet another embodiment of the present disclosure.

The system for controlling knob operating ranges depending on variation in app size according to still yet another embodiment of the present disclosure includes an input unit 3510 that receives at least one of a touch signal and a knob operation signal for an in-vehicle display in relation to the variation in app size, a memory 3520 that stores a program for varying the app size displayed on the in-vehicle display using the input signal, and a processor 3530 that executes the program. The processor 3530 transmits a control command signal to change the operating range area of a knob to correspond to the variation in app size.

When the input unit 3510 receives a touch signal for the in-vehicle display as the input signal, the processor 3530 varies the display area of the selected app based on the touch signal and changes the operating range area of the knob to correspond to the varied display area of the selected app.

When the input unit 3510 receives an attachment/detachment recognition signal of the passenger seat entertainment display, the processor 3530 transmits a control command in response to the knob operation signal in the operating range area of the knob allocated to the passenger seat entertainment display.

When the input unit 3510 receives a preset knob operation signal in the application area displayed on the in-vehicle display, the processor 3530 enlarges the application area in response to the knob operation signal and transmits a control command to display a function control screen.

The processor 3530 uses the user behavior pattern data to analyze an application usage pattern for each driving time, and allocates an application display area based on the result of analysis.

The processor 3530 uses driving environment monitoring information to analyze an application usage pattern, and allocates an application display area based on the result of analysis.

The processor 3530 uses driving environment monitoring information to enlarge the preset application display area for a preset time, and determines the display importance during enlargement to reset the application display area.

When the input unit 3510 receives a touch signal for the in-vehicle display as the input signal, the processor 3530 varies the display area of the selected app based on the touch signal. Moreover, as the display area of the selected app is enlarged, the processor 3530 checks setting information for other apps in the invaded area, runs the other apps in the background based on the result of check of the setting information, and maintains the knob operating range for each area.

Figure 38:
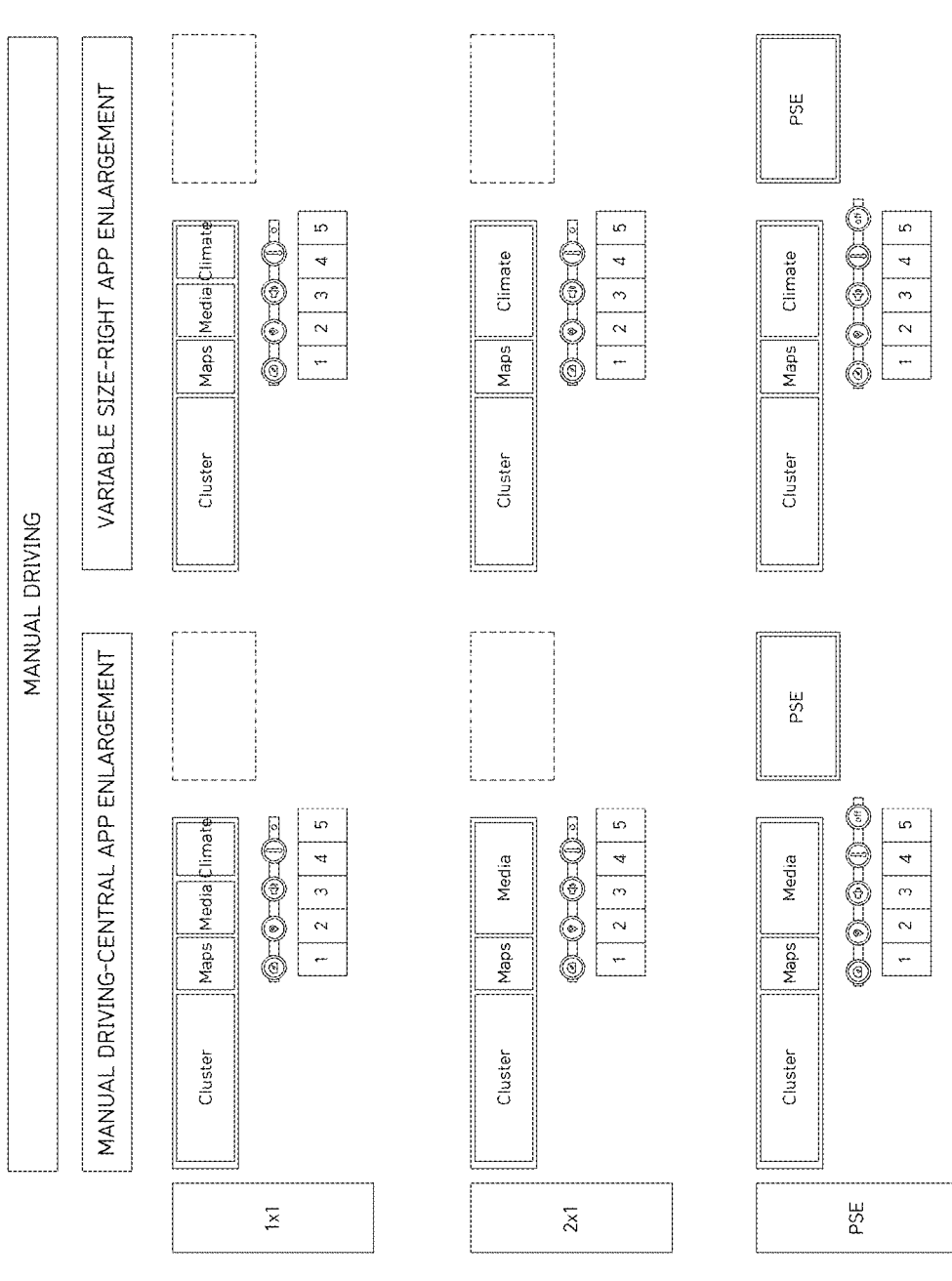
FIG. 38 illustrates a variable size in manual driving mode (central app enlargement and right app enlargement) according to still yet another embodiment of the present disclosure.

FIG. 38 illustrates a variable size in manual driving mode (central app enlargement and right app enlargement) according to still yet another embodiment of the present disclosure.

For the central app enlargement, in an 1×1 mode, the in-vehicle display (driver seat display) displays cluster, map, media, and air-conditioning applications, and allocates knob operating ranges 1 to 4 to correspond to each area. Since there is no passenger seat entertainment display, the knob operating range 5 allocated thereto is shown in shading. In a 2×1 mode, when there is a request to resize (enlarge) the media app on the in-vehicle display (driver seat display), the media app is resized, the air-conditioning app is no longer displayed, and knob operating ranges 3 and 4 are reset to the operating ranges for the media app. In a PSE mode, as the passenger seat entertainment display is attached, it is possible to recognize a knob operation signal for area 5 of the knob operating range.

For the right app enlargement, in an 1×1 mode, the in-vehicle display (driver seat display) displays cluster, map, media, and air-conditioning applications, and allocates knob operating ranges 1 to 4 to correspond to each area. Since there is no passenger seat entertainment display, the knob operating range 5 allocated thereto is shown in shading. In a 2×1 mode, when there is a request to resize (enlarge) the air-conditioning app on the in-vehicle display (driver seat display), the air-conditioning app is resized, the media app is no longer displayed, and knob operating ranges 3 and 4 are reset to the operating ranges for the air-conditioning app. In a PSE mode, as the passenger seat entertainment display is attached, it is possible to recognize a knob operation signal for area 5 of the knob operating range.

Figure 39:
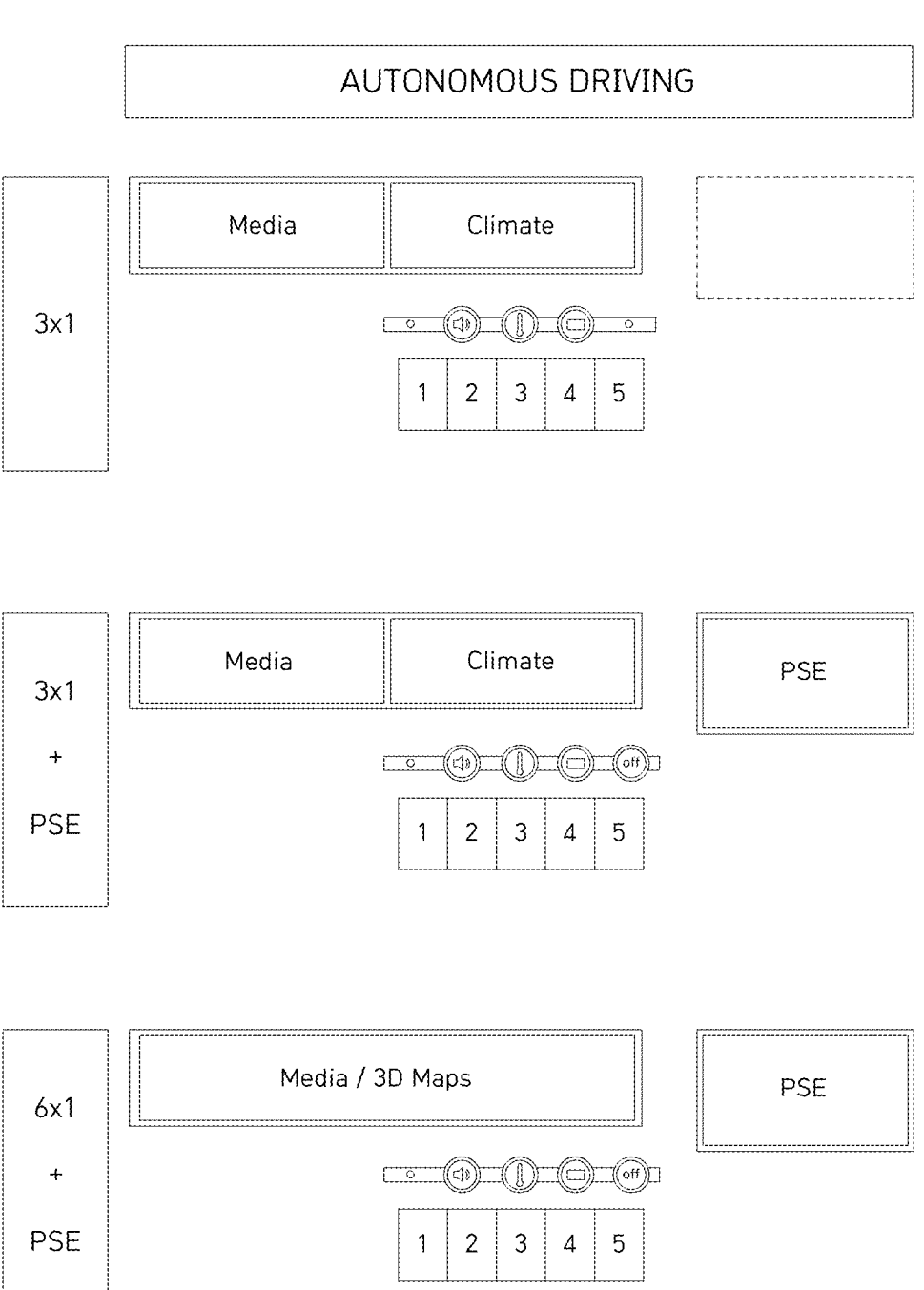
FIG. 39 illustrates a variation in knob operating range for each app size in autonomous driving mode according to still yet another embodiment of the present disclosure.

FIG. 39 illustrates a variation in knob operating range for each app size in autonomous driving mode according to still yet another embodiment of the present disclosure.

In the autonomous driving mode, in a 3×1 mode, the cluster menu is no longer displayed, but the media app and air-conditioning app are displayed. In this case, since there is no passenger seat entertainment display, knob operating range 1 allocated to the cluster menu and knob operating range 5 allocated to the passenger seat entertainment display are shown in shading. In the knob operating range, areas 2 and 3 correspond to respective media and air-conditioning, and area 4 corresponds to the knob operating range related to forward/backward movement of the in-vehicle display. When the passenger seat entertainment display is attached, knob operating range 5 is activated. If there is a request to resize the app displayed on the in-vehicle display, the app is resized in response to the request, and the knob operating range is also changed accordingly.

Figure 41:
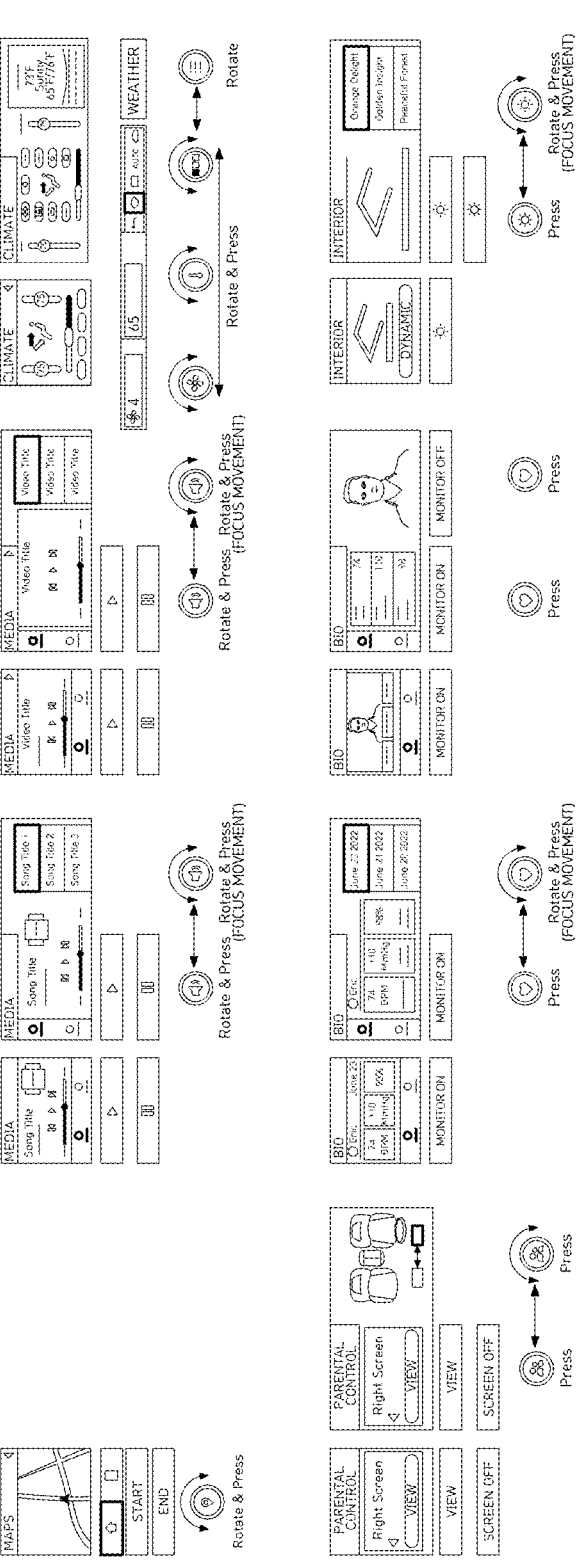
FIG. 41 illustrates a definition of knob operation for 2×1 enlargement in the manual driving mode according to still yet another embodiment of the present disclosure.
Figure 42:
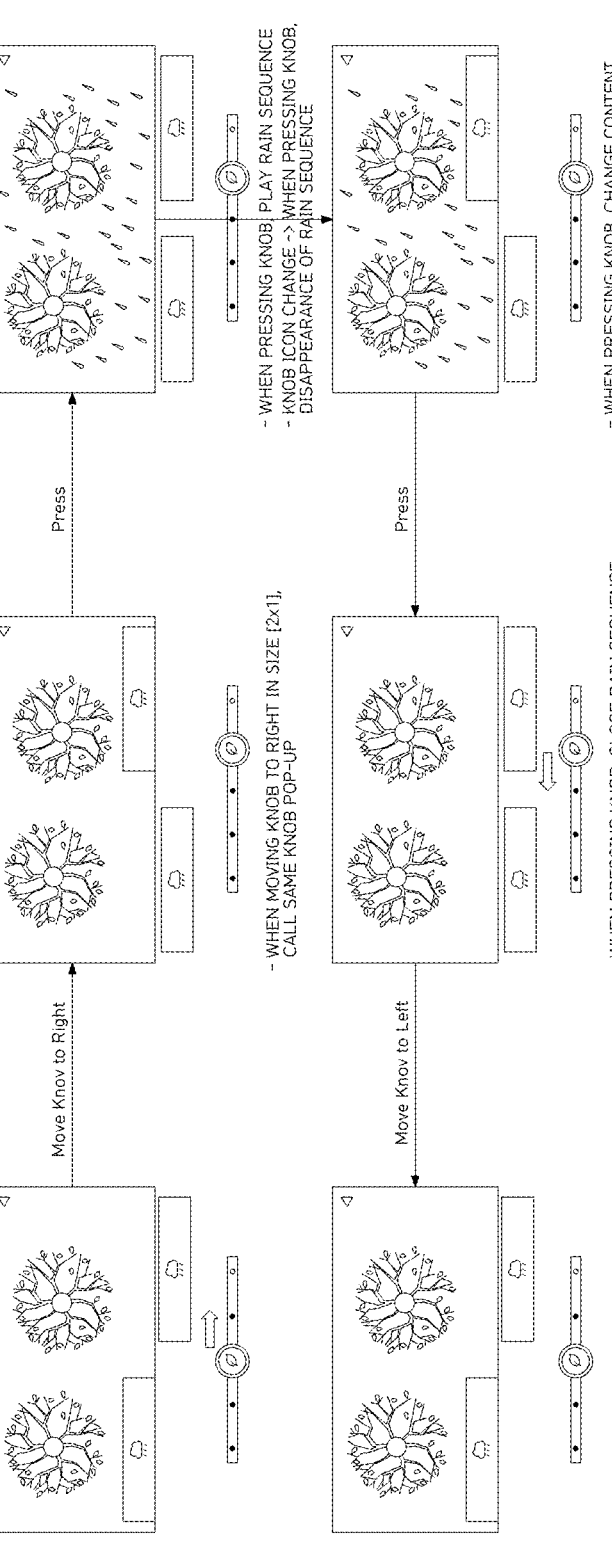
FIG. 42 illustrates a definition of knob operation for 2×1 enlargement of digital garden application in the manual driving mode according to still yet another embodiment of the present disclosure.

FIG. 40 illustrates a definition of knob operation in the manual driving mode according to still yet another embodiment of the present disclosure. FIG. 41 illustrates a definition of knob operation for 2×1 enlargement in the manual driving mode according to still yet another embodiment of the present disclosure. FIG. 42 illustrates a definition of knob operation for 2×1 enlargement of digital garden application in the manual driving mode according to still yet another embodiment of the present disclosure.

In the corresponding knob operating range of map, media, air-conditioning, parent control, BIO, and interior apps, function selection, focus movement, and the like are performed in response to the knob operation signal. In addition to the touch signal for the in-vehicle display, in response to the knob operation signal within the knob operating range, the additional menu selection screen of the selected app or the like may be displayed in a variable manner beyond the existing app display size.

In the digital garden application, when a knob is moved, a pop-up for the same knob is called. When the knob is pressed, the rain sequence is played, and as the knob icon is changed and knob is pressed, the rain sequence disappears. When the knob is pressed, the content is changed (clear), and when the knob is pressed, the rain sequence is closed.

FIG. 43 illustrates a definition of knob operation in the autonomous driving mode according to still yet another embodiment of the present disclosure.

In the corresponding knob operating range of map, media, air-conditioning, parent control, BIO, interior, and in-vehicle display pop-up applications, function selection, control, focus movement, and the like are performed in response to the knob operation signal.

Figure 44:
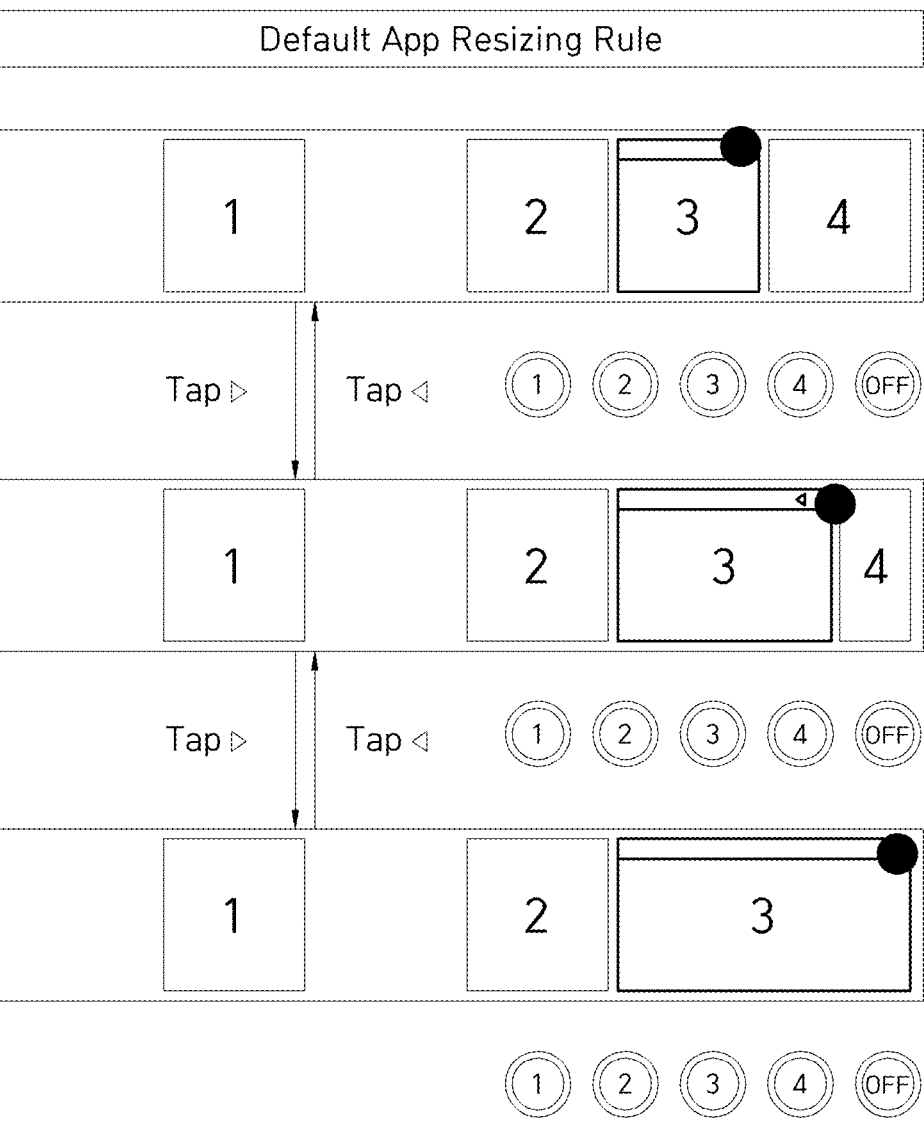
FIG. 44 illustrates a default app resizing rule according to still yet another embodiment of the present disclosure.

FIG. 44 illustrates a default app resizing rule according to still yet another embodiment of the present disclosure.

In response to the touch signal input from the in-vehicle display, the app size area is changed, and the allocation area within the knob operating range is changed accordingly. The app size is variable through the resizing button [ ◀▶ ] in the app title, and the bottom knob function is mapped depending on the variation in app size.

Figure 45:
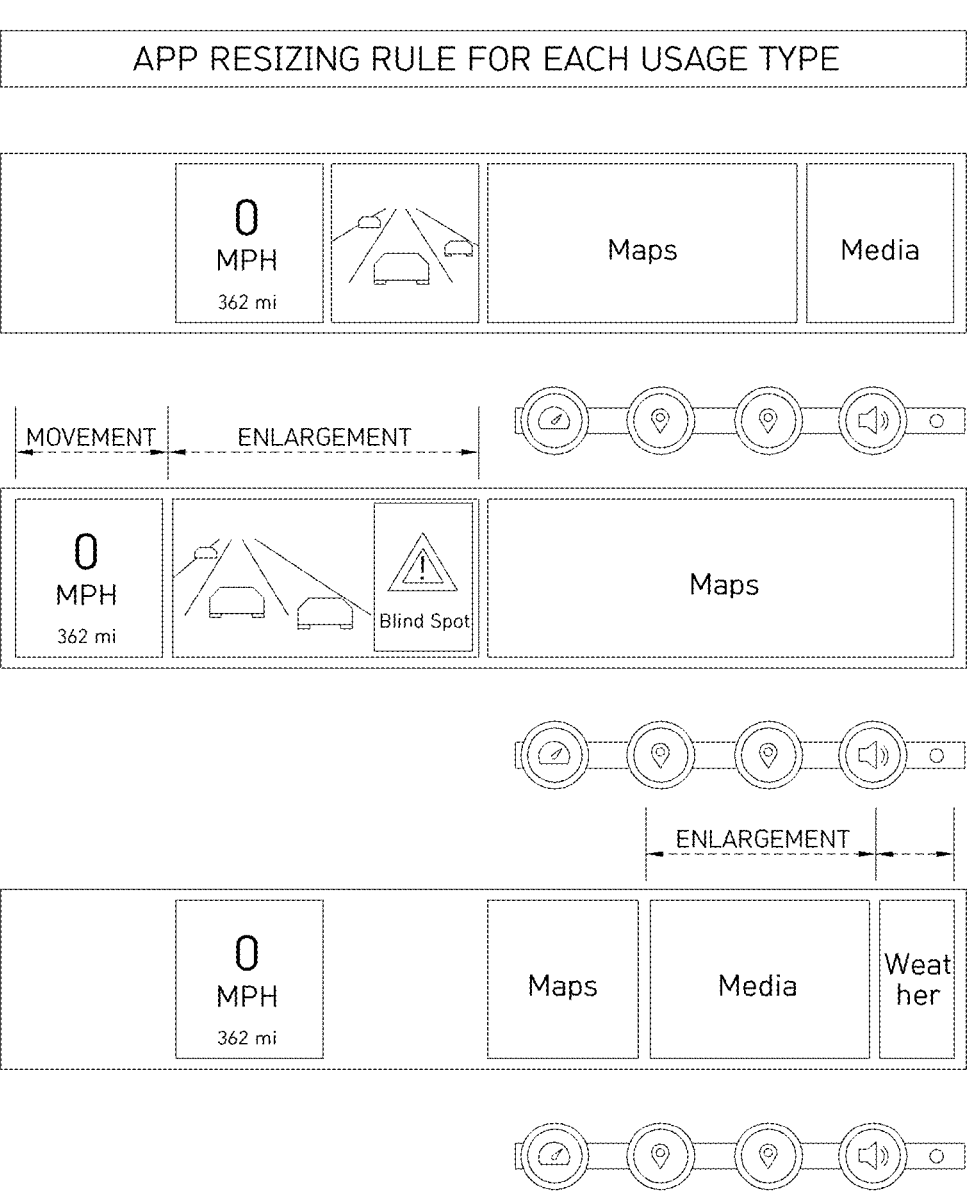
FIG. 45 illustrates an app resizing rule for each type of usage according to still yet another embodiment of the present disclosure.

FIG. 45 illustrates an app resizing rule for each type of usage according to still yet another embodiment of the present disclosure.

When the recommendation function is activated through IVI, the processor 3530 uses the result of behavioral pattern data analysis to resize the app for each type of usage, driving environment, and expected need. Examples of variable conditions include driving date/time/weather (commuting time pattern analysis), profiling for each driver (pattern analysis for each driver profile), driving environment (guidance of careless/warning situations, analysis of frequently used roads), and frequency of use (analysis of frequency of use of the corresponding app).

Referring to FIG. 45, in the commute (weekday attendance time) mode, the Maps size becomes 2, and the Media size becomes 1 for checking the podcast channel. In the blind spot warning and first time driving mode, the ADAS area is temporarily enlarged when the blind spot warning is issued, and when the right rear side warning is issued, the Maps are enlarged to the left, the warning pop-up is performed, and the Maps are of up to size 3 for checking route guidance. In the frequency of use mode, the size of the specific app may be enlarged or reduced depending on the frequency of use of the app. For example, if the media app is used frequently, it is enlarged from size 1 to size 1.5, and if the weather app is used relatively infrequently, it is reduced from size 1 to size 0.5.

Figure 46:
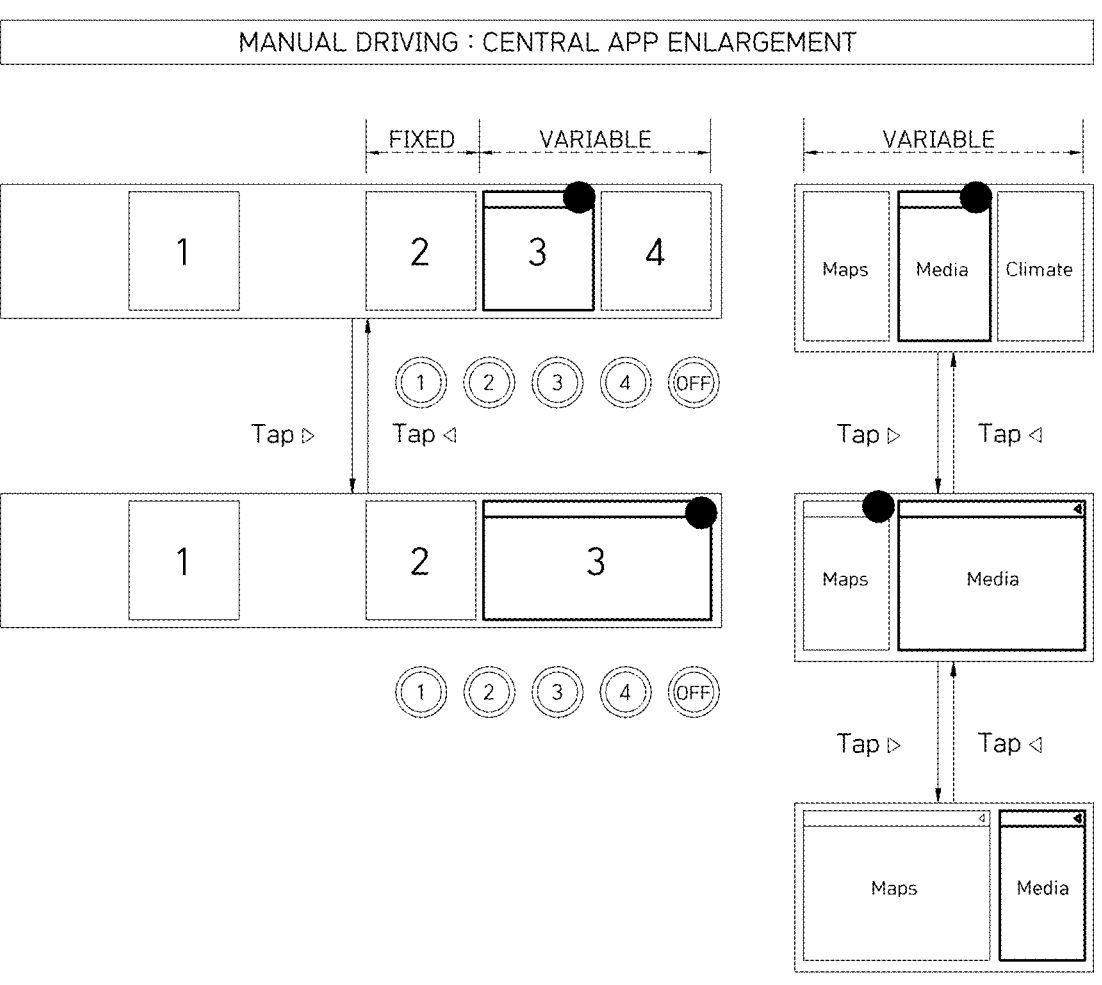
FIG. 46 illustrates a process of central app enlargement in the manual driving mode according to still yet another embodiment of the present disclosure.
Figure 47:
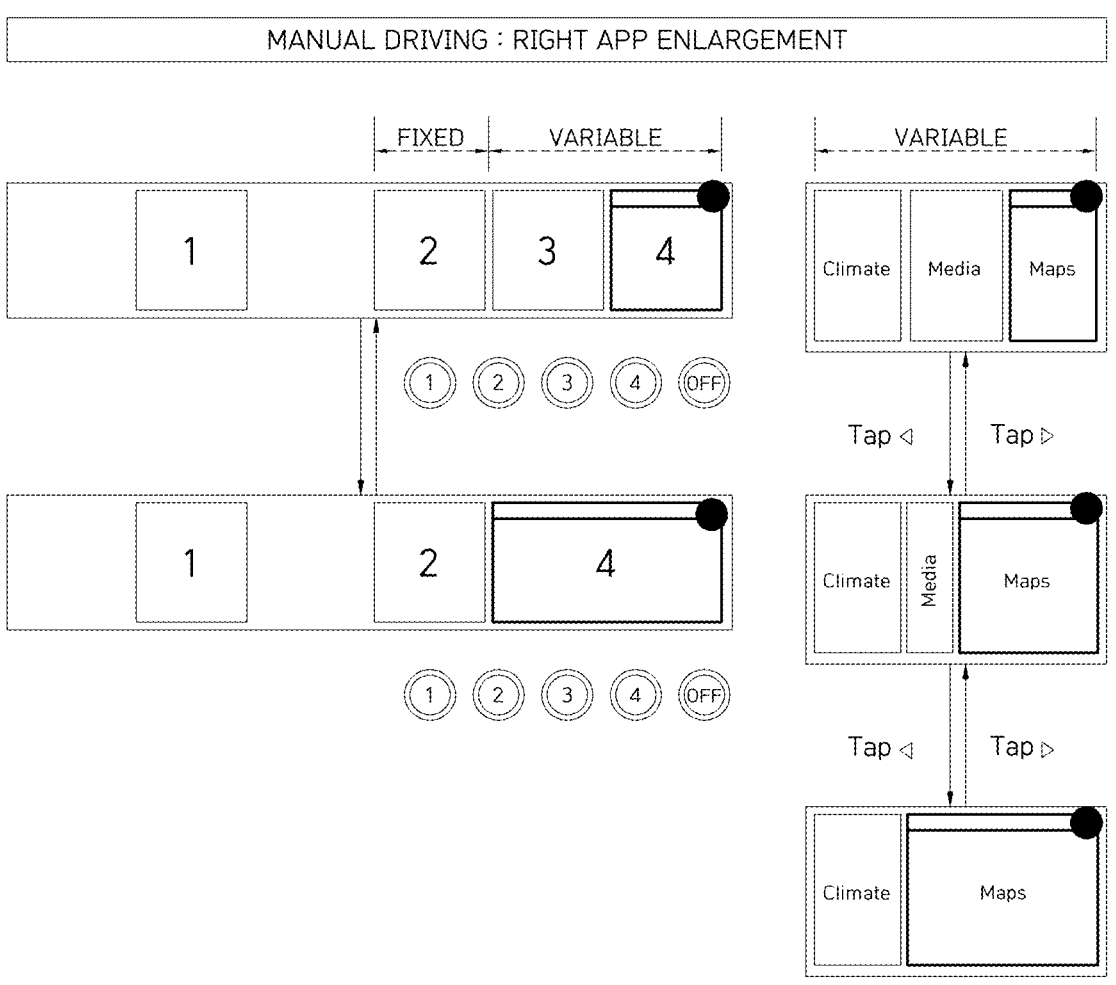
FIG. 47 illustrates a process of right app enlargement in the manual driving mode according to still yet another embodiment of the present disclosure.

FIG. 46 illustrates a process of central app enlargement in the manual driving mode according to still yet another embodiment of the present disclosure. FIG. 47 illustrates a process of right app enlargement in the manual driving mode according to still yet another embodiment of the present disclosure.

For the central app enlargement and the right app enlargement, some areas are set as fixed areas and some areas are set as variable areas. When there is a request to resize a specific application in the variable area, the display of the selected specific application is resized in response to the request, and the position of the application other than the selected specific application is changed or the display status of the other application is changed in response to the input signal.

Figure 48:
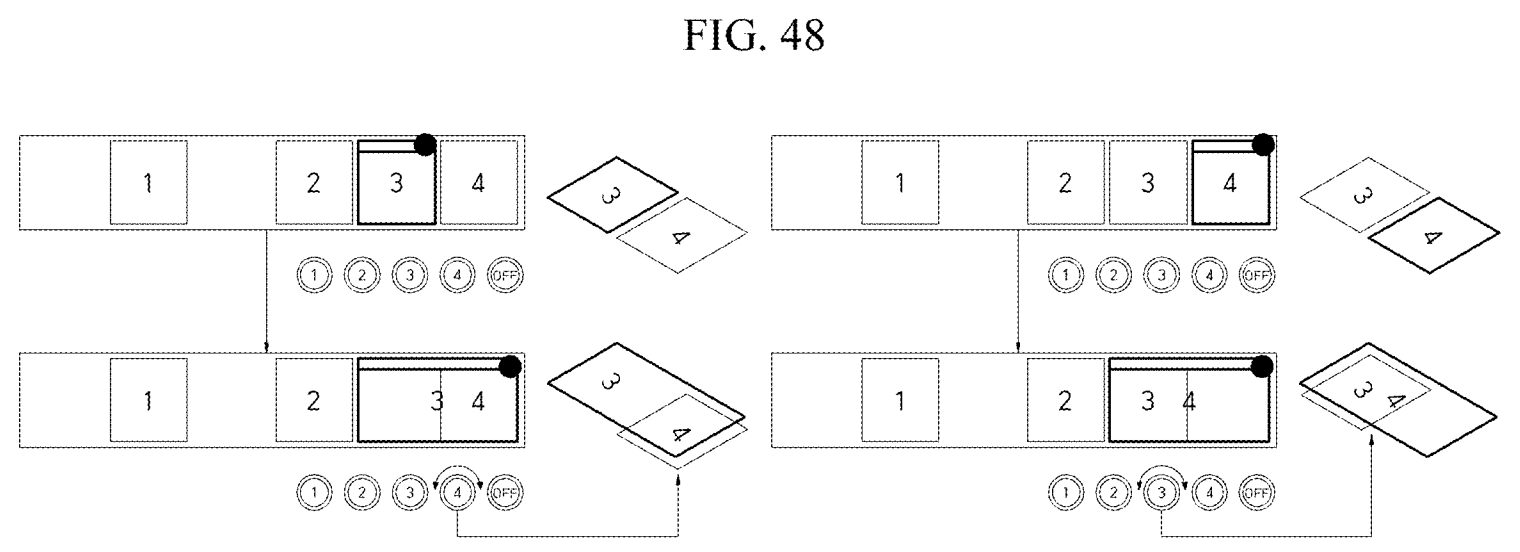

FIG. 48 illustrates knob operating range maintenance in the manual driving mode according to still yet another embodiment of the present disclosure.

In an embodiment different from the above example, the knob range is reset to correspond to the app enlargement area, but functions frequently used may be controllable using the knob like a kind of favorite. For example, in the left drawing, app 3 is enlarged to the area of app 4. In this case, it is assumed that app 4 is a frequently used function (favorite) or a recently used function. In this case, when the knob is operated in area 4 even when app 4 (favorite function or recently used function) is hidden by number 3, app 4 corresponding to area 4 can be run by operating the knob since it is still run in the background. For example, when app 4 is a frequently used media app, rotating the knob in the existing area 4 may control the volume of app 4 even when running in the background.

Figure 49:
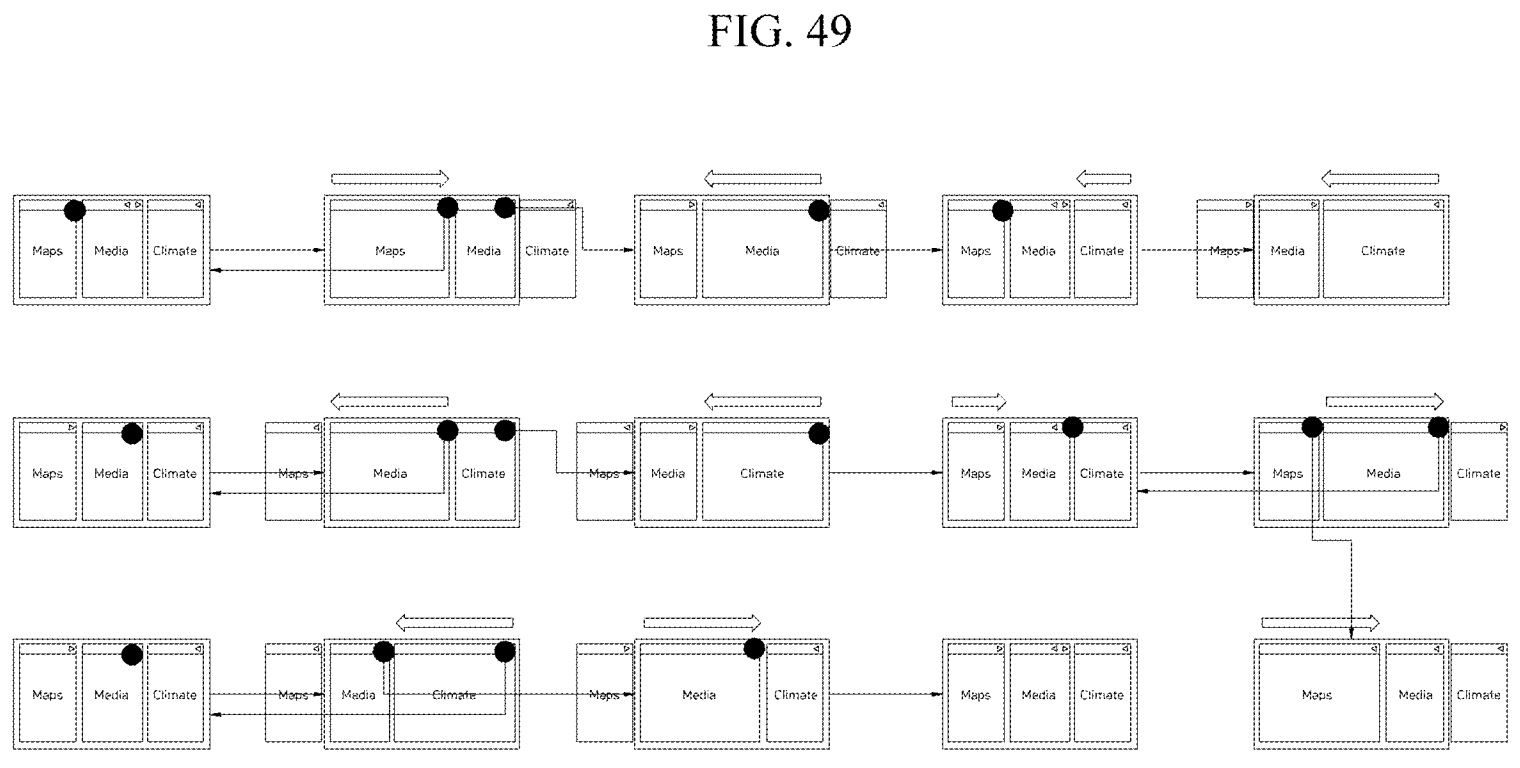

FIG. 49 illustrates a process of resizing apps on a passenger seat entertainment display according to still yet another embodiment of the present disclosure.

When the map, media, and air-conditioning apps are displayed on the passenger seat entertainment display, it is possible to change (enlarge or reduce) the display area of the app by receiving touch signals from the app displayed in each area. When the area of the first app is changed and occupies the existing area of the second app, the second app or the third app placed near the second app is no longer displayed on the display.

Figure 50:
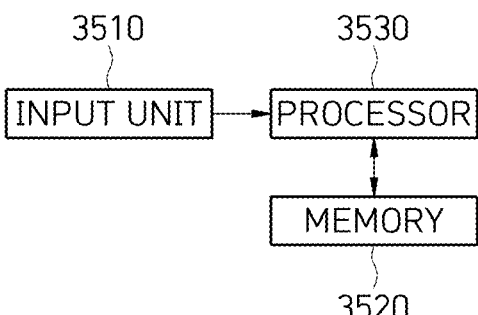
FIG. 50 illustrates a display control system using knob position information according to a further embodiment of the present disclosure.

FIG. 50 illustrates a display control system using knob position information according to a further embodiment of the present disclosure.

The display control system using knob position information according to a further embodiment of the present disclosure includes an input unit 3610 that receives knob position information in a knob operating area, a memory 3620 that stores a program for controlling the knob position information to be displayed on an in-vehicle display, and a processor 3630 that executes the program. The processor 3630 displays the knob position information in a preset area of the in-vehicle display and determines the color of the knob position information in consideration of the color displayed on the in-vehicle display.

The processor 3630 controls an affordance image to be displayed for a controllable widget according to the position of the knob among the areas allocated to the respective knob operating areas to correspond to a plurality of applications displayed on the in-vehicle display.

The processor 3630 controls the widget on which the affordance image is displayed to change depending on the movement of the knob.

When the knob is moved and located in a certain area of the knob operating area, the processor 3630 controls the affordance image to be displayed on the widget of the passenger seat entertainment display, which is an area other than the in-vehicle display.

The processor 3630 uses the knob position information to transmit a control signal to emit ambient light in the corresponding area.

Figure 51:
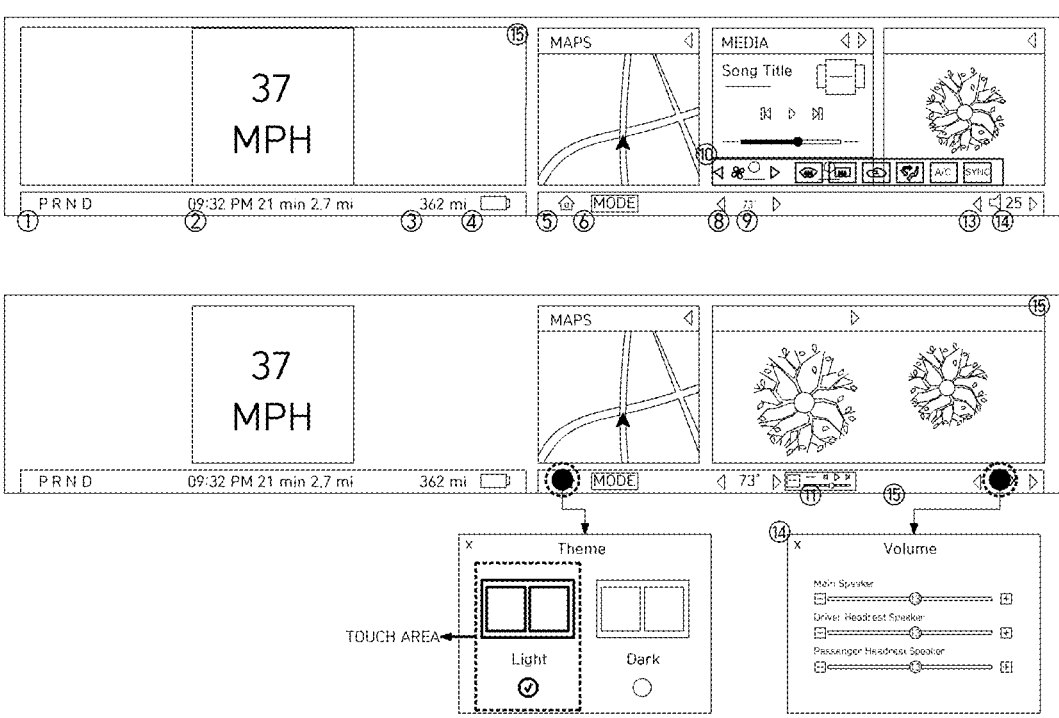
FIG. 51 illustrates an in-vehicle display screen to display a current knob position according to the further embodiment of the present disclosure.

FIG. 51 illustrates an in-vehicle display screen to display a current knob position according to the further embodiment of the present disclosure. FIG. 52 illustrates a configuration of the in-vehicle display to display the current knob position according to the further embodiment of the present disclosure.

1 refers to the PRND status, 2 refers to the remaining destination information, 3 refers to the distance available for driving, 4 refers to the remaining battery, 5 refers to the home button, 6 refers to the mode button, 8 refers to the temperature control button, 9 refers to the current setting temperature, 10 refers to the air-conditioning pop-up, 11 refers to the mini music player, 13 refers to the volume control button, 14 refers to the current setting volume button, and 15 refers to the current knob position image.

The size, color, and shape of the current knob position image may be determined in consideration of the area color displayed on the in-vehicle display.

Figure 53:
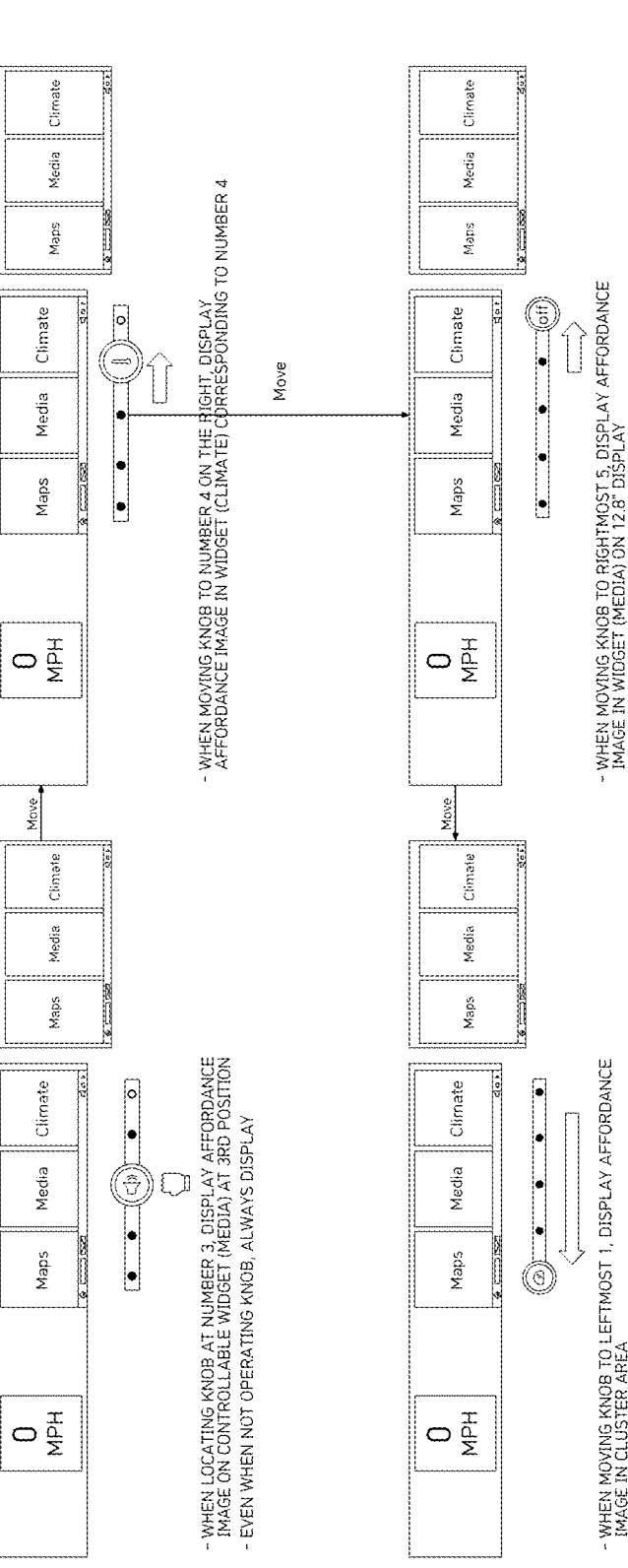
FIG. 53 illustrates a process of displaying knob position information according to the further embodiment of the present disclosure.

FIG. 53 illustrates a process of displaying knob position information according to the further embodiment of the present disclosure.

When the knob is located in area 3 of the knob operating range, the affordance image is displayed on the widget (media) that is controllable at that position. Even when the knob is not operated, the affordance image is always displayed according to the position of the knob.

When the knob is moved to area 4 of the operating range thereof, the widget is changed to the air-conditioning menu, the affordance image is displayed in the air-conditioning menu, and the icon is also changed and displayed on the display of the knob itself.

When the knob is moved to area 5, which is the rightmost area of the operating range thereof, the affordance image is displayed in the widget of the passenger seat entertainment display as allocated to that position.

When the knob is moved to area 1, which is the leftmost area of the operating range thereof, the affordance image is displayed in the cluster widget as allocated to that position.

Figure 54:
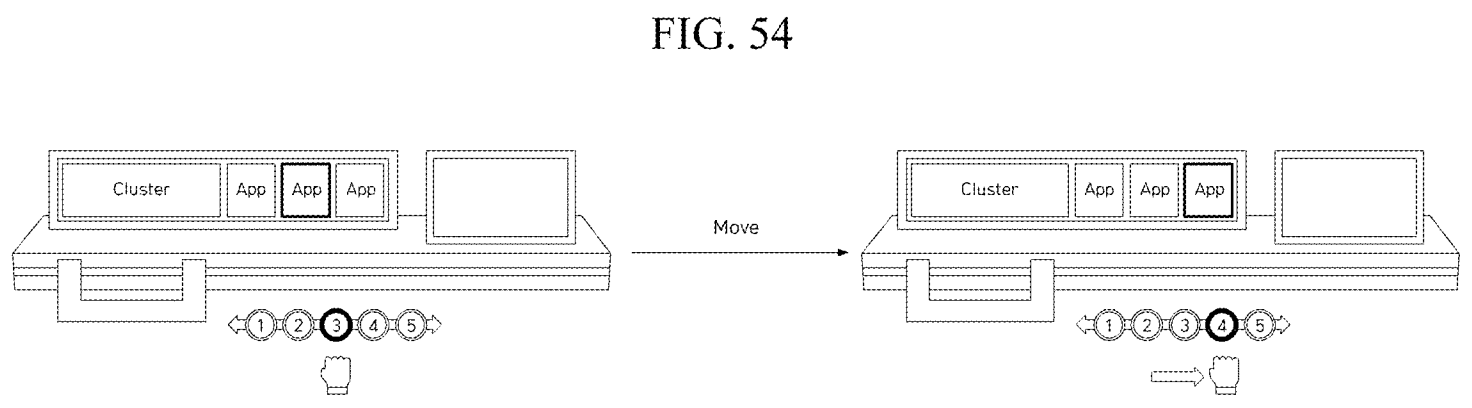

FIG. 54 illustrates a process of displaying knob position information using ambient light according to the further embodiment of the present disclosure.

For the vehicle using ambient light, the position of the knob is expressed with lighting, in addition to the affordance image for the widget on the in-vehicle display.

Referring to FIG. 54, when the knob is located in area 3 of the operating range thereof, the affordance image is displayed on the widget (media) that is controllable at that position, and the ambient light in that area is emitted.

When the knob is moved to area 4 on the right of the operating range thereof, the affordance image is displayed on the widget (air-conditioning) that is controllable at that position, and the ambient light in that area is emitted.

Figure 55:
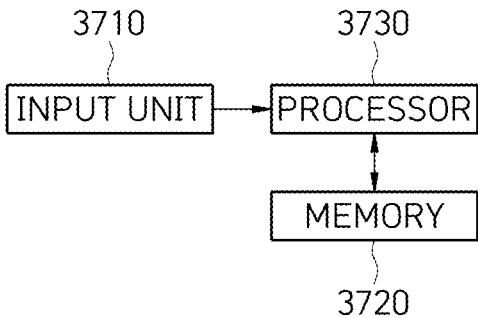
FIG. 55 illustrates a display control system according to another further embodiment of the present disclosure.

FIG. 55 illustrates a display control system according to another further embodiment of the present disclosure.

The display control system according to another further embodiment of the present disclosure includes an input unit 3710 that receives rear seat entertainment viewing information, a memory 3720 that stores a program for displaying the rear seat entertainment viewing information and controlling transmission of a command of whether to permit viewing, and a processor 3730 that executes the program. The processor 3730 provides a capture screen of the content viewed in the rear seat as the rear seat entertainment viewing information, and controls the rear seat display in response to the touch input signal for the command of whether to permit viewing input through the guardian seat display.

The processor 3730 provides a capture screen of content on the selected rear seat display based on the selection information on the plurality of rear seat displays.

The processor 3730 provides rear seat entertainment viewing information including capture time information and capture image information.

The processor 3730 provides capture screens at preset time intervals.

The processor 3730 transmits a control command to stop the display of the content on the rear seat display by clicking the block button.

The processor 3730 may not only provide a capture screen of content on the rear seat display in response to the user input signal, but may also analyze video and audio information on the rear seat display to transmit a notification about viewing unhealthy content to the driver seat display. In this case, the processor 3730 deactivates providing the notification about content using the rear seat display when an app related to driving safety is displayed, such as when an around view monitoring app is displayed on the driver seat display while parking or an app showing the next lane screen is displayed on the driver seat display while changing lanes.

Figure 58:
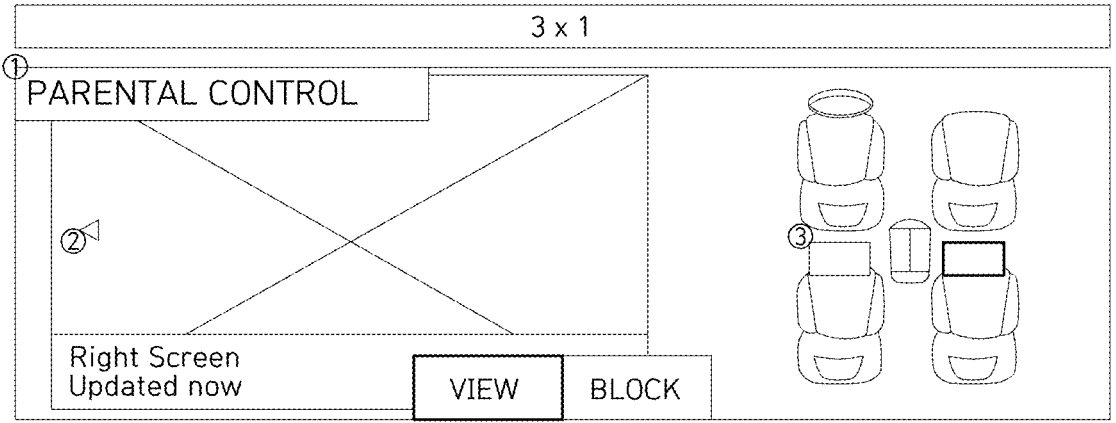
FIG. 58 illustrates a display control screen in 3×1 mode according to another further embodiment of the present disclosure.

FIG. 56 illustrates a display control screen in 1×1 and 2×1 modes according to another further embodiment of the present disclosure. FIG. 57 illustrates a configuration of the display control screen according to another further embodiment of the present disclosure. FIG. 58 illustrates a display control screen in 3×1 mode according to another further embodiment of the present disclosure. FIG. 59 illustrates a configuration of the display control screen according to another further embodiment of the present disclosure.

Occupants in the first row may check the screen of the rear seat entertainment display in the second row received through IVI and PSE through the display assigned to them, and then determine whether to permit viewing.

For parents in the first row, it is difficult to check what content their children are consuming when they ride in the second row, but according to another further embodiment of the present disclosure, it may check the screen currently being displayed on the rear seat entertainment (RSE) in the second row through the IVI display in the first row and control the screen such as turning it off.

Figure 60:
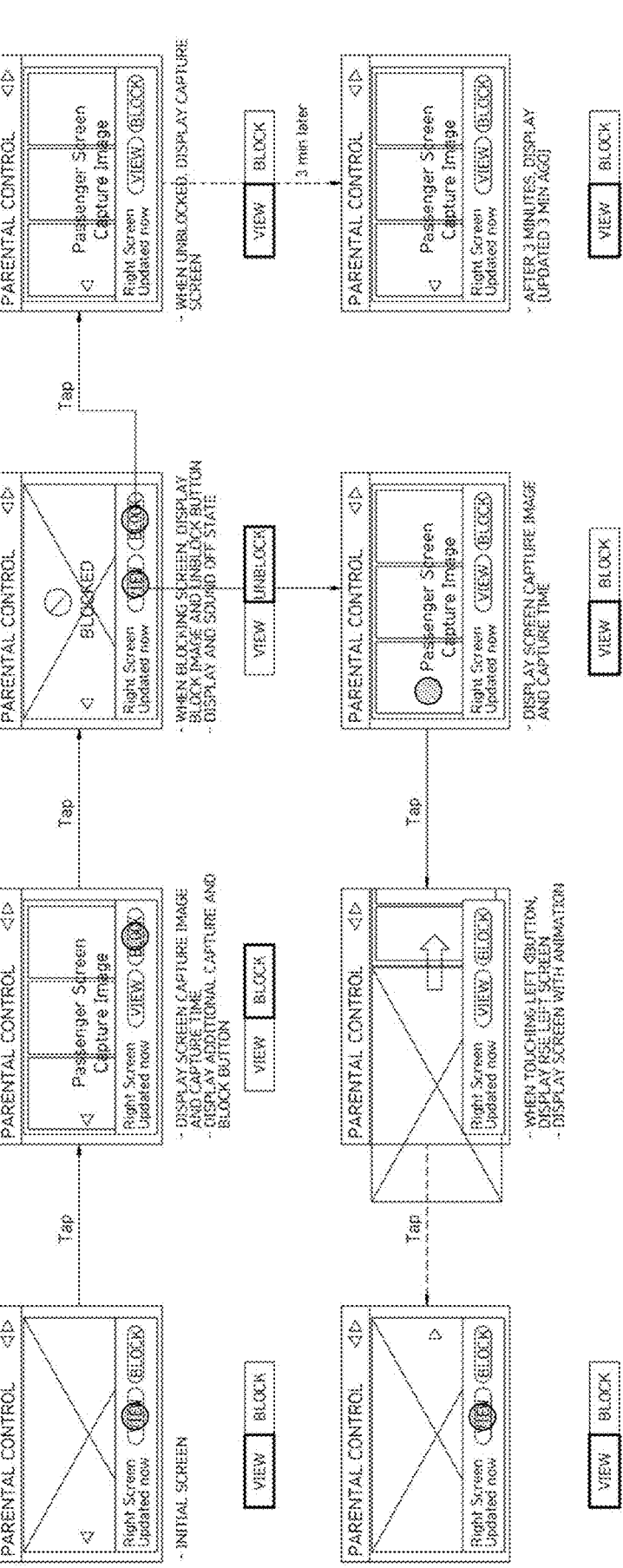
FIG. 60 illustrates a process of display control according to another further embodiment of the present disclosure.

FIG. 60 illustrates a process of display control according to another further embodiment of the present disclosure.

On the initial screen, when the view button is touched, the screen capture image and capture time for the content being viewed through the rear seat display are displayed. The additional capture and the block button are displayed, and when the screen is blocked, the rear seat display is turned off and the block image and the unblock button are displayed. The display and the sound are turned off.

When unblocked, the capture screen is displayed, and after a certain time passes after capture, information on the certain time is displayed.

When the left button is touched on the screen, the screen of the left rear seat display in the second row is displayed, and an animation screen is displayed for moving from checking the right rear seat display in the second row to checking the left rear seat display in the second row.

Figure 61:
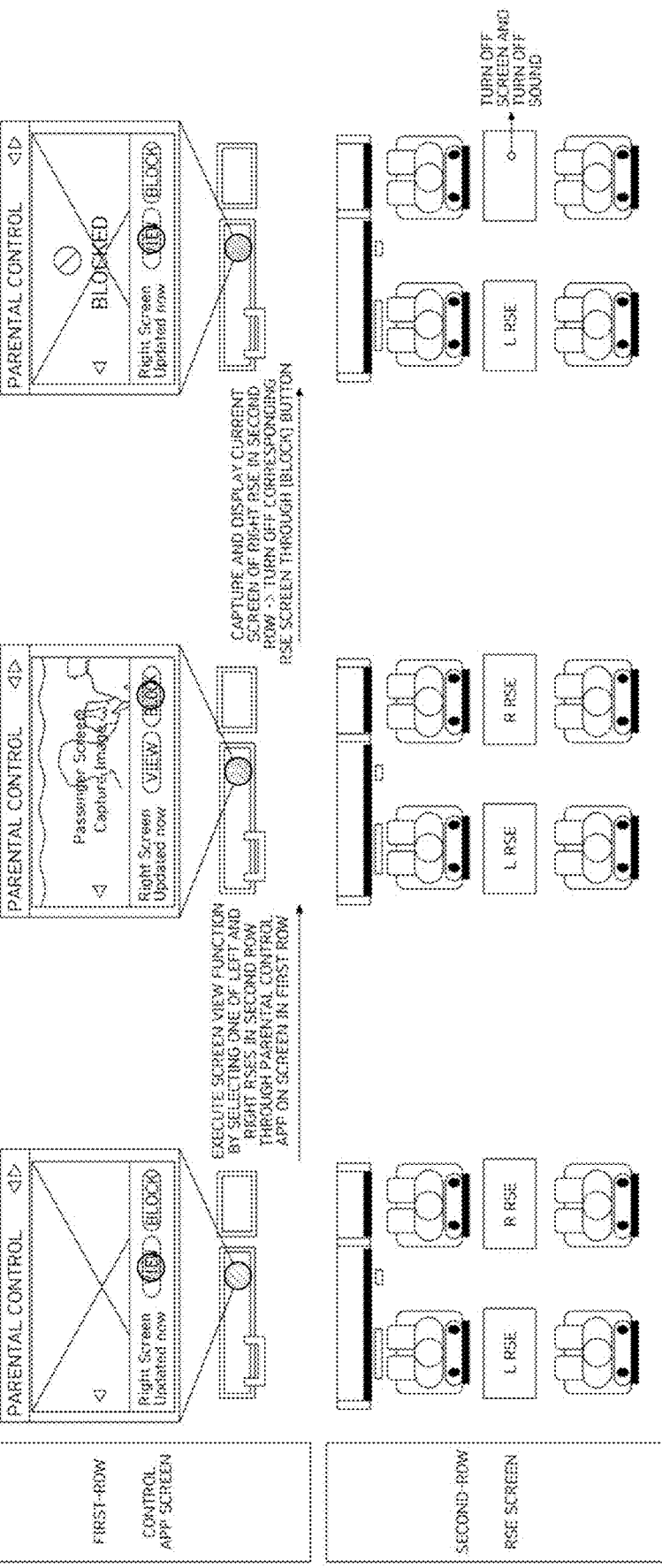
FIG. 61 illustrates display control according to another further embodiment of the present disclosure.

FIG. 61 illustrates display control according to another further embodiment of the present disclosure.

When selecting either the left rear seat entertainment display or the right rear seat entertainment display in the second row through the parent control application on the screen in the first row and running the screen view function, a video or capture screen of the content being viewed on the display in the second row is provided.

The block button on the screen in the first row may allow the screen of the corresponding rear seat display to be turned off and the sound to be also turned off.

Figure 62:
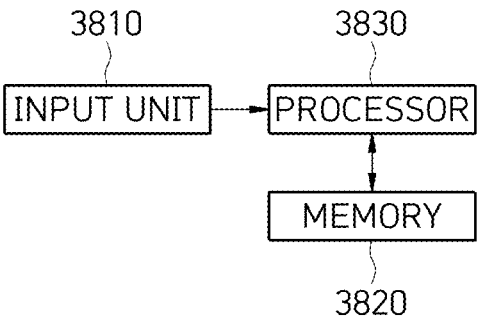
FIG. 62 illustrates a vehicle mood lamp control system for mitigating motion sickness according to still another further embodiment of the present disclosure.

FIG. 62 illustrates a vehicle mood lamp control system for mitigating motion sickness according to still another further embodiment of the present disclosure.

The vehicle mood lamp control system for mitigating motion sickness according to still another further embodiment of the present disclosure includes an input unit 3810 that receives an application execution request signal for mitigating motion sickness, a memory 3820 that stores a program for providing a motion sickness mitigation control function using a vehicle mood lamp in response to the application execution request signal, and a processor 3830 that executes the program. The processor 3830 transmits a control signal for the vehicle mood lamp in consideration of at least one of a position of an occupant suffering from motion sickness, driving monitoring information, and a degree of motion sickness.

The processor 3830 transmits a control signal using in-cabin monitoring information.

When considering the position of the occupant suffering from motion sickness, the processor 3830 transmits a control command for the ambient light in the preset area depending on the full occupant mode, the driver mode, and the passenger mode.

For the driver mode or the passenger mode, the processor 3830 transmits a control command for the ambient lights arranged in a preset number of areas close to the driver or passenger side in the preset partition.

When considering the driving monitoring information, the processor 3830 transmits a control signal that causes the LED animation speed of the ambient light to vary depending on the driving speed.

When considering the driving monitoring information, the processor 3830 transmits a control signal to adjust the brightness of the ambient light according to the driving direction.

When considering the degree of motion sickness, the processor 3830 transmits the control signal to adjust the ambient light to a preset color according to the level.

FIG. 63 illustrates a screen configuration of an interior application according to still another further embodiment of the present disclosure.

1 refers to the app title, 2 refers to the app zoom button, 3 refers to the interior tab button, 4 refers to the interior image, 5 refers to the color name, 6 refers to the mood lamp tab button, 7 refers to the color selection button, 8 refers to the color list focus, 9 refers to the knob pop-up (On/Off), and 10 refers to the knob pop-up (brightness).

FIG. 64 illustrates a sync screen of the interior application according to still another further embodiment of the present disclosure.

According to still another further embodiment of the present disclosure, it provides a mood lamp control menu for motion sickness mitigation, and performs mood lamp control for motion sickness mitigation for the driver area, the passenger area, and the driver and passenger area by activating the corresponding function.

Figure 66:
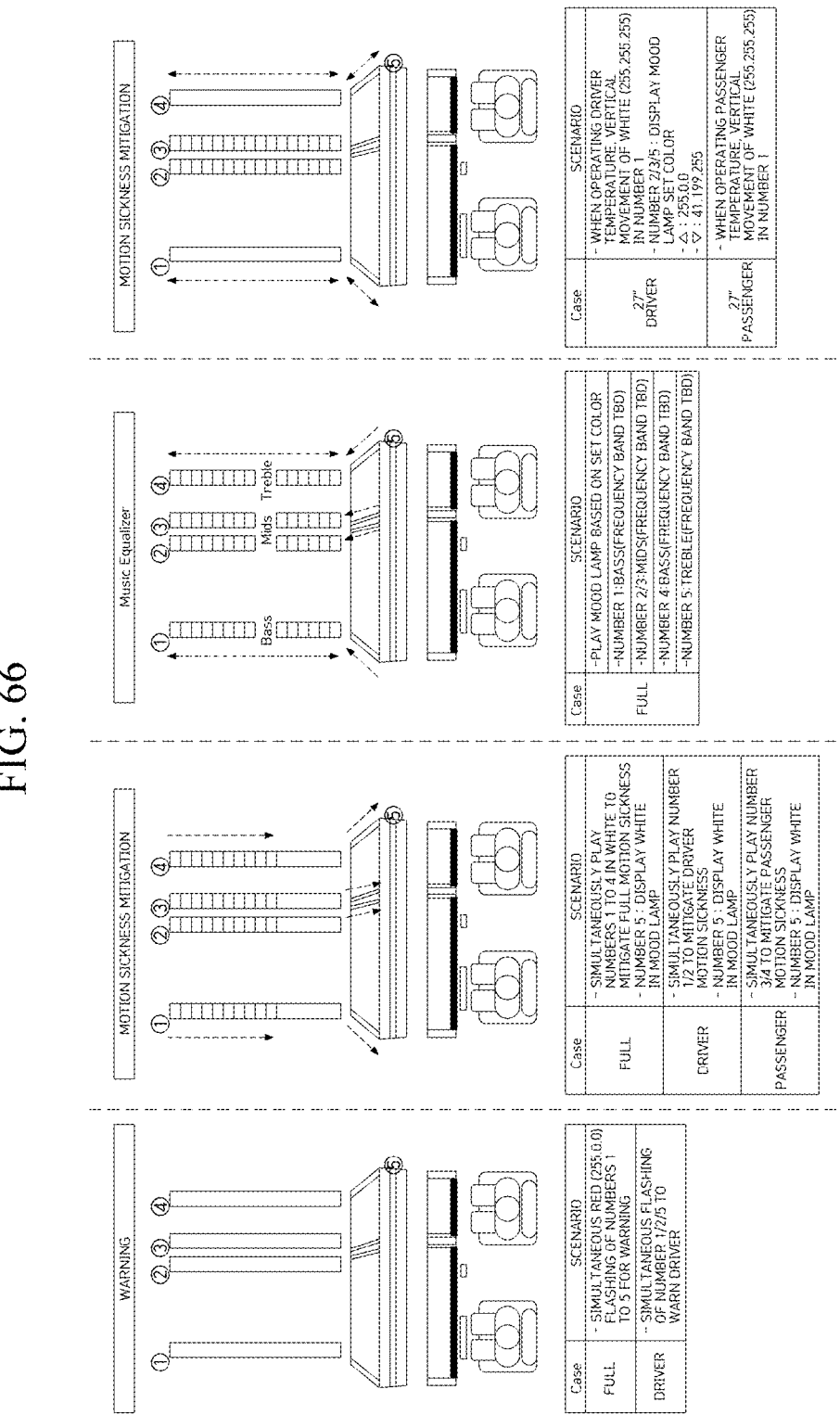
FIG. 66 illustrates a notification using ambient light according to still another further embodiment of the present disclosure.
Figure 67:
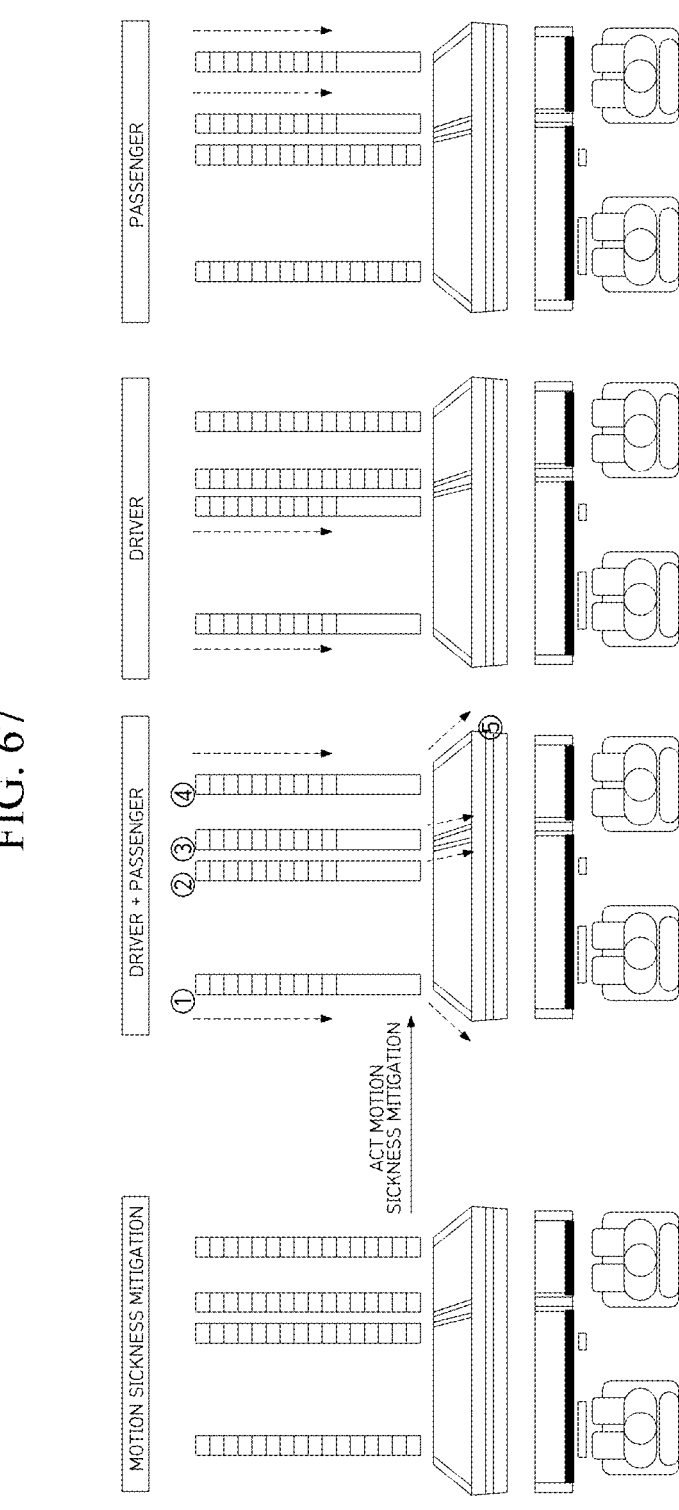
FIG. 67 illustrates ambient light control for mitigating motion sickness according to still another further embodiment of the present disclosure.

FIG. 65 illustrates ambient light according to still another further embodiment of the present disclosure. FIG. 66 illustrates a notification using ambient light according to still another further embodiment of the present disclosure. FIG. 67 illustrates ambient light control for mitigating motion sickness according to still another further embodiment of the present disclosure.

The mood lamp is explained assuming that it consists of a driver seat lamp, a center-left lamp, a center-right lamp, a passenger seat lamp, and a horizontal lamp.

Regarding the "Warning" function, in the full mode, lamps 1 to 5 flash red simultaneously for warning, and in the driver mode, lamps 1, 2, and 5 flash simultaneously to warn the driver.

Regarding the "Motion Sickness Mitigation" function, in the full mode, numbers 1 to 4 are played simultaneously in white and lamp 5 displays white, in the driver mode, numbers 1 and 2 are played simultaneously and lamp 5 displays white, in the passenger mode, numbers 3 and 4 are played simultaneously and lamp 5 displays white.

In the "Music Equalizer" function, ambient light control is performed for numbers 1 to 5 according to the frequency band and the mood lamp setting color.

In the "Air-Conditioning" function, when the driver operates, vertical movement of white in number 1 is performed, and mood lamps 2, 3, and 5 display the set color.

When the temperature of the passenger seat is operated, vertical movement of white in number 1 is performed.

Figure 68:
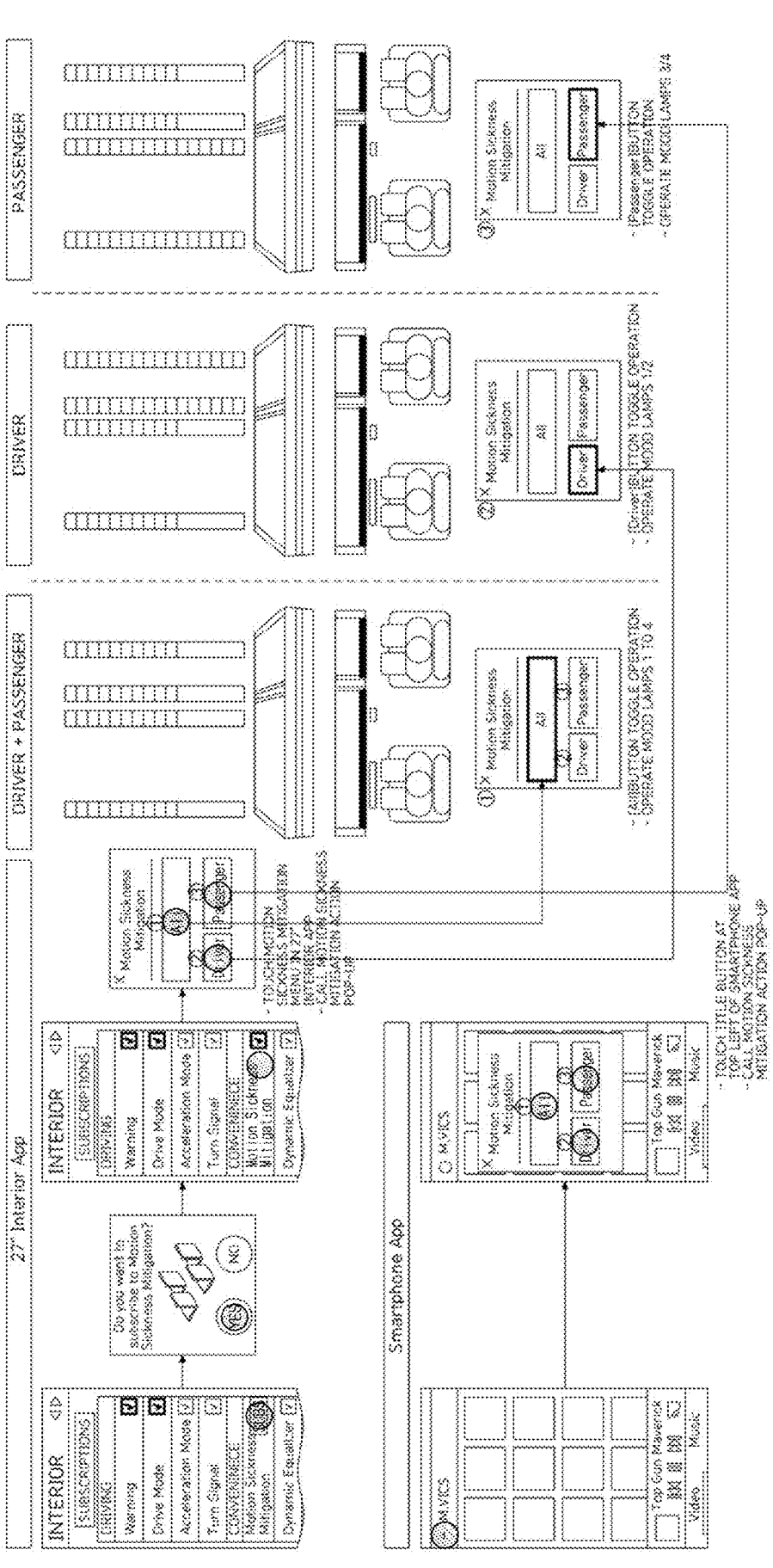
FIG. 68 illustrates a process of ambient light control for mitigating motion sickness according to still another further embodiment of the present disclosure.

FIG. 68 illustrates a process of ambient light control for mitigating motion sickness according to still another further embodiment of the present disclosure.

When an ICM-based warning occurs, animating is performed in white (255.255.255) in mood lamps 1 to 4, and white in number 5 is turned on.

When both the driver and the passenger suffers from motion sickness based on the ICM, the entire mood lamp operation is performed and it is executed when the motion sickness mitigation action button is touched. In this case, it is executed by the input of the motion sickness mitigation button in the interior application on the in-vehicle display (driver seat display) and by the input of the motion sickness mitigation button on the smartphone.

In the driver mode, when the driver suffers from motion sickness based on the ICM, mood lamps 1 and 2 are operated, lamps 3 and 4 are turned off, and lamp 5 is turned on in white.

In the passenger mode, when the passenger suffers from motion sickness based on the ICM, mood lamps 3, 4, and 5 flash, and lamps 1 and 2 are turned off.

The motion sickness mitigation mood lamp may be operated so as to be linked to the desired seat.

FIG. 69 illustrates mood lamp control using driving information according to still another further embodiment of the present disclosure.

When the motion sickness mitigation function is provided, the animation of the mood lamp may be run according to the vehicle speed and may be played individually and simultaneously by the driver and the passenger.

Figure 70:
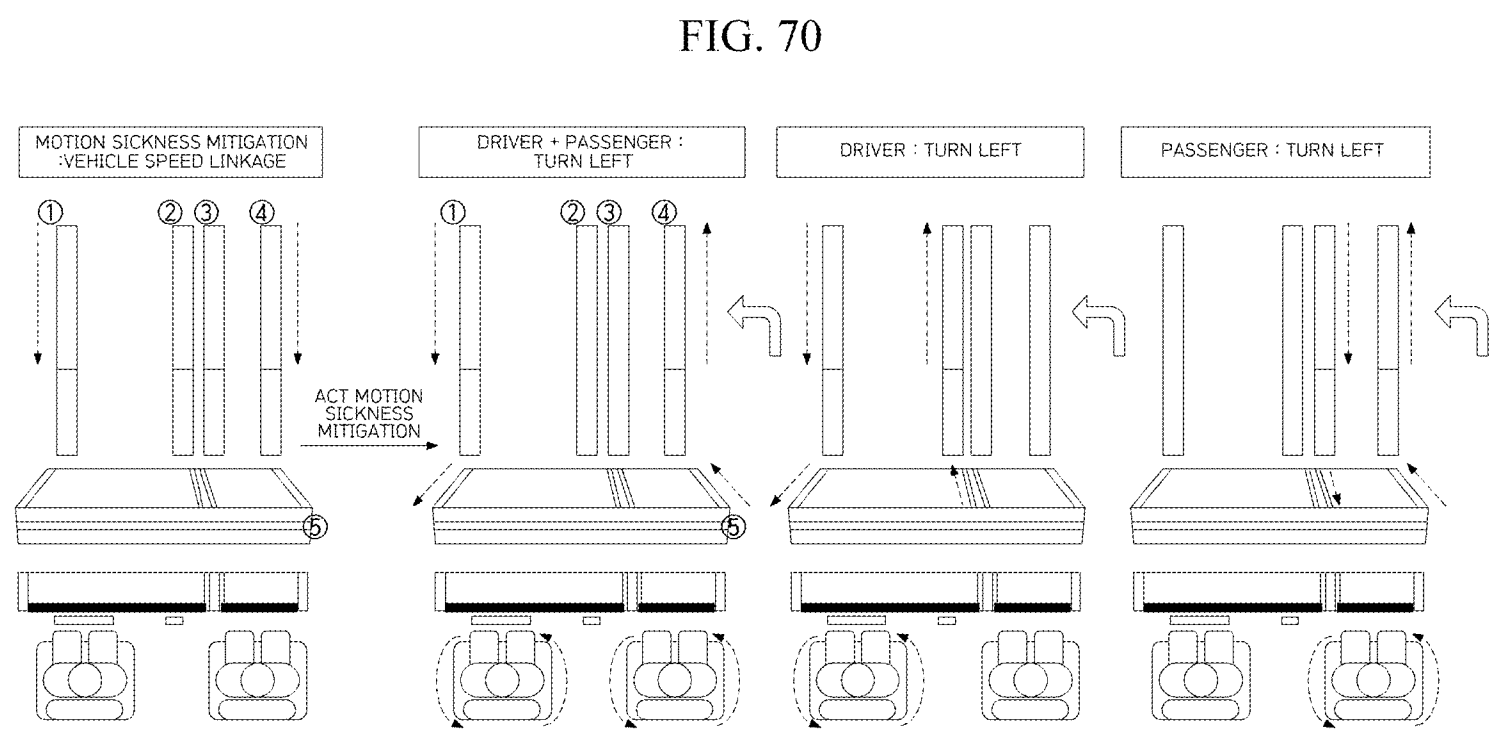

FIG. 70 illustrates ambient light control for mitigating motion sickness linked to rotation according to still another further embodiment of the present disclosure.

When motion sickness mitigation is acted, the animation of the mood lamp may be run according to the vehicle speed and may be controlled to be played individually and simultaneously by the driver and the passenger.

When an ICM-based warning occurs, animating is performed in white (255.255.255) in mood lamps 1 to 4, and white in number 5 is turned on.

When both the driver and the passenger suffers from motion sickness based on the ICM, the entire mood lamp operation is performed and it is executed when the motion sickness mitigation action button is touched. In this case, it is executed by the input of the motion sickness mitigation button in the interior application on the in-vehicle display (driver seat display) and by the input of the motion sickness mitigation button on the smartphone.

In the driver mode, when the driver suffers from motion sickness based on the ICM, mood lamps 1 and 2 are operated, lamps 3 and 4 are turned off, and lamp 5 is turned on in white.

In the passenger mode, when the passenger suffers from motion sickness based on the ICM, mood lamps 3, 4, and 5 flash, and lamps 1 and 2 are turned off.

FIG. 71 illustrates ambient light control considering the degree of motion sickness according to still another further embodiment of the present disclosure.

According to still another further embodiment of the present disclosure, when motion sickness mitigation is acted, the color of the mood lamp is changed by determining the degree of motion sickness.

As illustrated in FIG. 71, the more severe the motion sickness, the more high-contrast color is displayed.

When the degree of motion sickness is low, it will be low contrast. When the degree of motion sickness is middle, it will be middle contrast. When the degree of motion sickness is high, it will be high contrast.

With the advent of autonomous vehicles, various studies have been conducted on ways to increase convenience for occupants. As an example, a method has been proposed to increase visibility and convenience for occupants by moving a display left/right or up/down for driving mode. In addition, a technology has been proposed to implement a retractable steering wheel so that occupants are movable more freely in an autonomous driving mode.

However, moving the display left/right or up/down maintains the distance between the occupant and the display, which may inevitably limit the visibility of the occupant.

In order to solve the problems described above, the present disclosure is to provide a technology that enables a display to move forward or backward for vehicle driving mode and to tilt by rotation, thereby ensuring convenience of occupants.

In addition, the present disclosure is to provide a technology for ensuring movement of a variety of displays depending on the type of vehicle driving.

Furthermore, the present disclosure is to propose a technology ensuring space efficiency and safety with other components arranged in the front of a vehicle when implementing moving displays.

The present disclosure is not limited to the above-mentioned objects, and other objects of the present disclosure can be clearly understood by those skilled in the art to which the present disclosure pertains from the following description.

In accordance with an aspect of the present disclosure, there is provided a moving display device that includes a display moved forward or backward depending on a vehicle driving mode, and a moving device that is integrally mounted behind the display to move the display and tilt the display. The moving device includes a predetermined number of rails, a predetermined number of actuators, and a predetermined number of gear modules at the rear of the display for moving the display forward or backward.

In an embodiment, the moving device includes an actuator that provides driving force for moving the display forward or backward.

In an embodiment, the rail includes a first moving rail moved forward and backward by the actuator, and a second moving rail disposed on the first moving rail. The first moving rail and the second moving rail are connected by a rail connection bush, and the first moving rail and the second moving rail are each coupled at one end thereof to the display.

In an embodiment, the moving device is configured such that one end of each of the first and second moving rails is coupled to a display hinge, and the first moving rail and the second moving rail are coupled at the other end thereof by a tension spring.

In an embodiment, when the display protrudes forward, the moving device is configured such that the first and second moving rails are moved forward simultaneously by the actuator, and the second moving rail moves a certain distance and then stops by a latching jaw located at the other end thereof.

In an embodiment, when the display tilts, the moving device is configured such that the first moving rail moves a greater distance than the second moving rail, thereby stretching the tension spring and tilting the display backward by the display hinge.

In an embodiment, when the display returns back from tilting, the tension spring is restored to move the first moving rail backward, the display returns back from tilting, and the first and second moving rails move backward simultaneously.

In an embodiment, the moving device is configured such that one end of the first moving rail is coupled to a display hinge, one end of the second moving rail is coupled to a display gear, the display gear includes a rotation gear and a torsion spring, and the display moves forward and backward through engagement between the gear part formed on the first moving rail and the rotation gear.

In an embodiment, when the display protrudes forward, the moving device is configured such that the first and second moving rails are moved forward simultaneously by the actuator, and the second moving rail moves a certain distance and then stops by a latching jaw located at the other end thereof.

In an embodiment, when the display tilts, the moving device is configured such that the first moving rail moves a greater distance than the second moving rail, thereby compressing the torsion spring and tilting the display backward by the rotation gear rotating counterclockwise.

In an embodiment, when the display returns back from tilting, the torsion spring is restored, the rotation gear rotates clockwise to move the first moving rail backward, the display returns back from tilting, and the first and second moving rails move backward simultaneously.

In accordance with another aspect of the present disclosure, there is provided a vehicle that includes a moving display device that includes a moving display disposed on a cockpit of the vehicle and a moving device. The moving display device is configured such that, when the riding mode of the vehicle is changed, the moving display performs at least one of forward moving, backward moving, and tilting.

In an embodiment, the driving mode of the vehicle includes an autonomous driving mode and a manual driving mode.

In an embodiment, the moving display device is configured such that, when the riding mode of the vehicle is the autonomous driving mode, the moving display moves forward toward the driver and tilts toward the cockpit.

In an embodiment, the moving display device is configured such that, when the riding mode is the manual driving mode, the moving display rotates to return back to the state before tilting and moves backward toward the cockpit.

According to the embodiments of the present disclosure as described above, the display is movable forward or backward depending on the vehicle driving mode, going beyond the usability of the vehicle display used in normal driving situations and moving to a position where full screen touch operation is possible. Therefore, it is possible to improve convenience by maximizing the usability of the large-screen display.

The present disclosure is not limited to the above-mentioned effects, and other effects of the present disclosure can be clearly understood by those skilled in the art to which the present disclosure pertains from the following description.

Exemplary embodiments of the present disclosure will be described below in detail with reference to the accompanying drawings so as to be easily realized by those skilled in the art to which the present disclosure pertains. The present disclosure may, however, be embodied in different forms and should not be construed as limited to the embodiments set forth herein. In order to clearly illustrate the present disclosure in the drawings, parts irrelevant to the description may be omitted in the drawings, and like reference numerals refer to like elements throughout the specification.

It will be understood herein that, when a component is referred to as "comprising" or "including" any component, it does not exclude other components, but can further comprise or include the other components unless otherwise specified.

In addition, the term "vehicle" as used in the following description assumes a vehicle used to transport occupants, but is not limited thereto and may include urban air mobility (UAM), buses, and the like.

Figure 72:
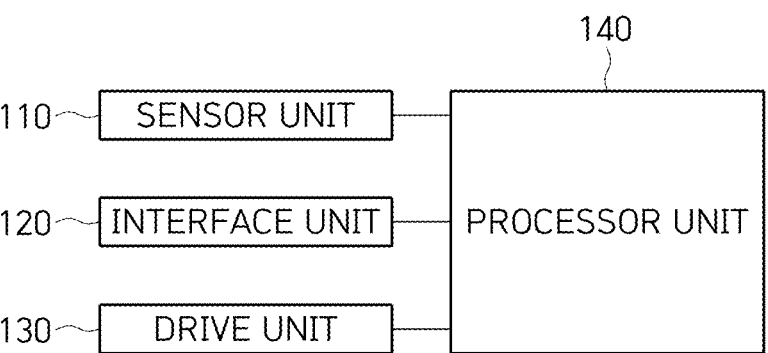
FIG. 72 illustrates a schematic configuration of a vehicle driving system according to an embodiment of the present disclosure.

FIG. 72 illustrates a schematic configuration of a vehicle driving system according to an embodiment of the present disclosure.

In the embodiment of the present disclosure, the vehicle may include a sensor unit 110, an interface unit 120, a drive unit 130, and a processor unit 140.

The sensor unit 110 may include at least one sensor capable of recognizing conditions inside and/or outside the vehicle. The sensor unit 110 may include, for example, a camera sensor, an infrared sensor, a radar sensor, a voice sensor, a temperature sensor, a humidity sensor, and the like.

The interface unit 120 may include at least one interface that provides the user of the vehicle with various types of audio-visual data or information related or unrelated to the vehicle, and/or provides a control tool for the vehicle or its component(s). The interface unit 120 may include, for example, front display(s) provided to occupant(s), and/or audio device(s) provided to occupant(s). The interface unit 120 may exchange signals with at least one electronic device inside the vehicle in a wired or wireless manner. The interface unit 120 may convert an input by the user of the vehicle into an electrical signal and provide it to the processor unit 140.

The drive unit 130 may physically drive and/or drive internal or external components of the vehicle under the control of the processor unit 140. For example, the drive unit 130 may change the physical position(s) of the wheel(s), steering wheel, seat(s), and front display(s) of the vehicle.

The processor unit 140 may include at least one processor. The at least one processor in the processor unit 140 may be electrically connected to the components of the vehicle (e.g., sensor unit, interface unit, communication unit (not shown)) to exchange signals, and may control the components of the vehicle. The processor unit 140 may further include at least one memory (not shown). The at least one processor may be referred to as a controller, a microcontroller, a microprocessor, or a microcomputer. The at least one processor may be implemented by hardware, firmware, software, or a combination thereof. Examples of the at least one processor may include one or more application specific integrated circuits (ASICs), one or more digital signal processors (DSPs), one or more digital signal processing devices (DSPDs), one or more programmable logic devices (PLDs), or one or more field programmable gate arrays (FPGAs). The functions, procedures, proposals, and/or methods disclosed herein may be implemented using firmware or software, and the firmware or the software may be implemented to include modules, procedures, functions, and so on. Firmware or software established to perform the functions, procedures, proposals, and/or methods disclosed herein may be included in the at least one processor, or may be stored in the at least one memory and driven by the at least one processor. The functions, procedures, proposals, and/or methods disclosed herein may be implemented using firmware or software in the form of codes, instructions, and/or sets of instructions.

The processor unit 140 may generate control signals for the sensor unit 110, the interface unit 120, and/or the drive unit 130 based on the electrical signals received from the sensor unit 110 and/or the interface unit 120

The at least one memory may be connected to the at least one processor and may store various types of information related to the operation of the at least one processor. For example, the at least one memory may include software code including commands for performing some or all of the processes controlled by the at least one processor or for performing the procedures and/or methods described/proposed below. The at least one memory may store commands, instructions, or programs, which may, when executed, cause the at least one processor operably connected to the at least one memory to perform operations according to the embodiments of the present disclosure.

The vehicle may further include a communication unit. The communication unit may include one or more transceivers. User data, control information, wireless signals/channels, etc., mentioned in the functions, procedures, proposals, methods, and/or operation flowcharts disclosed herein may be received from one or more other devices through the one or more transceivers. For example, the one or more transceivers may be connected to the processor unit 140 and may transmit and/or receive wireless signals. For example, the at least one processor in the processor unit 140 may control the one or more transceivers to transmit user data, control information, or wireless signals to at least one other device. In addition, the processor unit 140 may control the one or more transceivers to receive user data, control information, or wireless signals from one or more other devices. In addition, the one or more transceivers may be connected to one or more antennas. The one or more transceivers may be established to transmit and/or receive user data, control information, wireless signals/channels, etc., from other device(s) through the one or more antennas.

Figure 73:
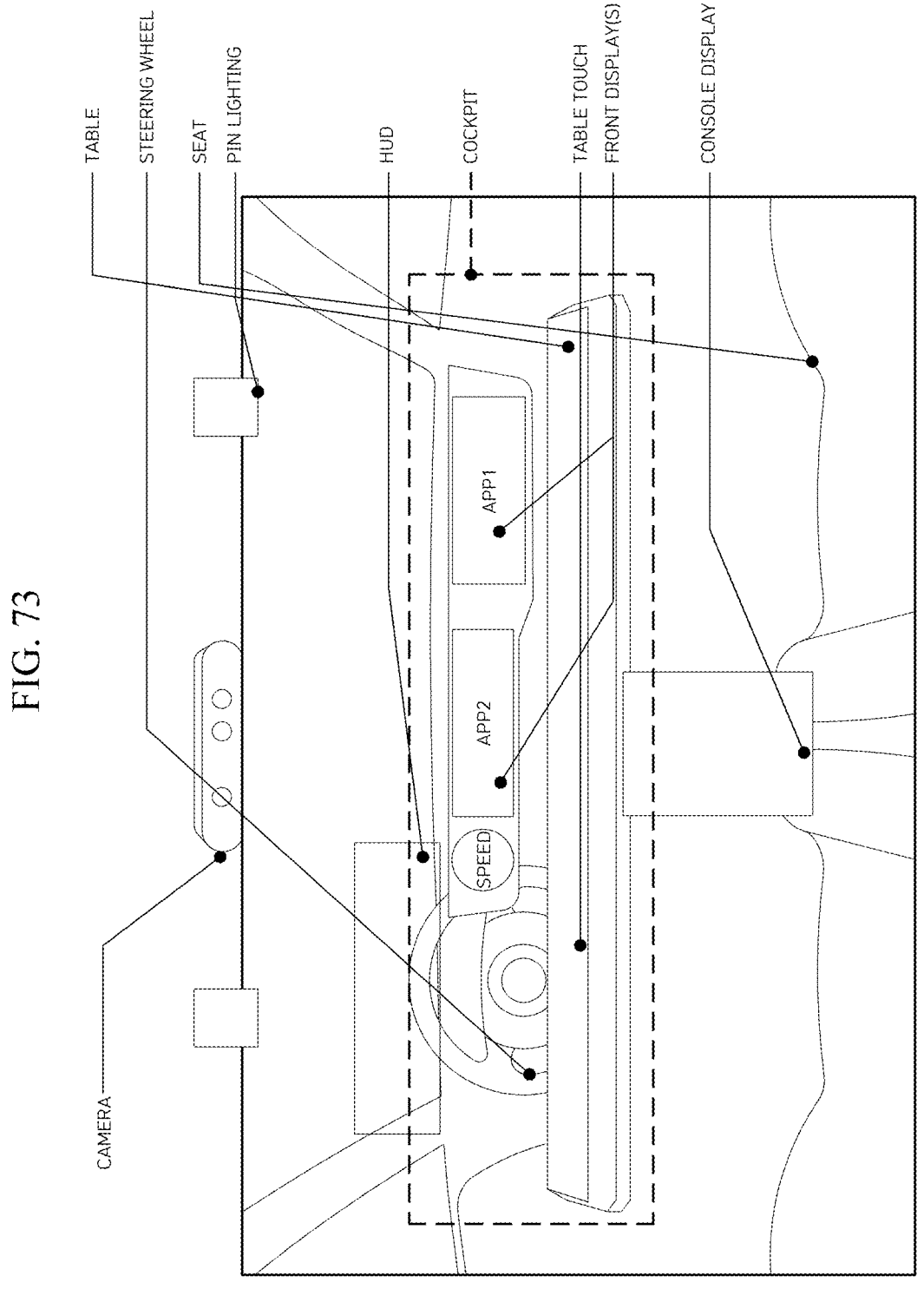
FIG. 73 is a view for explaining an internal configuration of a moving vehicle according to the embodiment of the present disclosure.

FIG. 73 is a view for explaining an internal configuration of the moving vehicle according to the embodiment of the present disclosure.

First, the vehicle according to the embodiment illustrated in FIG. 73 may include at least one camera capable of detecting conditions inside the vehicle, a head-up display (HUD), front display(s) that provide audio-visual information to occupant(s), and a console display that provides the occupants with status information of the vehicle and/or provides control for the gear, air-conditioning, and/or seat(s) of the vehicle. The vehicle also includes a steering wheel, seat(s), and lighting(s).

The front display according to the embodiment of the present disclosure may be disposed on one side of a driver seat, or if there is an auxiliary seat, in the space between the driver seat and the auxiliary seat. The front display may include a moving display device. The moving display device may be configured such that the moving display performs at least one of forward moving, backward moving, and tilting when the riding mode of the vehicle is changed.

For example, the driving mode of the vehicle may include an autonomous driving mode and a manual driving mode.

For example, the moving display device may be configured such that, when the riding mode of the vehicle is the autonomous driving mode, the moving display moves forward toward the driver and tilts toward the cockpit.

For example, the moving display device may be configured such that, when the riding mode is the manual driving mode, the moving display rotates to return back to the state before the tilting and moves backward toward the cockpit.

In addition, the front display according to this embodiment may provide an operation mechanism necessary for driving of vehicle, an indicator mechanism according to the user's status, and an office screen.

Figure 74:
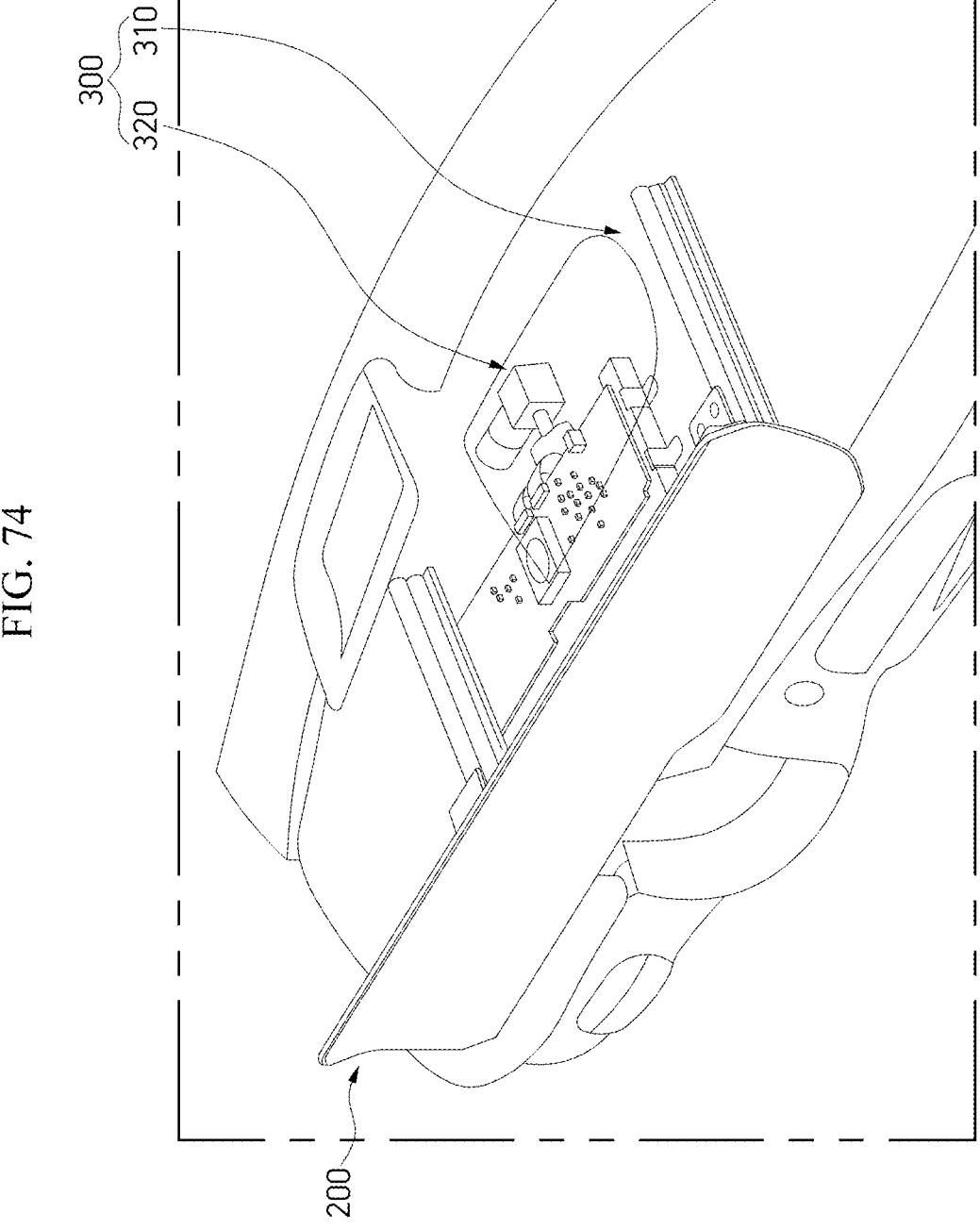
FIG. 74 is a view for explaining an operation of a moving display device according to the embodiment of the present disclosure.

FIG. 74 is a view for explaining an operation of the moving display device according to the embodiment of the present disclosure.

Referring to FIG. 74, the moving display device may include a display 200 disposed on the cockpit of the vehicle to move forward or backward, and a moving device 300 that is integrally mounted at the rear of the display 200 to move the display 200 from front to back.

The moving device 300 may be implemented by a rail 310 and an actuator 320, as will be described later. In the embodiment of the present disclosure, it is proposed that the moving device 300 behind the display 200, which is capable of moving forward or backward, uses two rails. The two rails are illustrated in the example of FIG. 72, but the present disclosure need not be limited thereto.

When the two rails are used, it is proposed to dispose an actuator 320 in the center between them to provide driving force for moving the display 200 forward or backward. In other words, the display 200 of this embodiment is preferably a large display that may be operated not only in the driver seat but also in the passenger seat. In addition, the moving device 300 preferably has a predetermined thickness or less to ensure space for arrangement of other components (e.g., HUD).

Figure 75:
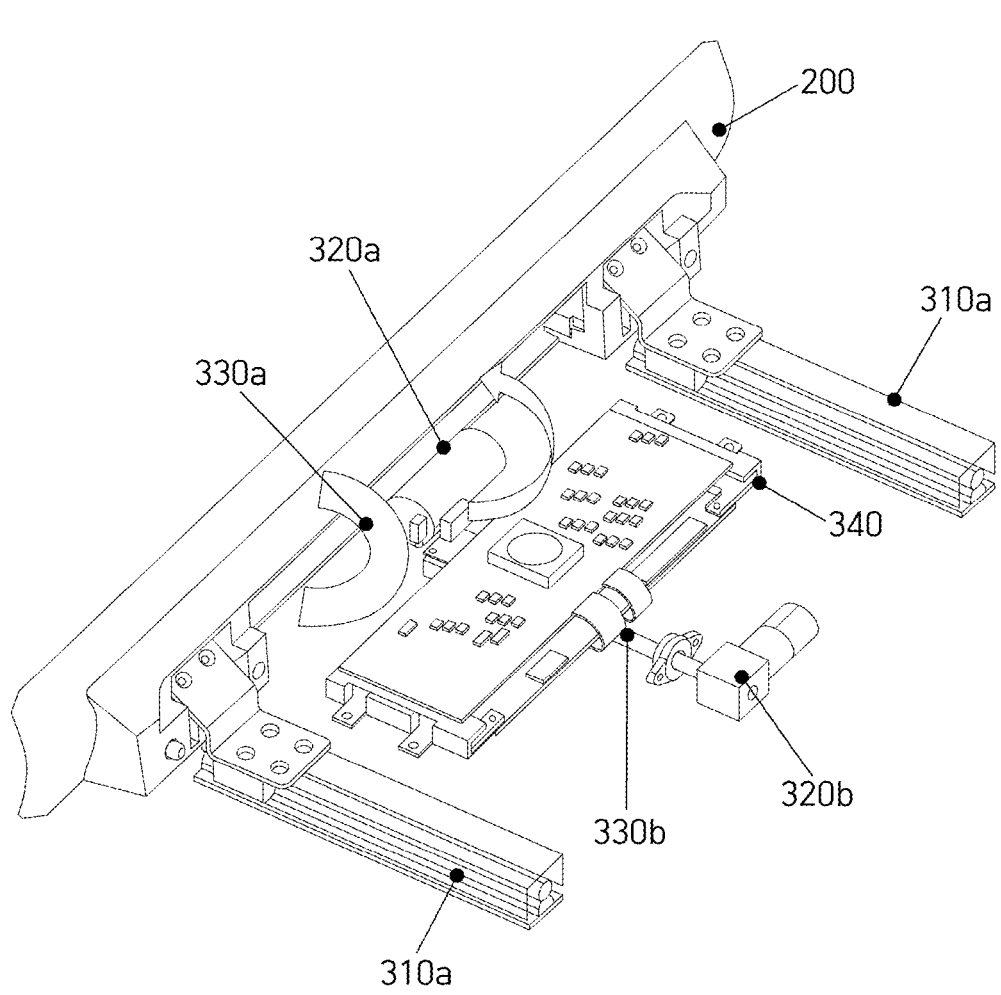
FIGS. 75 and 76 are views for explaining an operation of a table and a moving display for riding mode according to the embodiment of the present disclosure.

FIG. 75 is a view for explaining a specific configuration of the moving display according to the embodiment of the present disclosure.

The moving display according to the embodiment of the present disclosure may be configured such that components for moving the display forward or backward are arranged through the moving device 300 disposed behind the display.

First, the moving device 300, which is integrally mounted at the rear of the display to move along with the position movement of the display, may include a predetermined number of rails 310a and 310b and a predetermined number of actuators 320a and 320b.

In the example of FIG. 75, a predetermined number of actuators 320a and 320b and a predetermined number of gear modules 330a and 330b may be arranged in the center between two rails 310a and 310b. FIG. 75 illustrates that the two actuators 320a and 320b consist of a tilting actuator 320a disposed to provide driving force for moving the display up and down, and a forward/backward movement actuator 320b disposed to provide driving force for moving the display forward or backward.

Here, the predetermined number of gear modules 330a and 330b may consist of a tilting gear module 330a disposed on one side of the tilting actuator 320a and a forward/backward movement gear module 330b disposed in the front of the forward/backward movement actuator 320b.

In this case, it is proposed that a PCB 340 is disposed between the predetermined number of gear modules 330a and 330b.

Meanwhile, in the preferred embodiment of the present disclosure, the moving device 300 is limited to having a predetermined thickness or less to ensure the installation space of the display within the coverage range of the rail 310.

Figure 76:
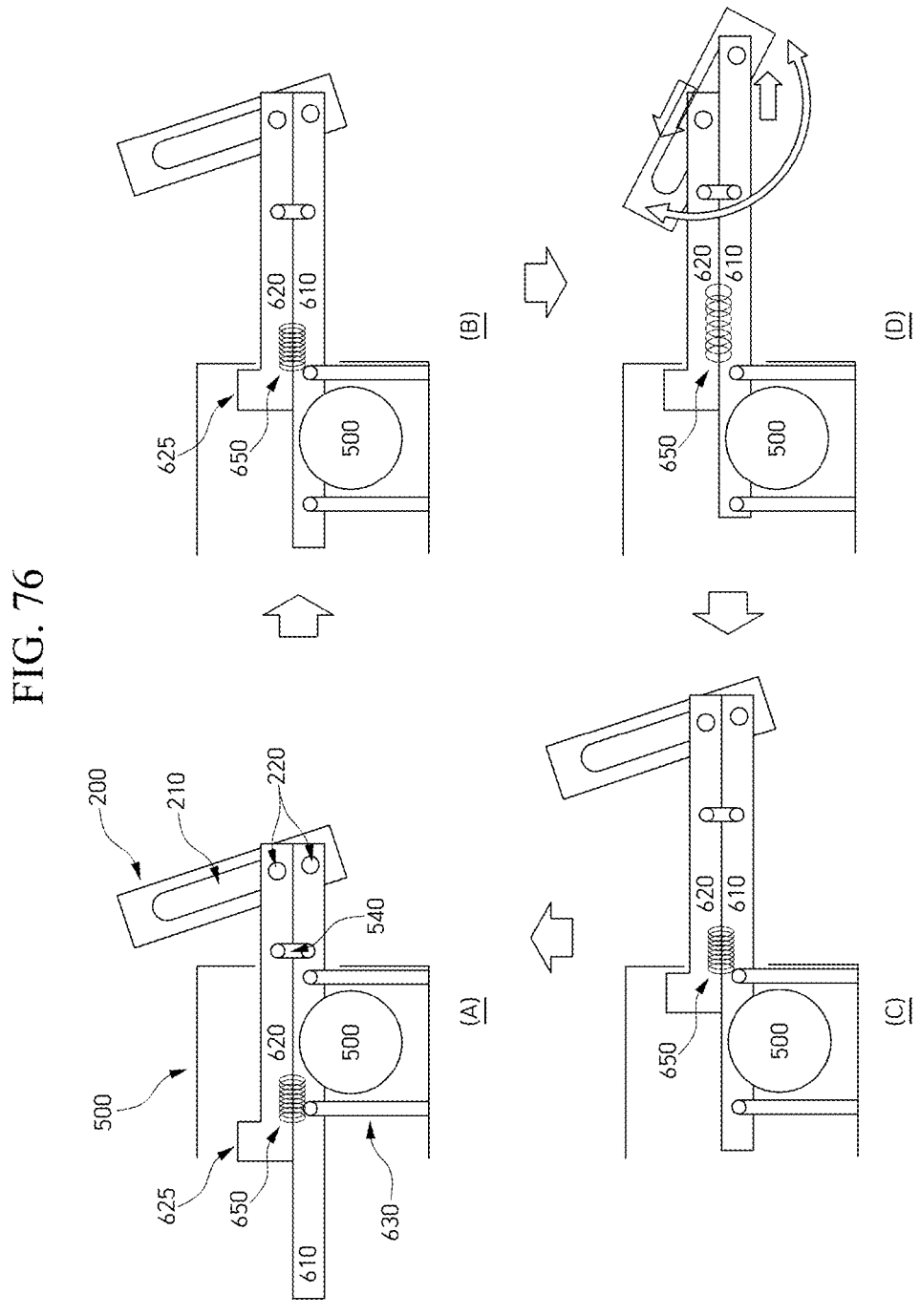

FIG. 76 is a view for explaining principles of forward and backward movement and tilting of the moving display device using one actuator and spring according to the embodiment of the present disclosure.

FIG. 76(A) is a view illustrating a default state in which the display is disposed in the vehicle, FIG. 76(B) is a view illustrating a state in which the display protrudes toward the driver and is located in front, FIG. 76(C) is a view illustrating a state in which the display tilts toward the cockpit, and FIG. 76(D) is a view illustrating a state in which the display returns back to its default state from tilting.

As illustrated in FIG. 76(A), the rail has an overlapping shape of moving rails using a type of two-stage sliding.

Moving rails 610 and 620 have a vertically overlapping shape. Each of the moving rails 610 and 620 may be coupled to a display hinge 220 disposed on a display rail 210 located on the side of the display.

The first moving rail 610 may be coupled to a rail regulation bush 630 disposed in a cockpit 400. The second moving rail 620 may has one end connected to the display hinge 220, and the other end formed with a latching jaw 625.

The first moving rail 610 and the second moving rail 620 may be coupled at one area thereof by a rail connection bush 640 and at the other end thereof by a tension spring 650.

As illustrated in FIG. 76(B), when the display 200 protrudes forward, the moving rails 610 and 620 are moved simultaneously by an actuator 500 and shaped to protrude from the cockpit 400. In this case, the latching jaw 625 of the second moving rail 620 may be latched to the cockpit 400, thereby stopping the second moving rail 620.

As illustrated in FIG. 76(C), when the display 200 is tilted, only the first moving rail 610 may be moved forward by the actuator 500 and the display 200 may be tilted backward by the display hinge 220. In this case, as the first moving rail 610 protrudes forward, the tension spring 650 may increase.

As illustrated in FIG. 76(D), when the display 200 returns back from tilting, the tension spring 650 may be restored and the first moving rail 610 may move backward. At the same time, the moving rails 610 and 620 may move backward simultaneously in order for the display 200 to return back to its default state from tilting.

Figure 77:
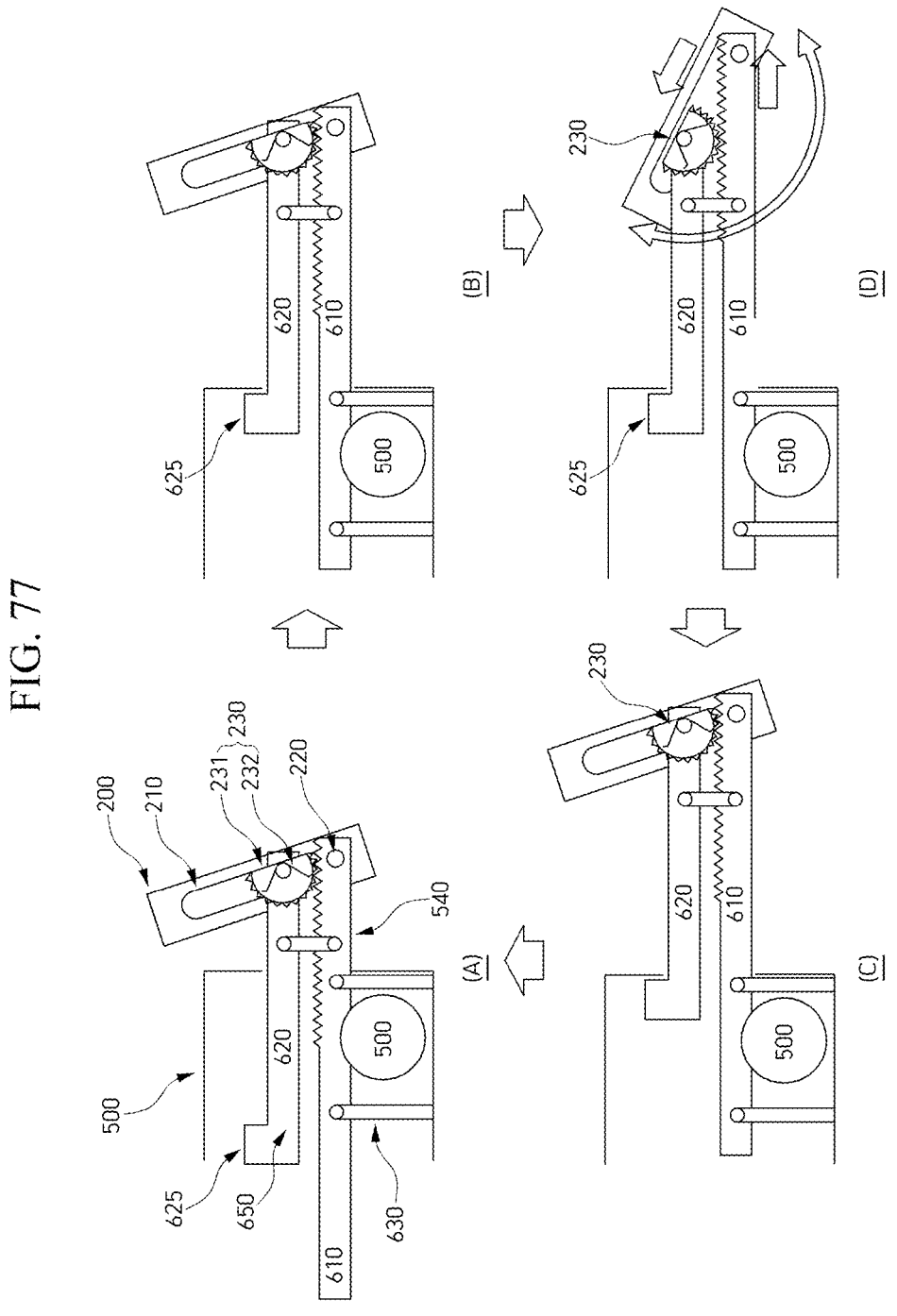
FIGS. 77 and 78 are views for explaining the moving display according to the embodiment of the present disclosure.

FIG. 77 is a view for explaining a principle of forward or backward movement of the moving device using an actuator and a display gear according to the embodiment of the present disclosure.

FIG. 77(A) is a view illustrating a default state in which the display is disposed in the vehicle, FIG. 77(B) is a view illustrating a state in which the display protrudes toward the driver and is located in front, FIG. 77(C) is a view illustrating a state in which the display tilts toward the cockpit, and FIG. 77(D) is a view illustrating a state in which the display returns back to its default state from tilting.

As illustrated in FIG. 77(A), the rail has an overlapping shape of moving rails using a type of two-stage sliding.

Moving rails 610 and 620 have a vertically overlapping shape. The first moving rail 610 may be coupled to a display hinge 220 disposed on a display rail 210 located on the side of the display. The second moving rail 620 may be coupled to a display gear 230 disposed on the display rail 210 located on the side of the display. The display gear 230 may include a rotation gear 231 and a torsion spring 232.

The display gear 230 may implement the movement of the display by pushing or pulling the display 200 through engagement with the gear part formed at one end of the first moving rail 610 by driving an actuator 500.

The first moving rail 610 may be coupled to a rail regulation bush 630 disposed in a cockpit 400. The second moving rail 620 may has one end connected to the display hinge 220, and the other end formed with a latching jaw 625. The first moving rail 610 and the second moving rail 620 may be coupled at one area thereof by a rail connection bush 640.

As illustrated in FIG. 77(B), when the display 200 protrudes forward, the moving rails 610 and 620 are moved simultaneously by an actuator 500 and shaped to protrude from the cockpit 400. In this case, the latching jaw 625 of the second moving rail 620 may be latched to the cockpit 400, thereby stopping the second moving rail 620.

As illustrated in FIG. 77(C), when the display 200 is tilted, only the first moving rail 610 may be moved forward by the actuator 500 and the display 200 may be tilted backward by the display hinge 220. At the same time, the torsion spring 232 located within the display gear 230 may be compressed and the rotation gear 231 may be rotated counterclockwise.

As illustrated in FIG. 77(D), when the display 200 returns back from tilting, the torsion spring 232 may be restored and the rotation gear 231 may be rotated clockwise. At the same time, the moving rails 610 and 620 may move backward simultaneously in order for the display 200 to return back to its default state from tilting.

Figure 78:
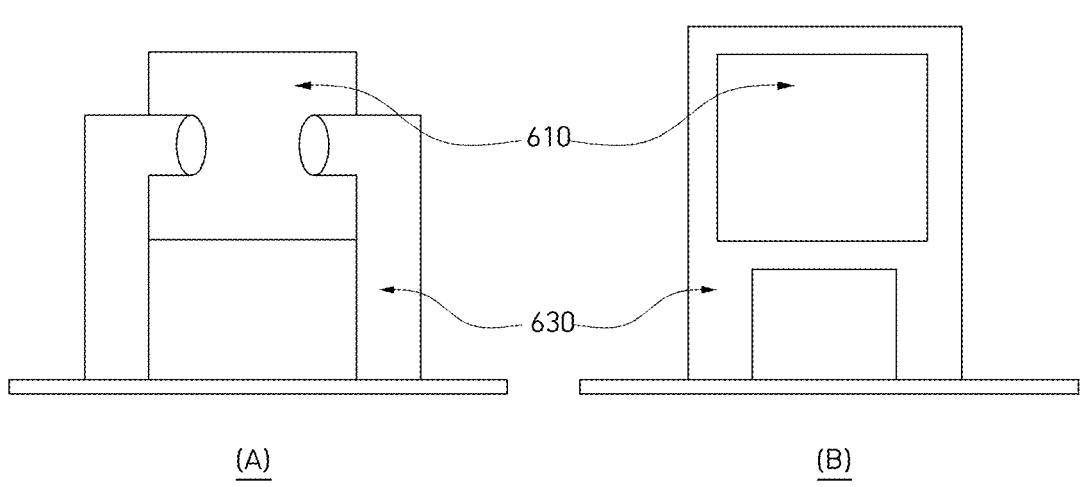

FIG. 78 is a view for explaining the rail regulation bush 630 according to the embodiment of the present disclosure.

Referring to FIG. 78, the rail regulation bush 630 may be configured to maintain flow, deflection, bending rigidity, and protruding rigidity during rail moving.

As illustrated in FIG. 78(A), the rail regulation bush 630 may be in the form of a bush fitted to the groove on the side or top and bottom of the first moving rail 610.

As illustrated in FIG. 78(B), the rail regulation bush 630 may be configured to surround the entire edge of the first moving rail 610. The first moving rail 610 may have various shapes such as square and circular in cross-section.

A detailed description of the preferred embodiments of the present disclosure has been provided to enable any person skilled in the art to make or practice the disclosure. Although the present disclosure has been described with respect to the preferred embodiments, it will be understood by those skilled in the art that various modifications and variations can be made without departing from the spirit and scope of the disclosure. For example, each configuration described in the above embodiments may be used in combination with each other by those skilled in the art.

Accordingly, the present disclosure is not intended to be limited to the embodiments shown herein but is to be accorded the widest scope consistent with the principles and novel features disclosed herein.

With the advent of autonomous vehicles, various studies have been conducted on ways to increase convenience for occupants. As an example, a method has been proposed to increase visibility and convenience for occupants by moving a display left/right or up/down for driving mode. In addition, a technology has been proposed to implement a retractable steering wheel so that occupants are movable more freely in an autonomous driving mode.

Control buttons are minimized and functions are integrated since it takes up internal space due to application of large screens. The main functions need to be simple and intuitive to control, but touching and operating the screen while driving may be very dangerous.

In order to solve the problems described above, the present disclosure is to provide a technology for controlling a variable display and an operation mechanism in conjunction with a flexible GUI of an autonomous vehicle.

The present disclosure is not limited to the above-mentioned objects, and other objects of the present disclosure can be clearly understood by those skilled in the art to which the present disclosure pertains from the following description.

In accordance with an aspect of the present disclosure, there is provided a console operation device that includes a base plate, at least one solenoid disposed within the base plate, an LM guide rail disposed in the front of the base fixing plate, and an operation mechanism mounted on the LM guide rail to move on the LM guide rail. The solenoid includes a first magnet with polarity, the operation mechanism includes a second magnet with polarity, and the operation mechanism is movable based on the polarities of the first and second magnets.

In an embodiment, the solenoid includes a straight-type solenoid that straightly reciprocates in response to an electric signal, and a rotary-type solenoid that rotatably reciprocates in response to an electric signal.

In an embodiment, the solenoid further includes a side solenoid that returns the operation mechanism back to its original position.

In accordance with another aspect of the present disclosure, there is provided a vehicle that includes a large screen display disposed on a cockpit of the vehicle, a console operation device for controlling the large screen display, and a controller that receives an operation signal from the console operation device to control a GUI output on the large screen display. The console operation device includes a base plate, at least one solenoid disposed within the base plate, an LM guide rail disposed in the front of the base fixing plate, and an operation mechanism mounted on the LM guide rail to move on the LM guide rail. The solenoid includes a first magnet with polarity, the operation mechanism includes a second magnet with polarity, and the operation mechanism is movable based on the polarities of the first and second magnets.

In an embodiment, the controller receives position information of the operation mechanism based on the movement of the operation mechanism, changes the flexible GUI output on the large screen display based on the position information of the operation mechanism, and changes a control range of the operation mechanism based on the flexible GUI.

In an embodiment, when receiving a function expansion input through the operation mechanism, the controller transmits a signal to the solenoid based on the flexible GUI.

In an embodiment, the controller controls a straight-type solenoid and a rotary-type solenoid in response to the solenoid signal transmitted based on the flexible GUI.

In an embodiment, the controller sets an operating range of the operation mechanism due to the function expansion and determines whether the position of the operation mechanism exceeds the operating range.

In an embodiment, when the operation mechanism is located within the operating range, the controller regulates the position of the operation mechanism within the operating range.

In an embodiment, when the operation mechanism is not located within the operating range, the controller changes the polarity of the solenoid located in an area exceeding the operating range to the same polarity to push the position of the operation mechanism.

In an embodiment, when the operation mechanism is not located within the operating range, the controller pushes the position of the operation mechanism by actuating a side solenoid located in an area exceeding the operating range.

According to the embodiment of the present disclosure as described above, it is possible to reduce the risk of accidents by applying multiple displays in the vehicle or increasing convenience for users in the vehicle capable of autonomous driving and assisting functions in driving situations.

The present disclosure is not limited to the above-mentioned effects, and other effects of the present disclosure can be clearly understood by those skilled in the art to which the present disclosure pertains from the following description.

In addition, the term "vehicle" as used in the following description assumes a vehicle used to transport occupants, but is not limited thereto and may include urban air mobility (UAM), buses, and the like.

Figure 79:
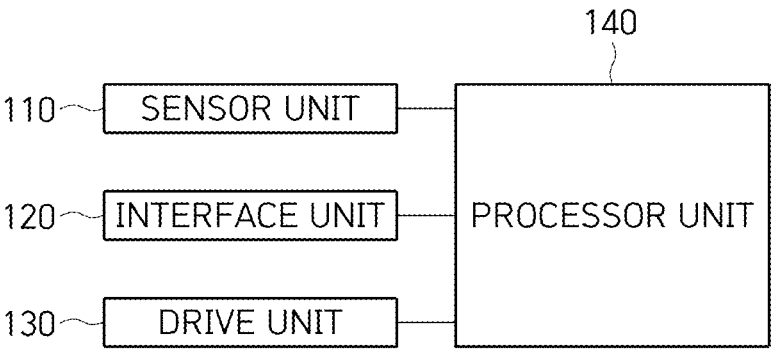
FIG. 79 illustrates a schematic configuration of a vehicle driving system according to an embodiment of the present disclosure.

FIG. 79 illustrates a schematic configuration of a vehicle driving system according to an embodiment of the present disclosure.

In the embodiment of the present disclosure, the vehicle may include a sensor unit 110, an interface unit 120, a drive unit 130, and a processor unit 140.

The sensor unit 110 may include at least one sensor capable of recognizing conditions inside and/or outside the vehicle. The sensor unit 110 may include, for example, a camera sensor, an infrared sensor, a radar sensor, a voice sensor, a temperature sensor, a humidity sensor, and the like.

The interface unit 120 may include at least one interface that provides the user of the vehicle with various types of audio-visual data or information related or unrelated to the vehicle, and/or provides a control tool for the vehicle or its component(s). The interface unit 120 may include, for example, front display(s) provided to occupant(s), and/or audio device(s) provided to occupant(s). The interface unit 120 may exchange signals with at least one electronic device inside the vehicle in a wired or wireless manner. The interface unit 120 may convert an input by the user of the vehicle into an electrical signal and provide it to the processor unit 140.

The drive unit 130 may physically drive and/or drive internal or external components of the vehicle under the control of the processor unit 140. For example, the drive unit 130 may change the physical position(s) of the wheel(s), steering wheel, seat(s), and front display(s) of the vehicle.

The processor unit 140 may include at least one processor. The at least one processor in the processor unit 140 may be electrically connected to the components of the vehicle (e.g., sensor unit, interface unit, communication unit (not shown)) to exchange signals, and may control the components of the vehicle. The processor unit 140 may further include at least one memory (not shown). The at least one processor may be referred to as a controller, a microcontroller, a microprocessor, or a microcomputer. The at least one processor may be implemented by hardware, firmware, software, or a combination thereof. Examples of the at least one processor may include one or more application specific integrated circuits (ASICs), one or more digital signal processors (DSPs), one or more digital signal processing devices (DSPDs), one or more programmable logic devices (PLDs), or one or more field programmable gate arrays (FPGAs). The functions, procedures, proposals, and/or methods disclosed herein may be implemented using firmware or software, and the firmware or the software may be implemented to include modules, procedures, functions, and so on. Firmware or software established to perform the functions, procedures, proposals, and/or methods disclosed herein may be included in the at least one processor, or may be stored in the at least one memory and driven by the at least one processor. The functions, procedures, proposals, and/or methods disclosed herein may be implemented using firmware or software in the form of codes, instructions, and/or sets of instructions.

The processor unit 140 may generate control signals for the sensor unit 110, the interface unit 120, and/or the drive unit 130 based on the electrical signals received from the sensor unit 110 and/or the interface unit 120

The at least one memory may be connected to the at least one processor and may store various types of information related to the operation of the at least one processor. For example, the at least one memory may include software code including commands for performing some or all of the processes controlled by the at least one processor or for performing the procedures and/or methods described/proposed below. The at least one memory may store commands, instructions, or programs, which may, when executed, cause the at least one processor operably connected to the at least one memory to perform operations according to the embodiment of the present disclosure.

The vehicle may further include a communication unit. The communication unit may include one or more transceivers. User data, control information, wireless signals/channels, etc., mentioned in the functions, procedures, proposals, methods, and/or operation flowcharts disclosed herein may be received from one or more other devices through the one or more transceivers. For example, the one or more transceivers may be connected to the processor unit 140 and may transmit and/or receive wireless signals. For example, the at least one processor in the processor unit 140 may control the one or more transceivers to transmit user data, control information, or wireless signals to at least one other device. In addition, the processor unit 140 may control the one or more transceivers to receive user data, control information, or wireless signals from one or more other devices. In addition, the one or more transceivers may be connected to one or more antennas. The one or more transceivers may be established to transmit and/or receive user data, control information, wireless signals/channels, etc., from other device(s) through the one or more antennas.

Figure 80:
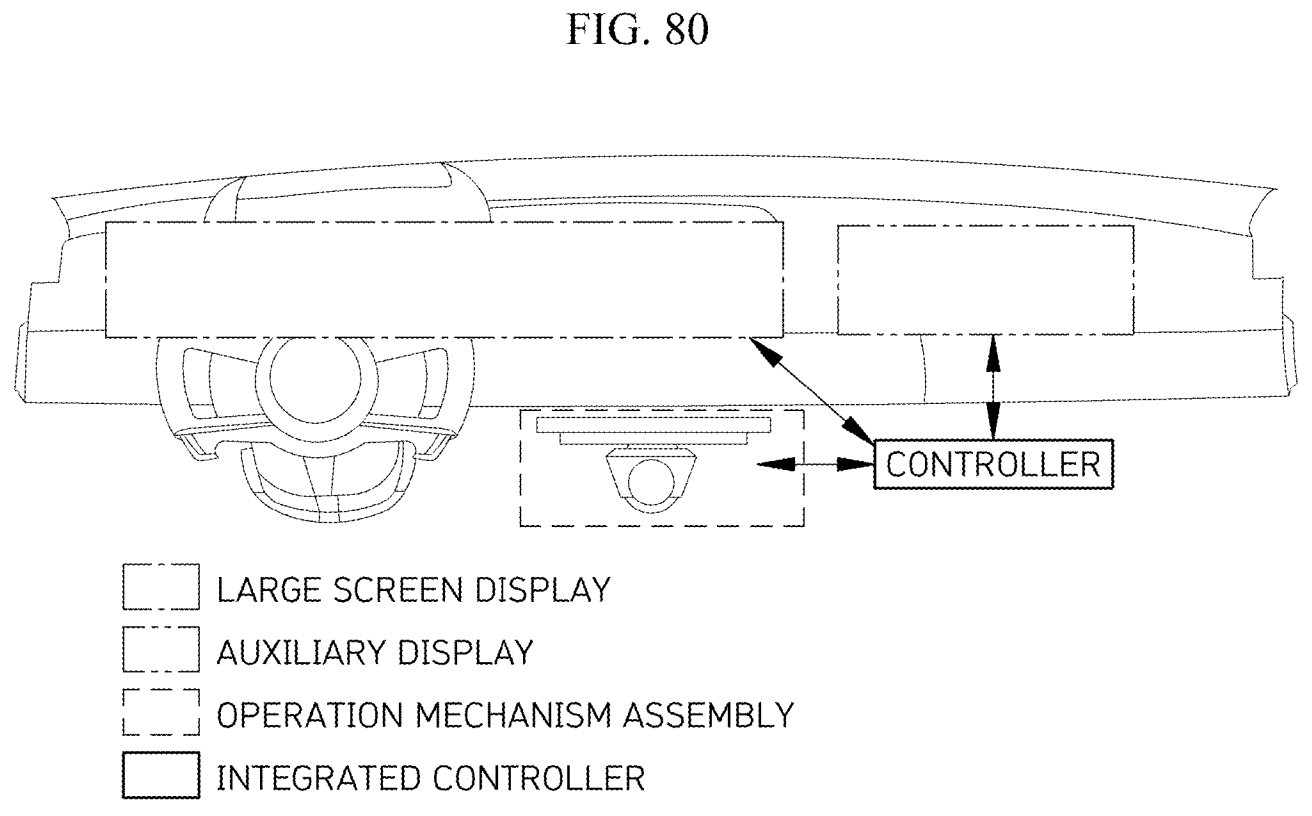

FIG. 80 is a view for explaining an internal configuration of the moving vehicle according to the embodiment of the present disclosure.

First, the vehicle according to the embodiment illustrated in FIG. 80 may include at least one camera capable of detecting conditions inside the vehicle, a head-up display (HUD), front display(s) that provide audio-visual information to occupant(s), and a console display that provides the occupants with status information of the vehicle and/or provides control for the gear, air-conditioning, and/or seat(s) of the vehicle. The vehicle also includes a steering wheel, seat(s), and lighting(s).

The large screen display according to the embodiment of the present disclosure may be disposed on one side of a driver seat, or if there is an auxiliary seat, in the space between the driver seat and the auxiliary seat. The auxiliary display may be disposed on one side of the auxiliary seat, or if there is a driver seat, on the side of the large screen display. The large screen display and the auxiliary display may include a console operation device.

In addition, the large screen display according to this embodiment may provide an operation mechanism necessary for driving of vehicle, an indicator mechanism according to the user's status, and an office screen.

The controller may receive signals and transmit commands among the position recognition sensor, the rotary-type operation mechanism (hereinafter referred to as operation mechanism), and the display. The controller may receive an operation signal from the console operation device to control the GUI output on the large screen display.

This may allow the large screen display to transmit all types of vehicle-related information to the screen by matching the operation mechanism and the flexible GUI. In addition, the auxiliary display may transmit all types of vehicle-related information to the screen by matching the operation mechanism and the flexible GUI.

Figure 81:
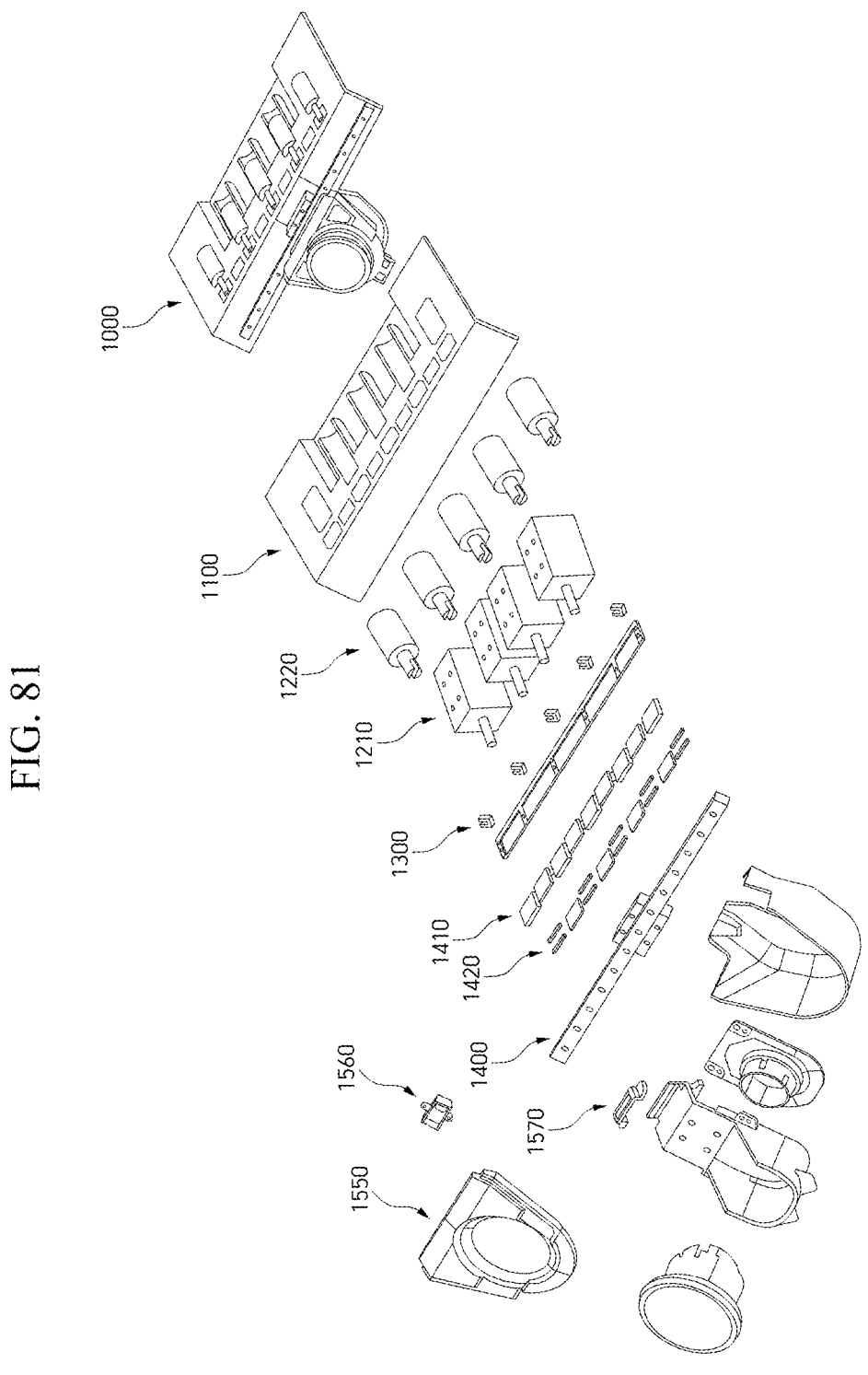
FIG. 81 is an exploded view for explaining a console operation device using solenoids according to the embodiment of the present disclosure.

FIG. 81 is an exploded view for explaining a console operation device using solenoids according to the embodiment of the present disclosure.

Referring to FIG. 81, the console operation device using solenoids according to the embodiment of the present disclosure may include a base plate 1100, a straight-type solenoid 1210, a rotary-type solenoid 1220, a position recognition sensor 1300, a guide rail 1400, and an operation mechanism 1500.

The base plate 1100 may be a basic base plate capable of fixing components.

On the base plate 1100, the straight-type solenoid 1210 that straightly reciprocates in response to the electrical signal and the rotary-type solenoid 1220 that rotatably reciprocates in response to the electrical signal may be arranged.

The position recognition sensor 1300 may be a sensor that recognizes the position of the operation mechanism 1500 when it comes in front of the sensor and sends a signal to the controller.

The guide rail 1400 may be a component to reciprocate the operation mechanism 1500 to the left and right thereon. An ND magnet 1410 may be disposed inside the guide rail 1400 with an adhesive 1420. The ND magnet 1410 may be a component that is mounted on the base plate 1100 or after coupled with the solenoid and helps move the operation mechanism 1500 by matching the polarity of the magnet mounted on the operation mechanism 1500. In this case, the ND magnet 1410 may be a component that utilizes the N/S poles with strong magnetism to help move the operation mechanism 1500.

The operation mechanism 1500 may be a component that is operated as a rotary type and sends a signal for selection to the controller. The operation mechanism 1500 may include a back cover 1510, a PCB 1520, a bracket 1530, a knob 1540, and a front housing 1550.

The operation mechanism 1500 may further include a proximity sensor 1560 that senses the distance to a hand or other approaching object and sends a signal. In addition, the operation mechanism 1500 may further include a knob magnet 1570 that is mounted on the bracket 1530 and helps move the operation mechanism 1500 by matching the polarity of the magnet mounted on the guide rail or solenoid.

Figure 82:
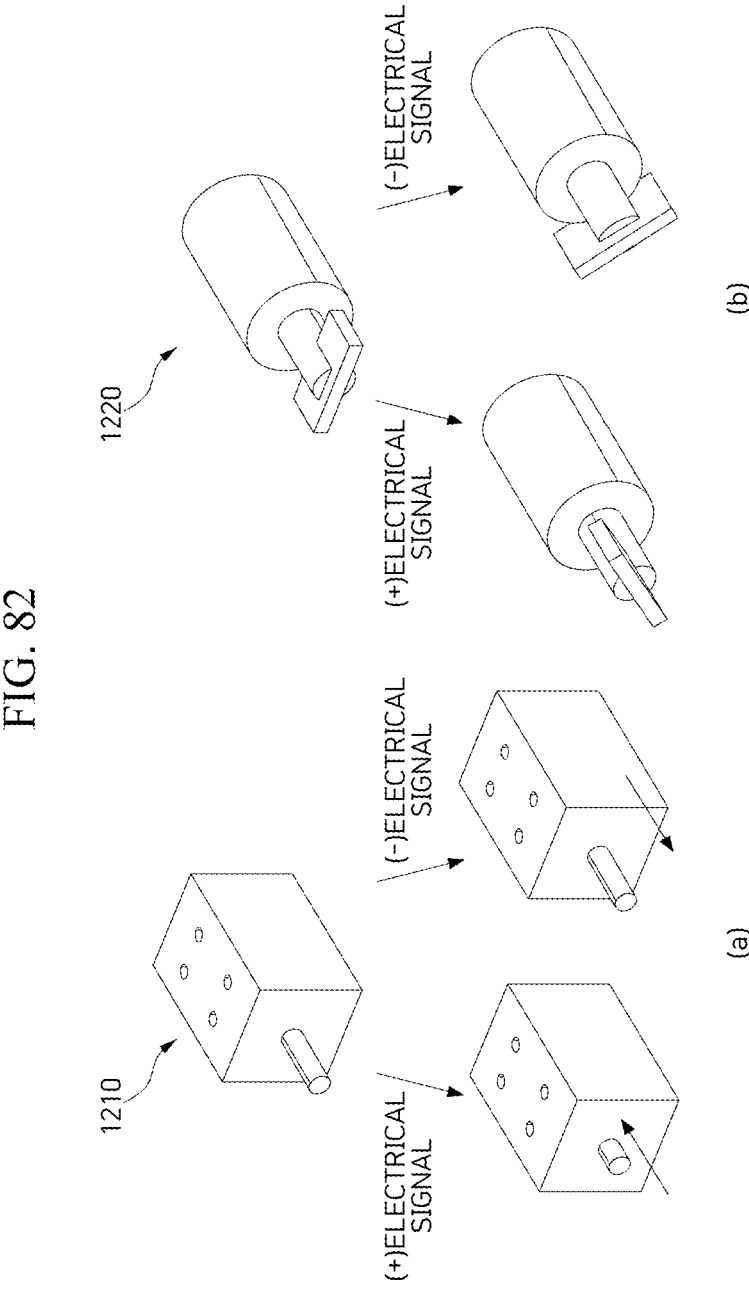

FIGS. 82 and 83 are views for explaining an operation of the console operation device using solenoids according to the embodiment of the present disclosure.

Referring to FIG. 82(a), the straight-type solenoid 1210 may be equipped with a magnet at the end of the solenoid rod thereof, and may straightly reciprocate in response to the electric signal to regulate the position of the operation mechanism 1500 with the magnet or physically regulate the body of the operation mechanism 1500.

For example, when a (+) electric signal is input to the straight-type solenoid 1210, the magnet at the end of the solenoid rod thereof may move backward. When a (−) electrical signal is input to the straight-type solenoid 1210, the magnet at the end of the solenoid rod thereof may move forward.

Referring to FIG. 82(b), the rotary-type solenoid 1220 may be equipped with a magnet at the end of the solenoid rod thereof, and may rotatably reciprocate in response to the electric signal to regulate or return the position of the operation mechanism 1500 with the magnet.

For example, when a (+) electric signal is input to the rotary-type solenoid 1220, the magnet at the end of the solenoid rod thereof may rotate counterclockwise. When a (−) electrical signal is input to the rotary-type solenoid 1220, the magnet at the end of the solenoid rod thereof may rotate clockwise.

Referring to FIG. 83(a), when the operation mechanism 1500 moves left and right using the guide rail, forces of attraction and repulsion may be generated in the operation mechanism 1500 depending on the polarity of the ND magnet 1410 and the knob magnet 1570.

Referring to FIG. 83(b), the ND magnet 1410 may have S poles and N poles alternately arranged, and the knob magnet 1570 may have either an N pole or an S pole.

For example, when the ND magnet 1410 has an S pole and the knob magnet 1570 has an N pole, the position of the operation mechanism 1500 may be fixed by the force of attraction. Then, when the knob moves in one direction, it passes through the N-pole area of the ND magnet 1410 to generate a force of repulsion, and when the knob passes through the center point of the N pole, it may move to the position of the other S pole of the ND magnet 1410.

Figure 84:
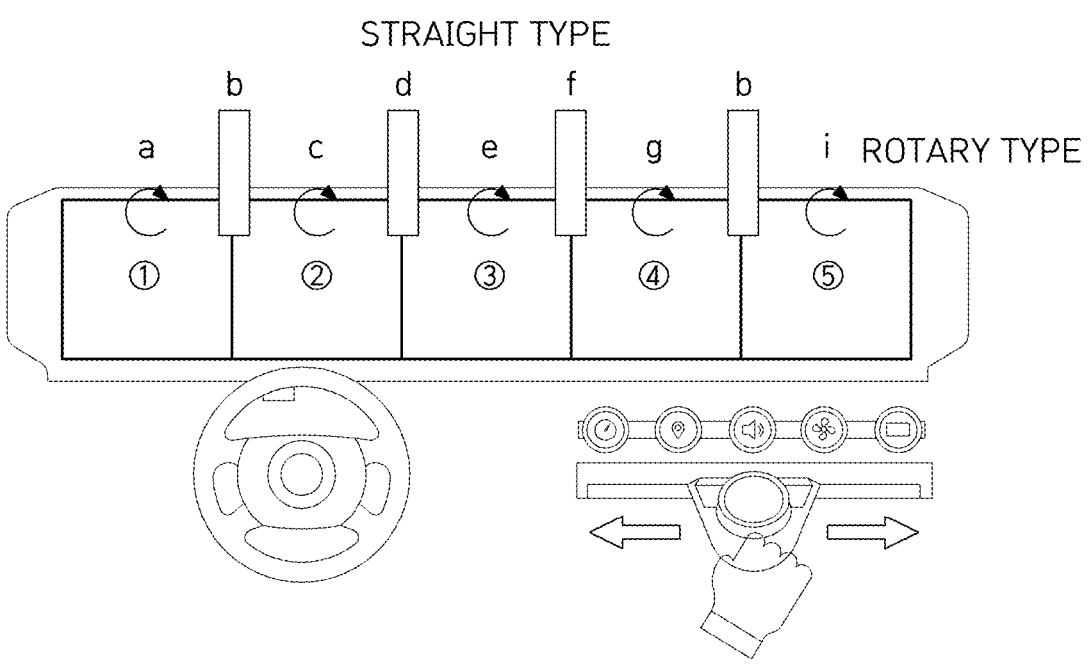
FIG. 84 is a view for explaining the operation of the console operation device using solenoids according to the embodiment of the present disclosure.

FIG. 84 is a view for explaining the operation of the console operation device using solenoids according to the embodiment of the present disclosure.

Referring to FIG. 84, assuming that five types of information are viewable on the large screen display, vehicle information may be controlled by the operation mechanism 1500. The vehicle information may include at least one of vehicle driving information (cluster), navigation (traffic information), multimedia, air-conditioning system, currency, and weather.

The operation mechanism 1500 may control all items transmitted to the display in conjunction with the flexible GUI of the vehicle information.

For example, the item that may be transmitted to the display and selected by the operation mechanism 1500 may be 5 in number by default, and may have a number of expandability. However, the number of screens and the number of ranges of the operation mechanism 1500 may be expanded depending on the flexible UI, and the present disclosure is not limited thereto.

The operating area of the operation mechanism 1500 may be divided within the guide by five rotary-type solenoids (a, c, e, g, and i) and four straight-type solenoids (b, d, f, and h). As a result, the range that is operable by the operation mechanism 1500 within the guide may be divided into five areas, from the first area on the leftmost to the fifth area on the rightmost.

In addition, the position of the operation mechanism 1500 may be controlled to return by the two straight-type solenoids (j and k).

Figure 85:
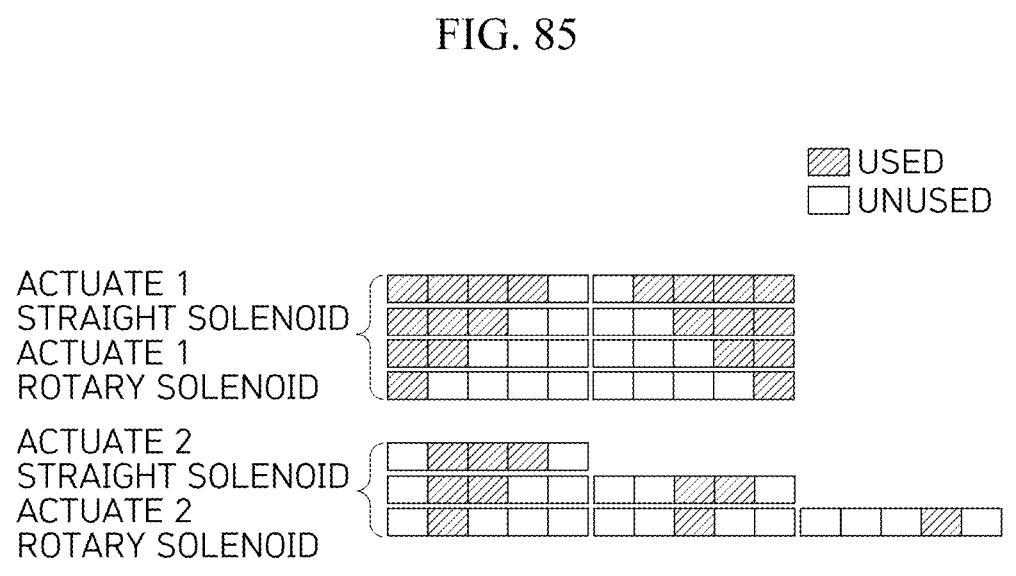

FIG. 85 is a diagram for explaining display control division of the console operation device using solenoids according to the embodiment of the present disclosure.

Referring to FIG. 85, when one straight solenoid and one rotary solenoid are actuated, the operation mechanism 1500 may be operated by dividing the five areas of the display into one of the first area, the first to second area, the first to third area, the first to fourth area, the second to fifth area, the third to fifth area, the fourth to fifth area, and the fifth area.

In addition, when two straight solenoids and two rotary solenoids are actuated, the operation mechanism 1500 may be operated by dividing into one of the second area, the third area, the fourth area, the second to third area, the third to fourth area, and the second to fourth area of the display.

Figure 86:
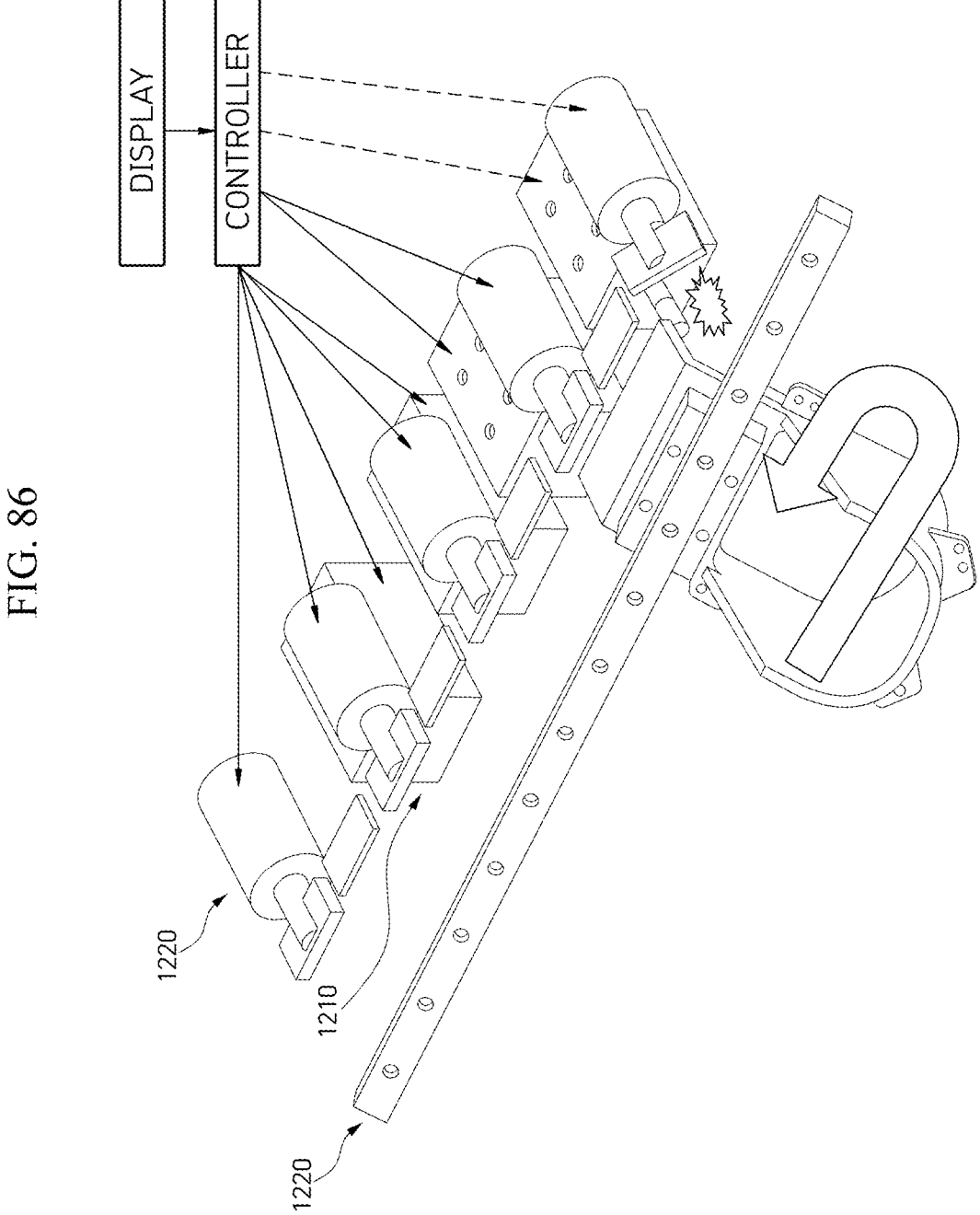
Figure 87:
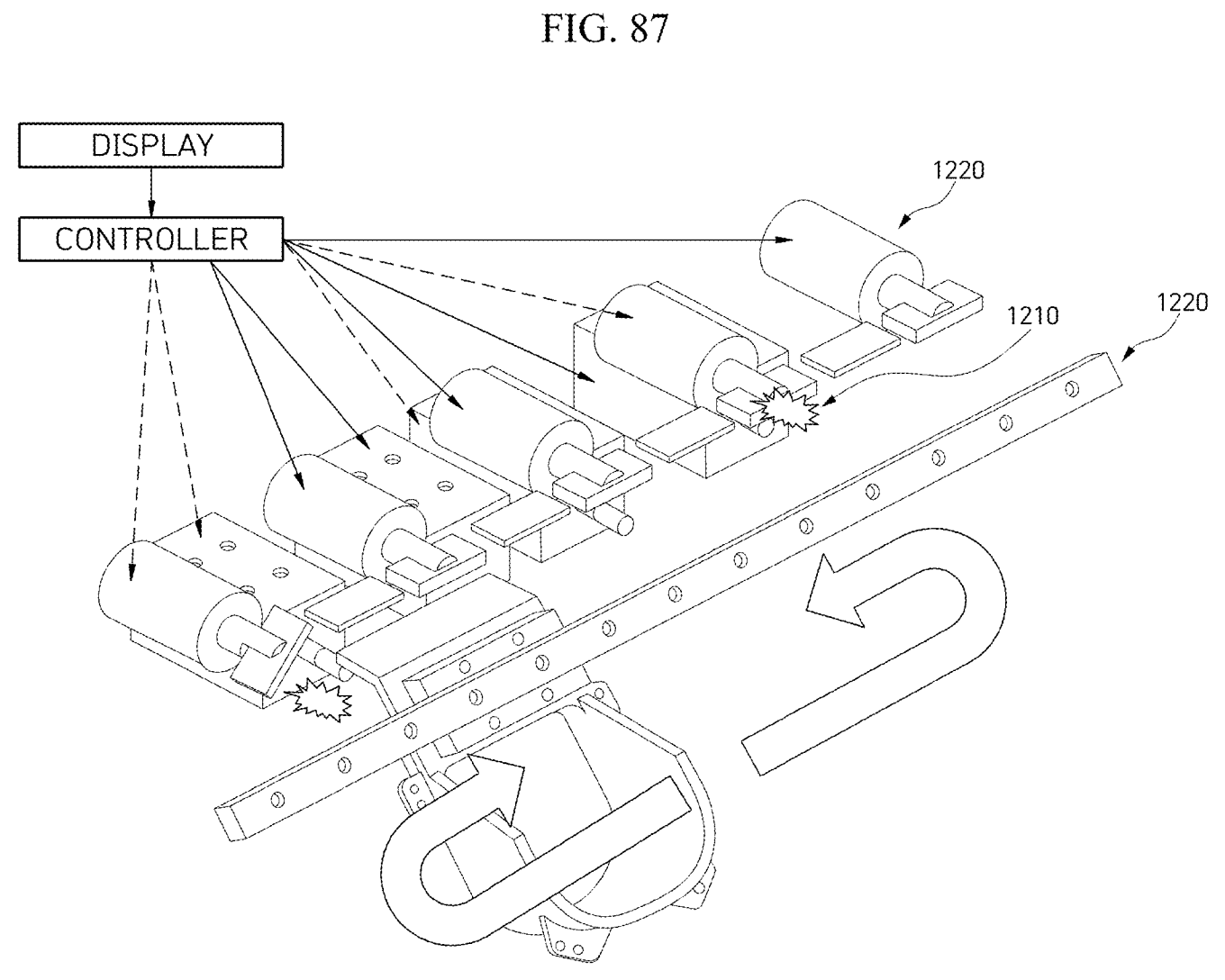
Figure 88:
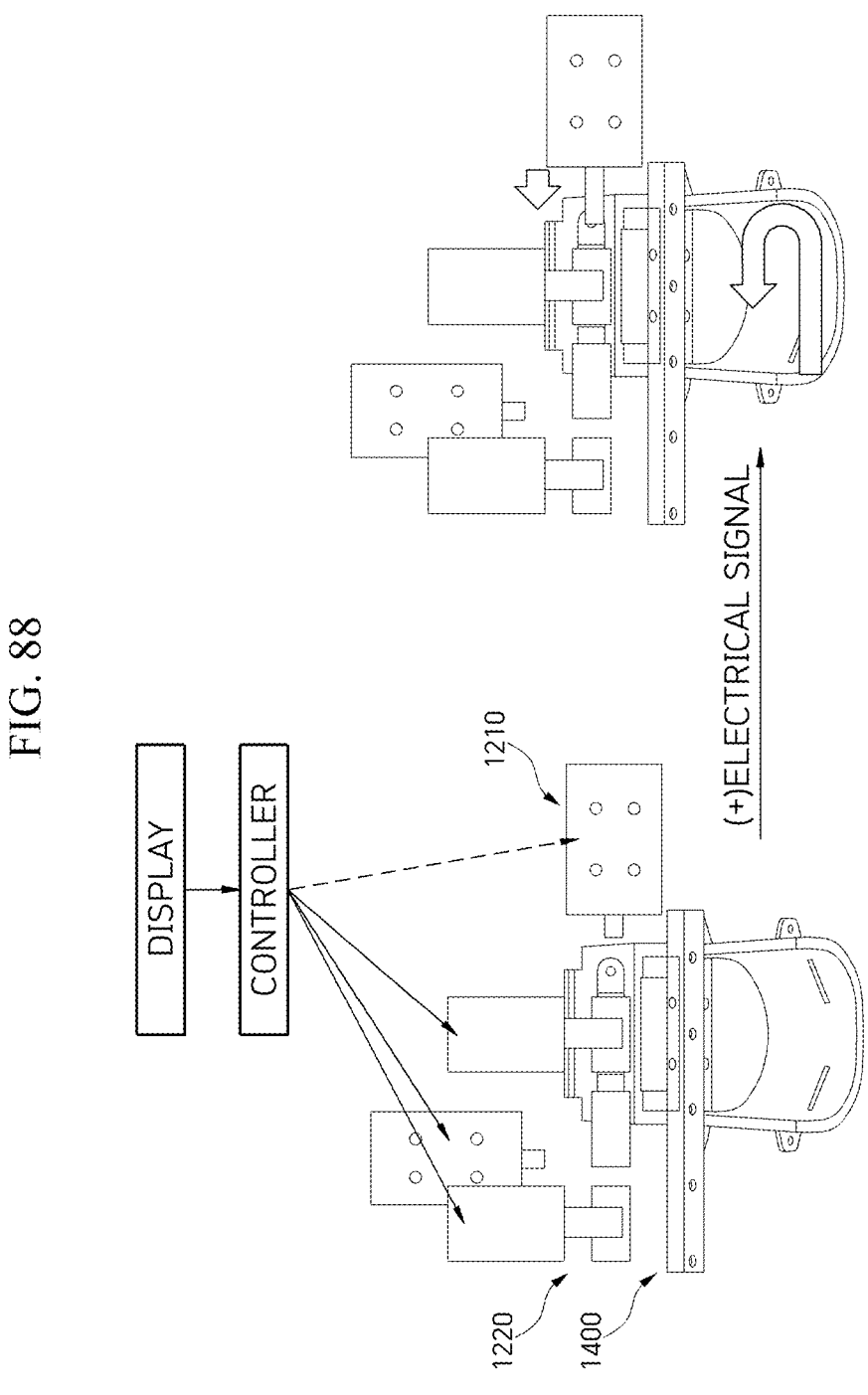

FIGS. 86 to 88 are views for explaining control of the operation mechanism of the console operation device using solenoids according to the embodiment of the present disclosure.

FIGS. 86 and 87 are views illustrating that the operation mechanism 1500 is collectively used in ranges.

Referring to FIG. 86, when the display is controlled in first to fourth area, the position of the operation mechanism 1500 may be regulated. In the console operation device, the rotary-type solenoid (h) may rotate and the straight-type solenoid (g) may actuate straightly. As a result, the operation mechanism 1500 may be regulated to move to the fifth area.

Referring to FIG. 87, when the display is controlled in the second to third area, the position of the operation mechanism 1500 may be regulated. In the console operation device, the rotary-type solenoid (a) and the rotary-type solenoid (g) may rotate, and the straight-type solenoid (b) and the straight-type solenoid (f) may actuate straightly. As a result, the operation mechanism 1500 may be regulated to move to the first area on the left and to the fourth area on the right.

FIG. 88 is a view illustrating that the moved operation mechanism 1500 returns back to its original position.

Referring to FIG. 88, when the operation mechanism 1500 is located in the fifth area, when a (+) signal is input to the straight-type solenoid (k) located on the side, the straight-type solenoid (k) may be actuated straightly. As a result, the position of the operation mechanism 1500 may return from the fifth area to the fourth area.

FIG. 89 is a flowchart for explaining a basic operation method of the console operation device using solenoids according to the embodiment of the present disclosure.

Referring to FIG. 89, the driver or passenger seat user may use the console operation device in its default state while driving (S1110).

After step S1110, when the proximity sensor 1560 recognizes the user's hand or the operation mechanism 1500 moves (S1120), the console operation device may transmit the position information of the operation mechanism from the position recognition sensor 1300 to the controller (S1130).

After step S1130, the console operation device may transmit a signal from the controller to the display (S1140).

After step S1140, the console operation device may transmit the flexible GUI to the display screen according to the position of the operation mechanism 1500 (S1150).

After step S1150, the console operation device may be linked to the display screen in response to the operation of the operation mechanism 1500 (S1160).

Figure 90:
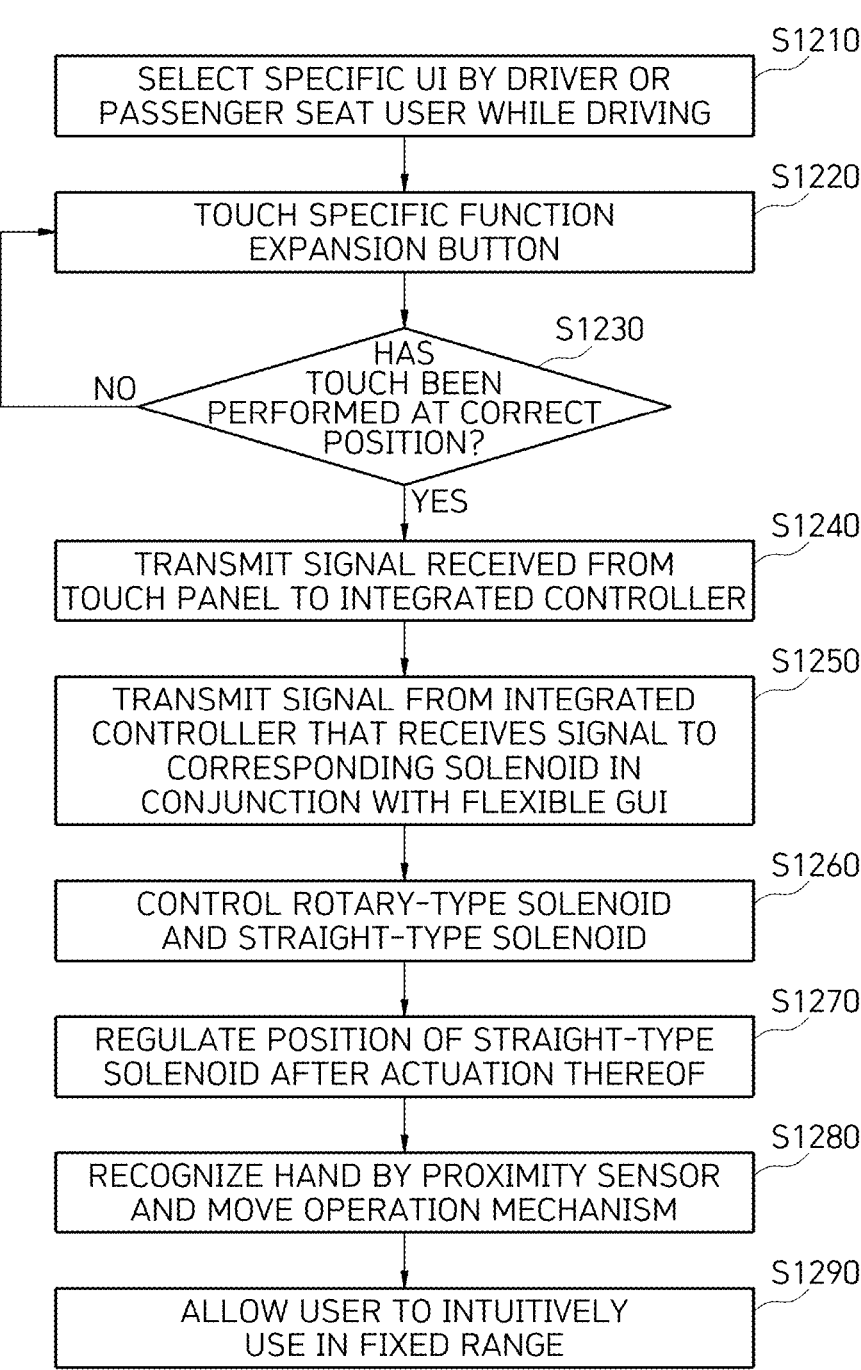
FIG. 90 is a flowchart for explaining a method of limiting and controlling the operation mechanism of the console operation device using solenoids according to the embodiment of the present disclosure.

FIG. 90 is a flowchart for explaining a method of limiting and controlling the operation mechanism of the console operation device using solenoids according to the embodiment of the present disclosure.

Referring to FIG. 90, the driver or passenger seat user may use the console operation device to select the specific UI while driving (S1210).

After step S1210, when the specific function expansion button is touched (S1220), the console operation device may determine whether it has been touched at a correct position (S1230).

After step S1230, when the touch is performed at the correct position (YES in S1230), the console operation device may transmit the signal received from the touch panel to the controller (S1240).

After step S1240, the console operation device may transmit a signal from the controller that receives the signal to the corresponding solenoid in conjunction with the flexible GUI (S1250).

After step S1250, the console operation device may control the rotary-type solenoid and the straight-type solenoid 1210 in response to the signal (S1260).

After step S1260, the console operation device may regulate the position of rotary-type/straight-type solenoid after actuation thereof (S1270). In this case, when the operation mechanism 1500 is located beyond the preset operating range, the console operation device may be located by pushing it with the magnet of the same polarity, or return back to its original position by pushing it straight with the side solenoid.

After step S1270, when the proximity sensor 1560 recognizes the hand and the operation mechanism 1500 moves (S1280), the console operation device may allow the user to intuitively use the operation mechanism 1500 in a fixed range (S1290).

Figure 91:
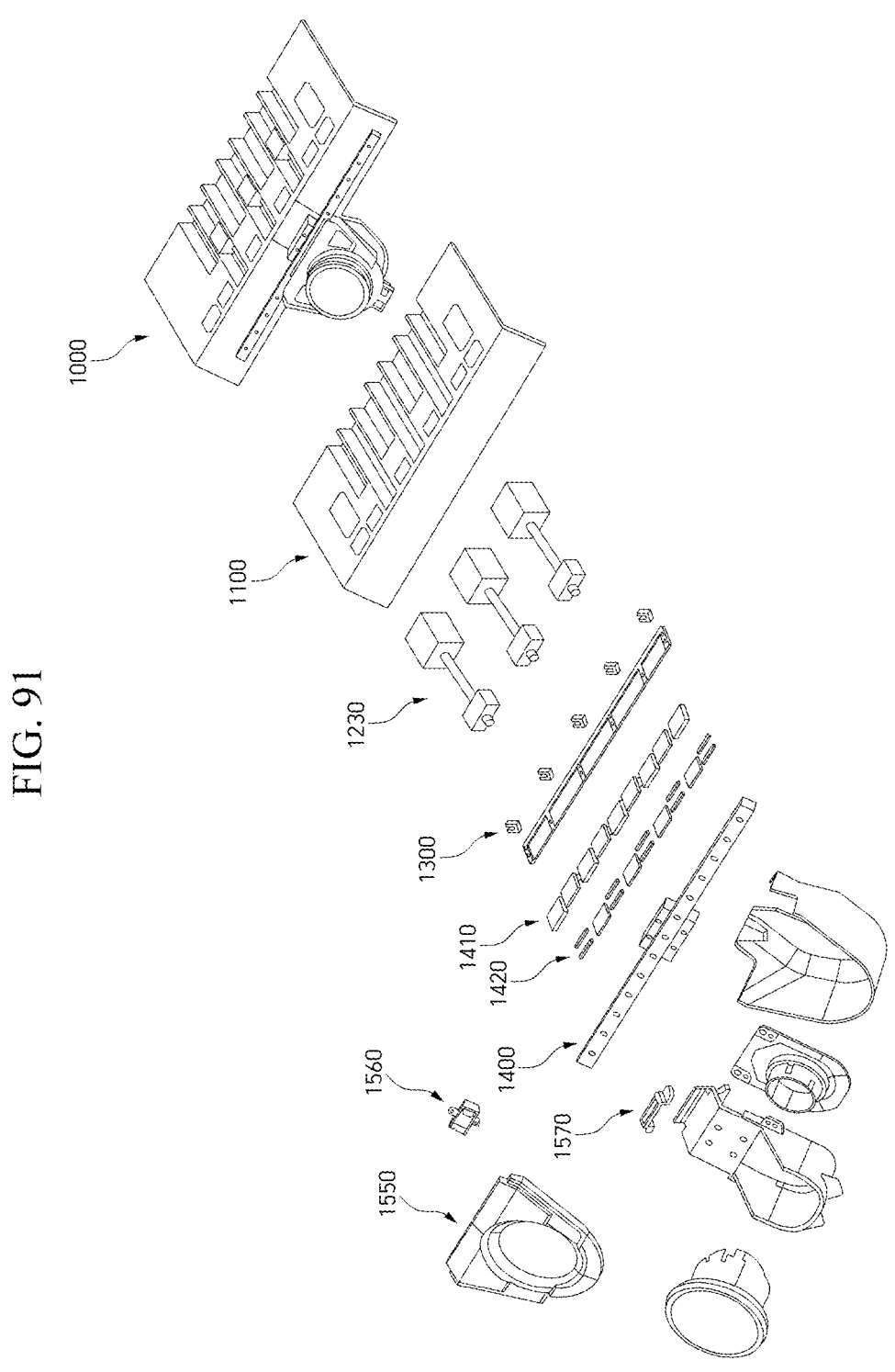
FIG. 91 is an exploded view for explaining a console operation device using actuators according to the embodiment of the present disclosure.

FIG. 91 is an exploded view for explaining a console operation device using actuators according to the embodiment of the present disclosure.

Referring to FIG. 91, the console operation device using actuators according to the embodiment of the present disclosure may include a base plate 1100, an actuator 1230, a position recognition sensor 1300, a guide rail 1400, and an operation mechanism 1500.

The base plate 1100 may be a basic base plate capable of fixing components.

On the base plate 1100, the actuator 1230 may be disposed to rotate about an axis in response to the electrical signal and straightly move the magnet forward and backward to define a variable range.

The position recognition sensor 1300 may be a sensor that recognizes the position of the operation mechanism 1500 when it comes in front of the sensor and sends a signal to the controller.

The guide rail 1400 may be a component to reciprocate the operation mechanism 1500 to the left and right thereon. An ND magnet 1410 may be disposed inside the guide rail 1400 with an adhesive 1420. The ND magnet 1410 may be a component that is mounted on the base plate 1100 or after coupled with the actuator 1230 and helps move the operation mechanism 1500 by matching the polarity of the magnet mounted on the operation mechanism 1500. In this case, the ND magnet 1410 may be a component that utilizes the N/S poles with strong magnetism to help move the operation mechanism 1500.

The operation mechanism 1500 may be a component that is operated as a rotary type and sends a signal for selection to the controller. The operation mechanism 1500 may include a back cover 1510, a PCB 1520, a bracket 1530, a knob 1540, and a front housing 1550.

The operation mechanism 1500 may further include a proximity sensor 1560 that senses the distance to a hand or other approaching object and sends a signal. In addition, the operation mechanism 1500 may further include a knob magnet 1570 that is mounted on the bracket 1530 and helps move the operation mechanism 1500 by matching the polarity of the magnet mounted on the guide rail or actuator 1230.

Figure 92:
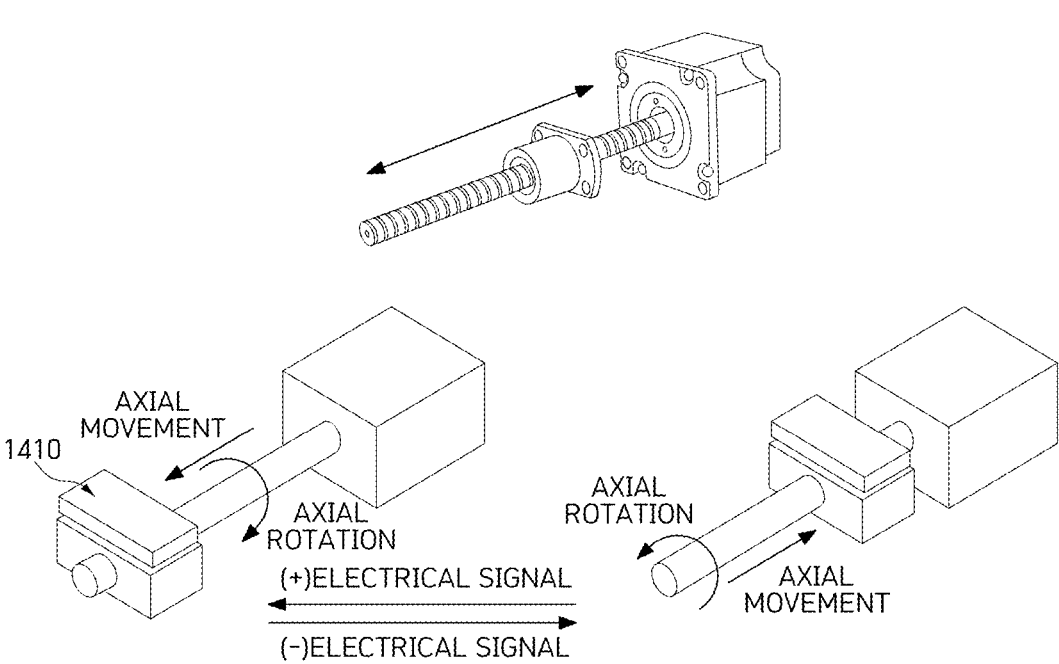
FIGS. 92 and 93 are views for explaining an operation of the console operation device using actuators according to the embodiment of the present disclosure.
Figure 93:
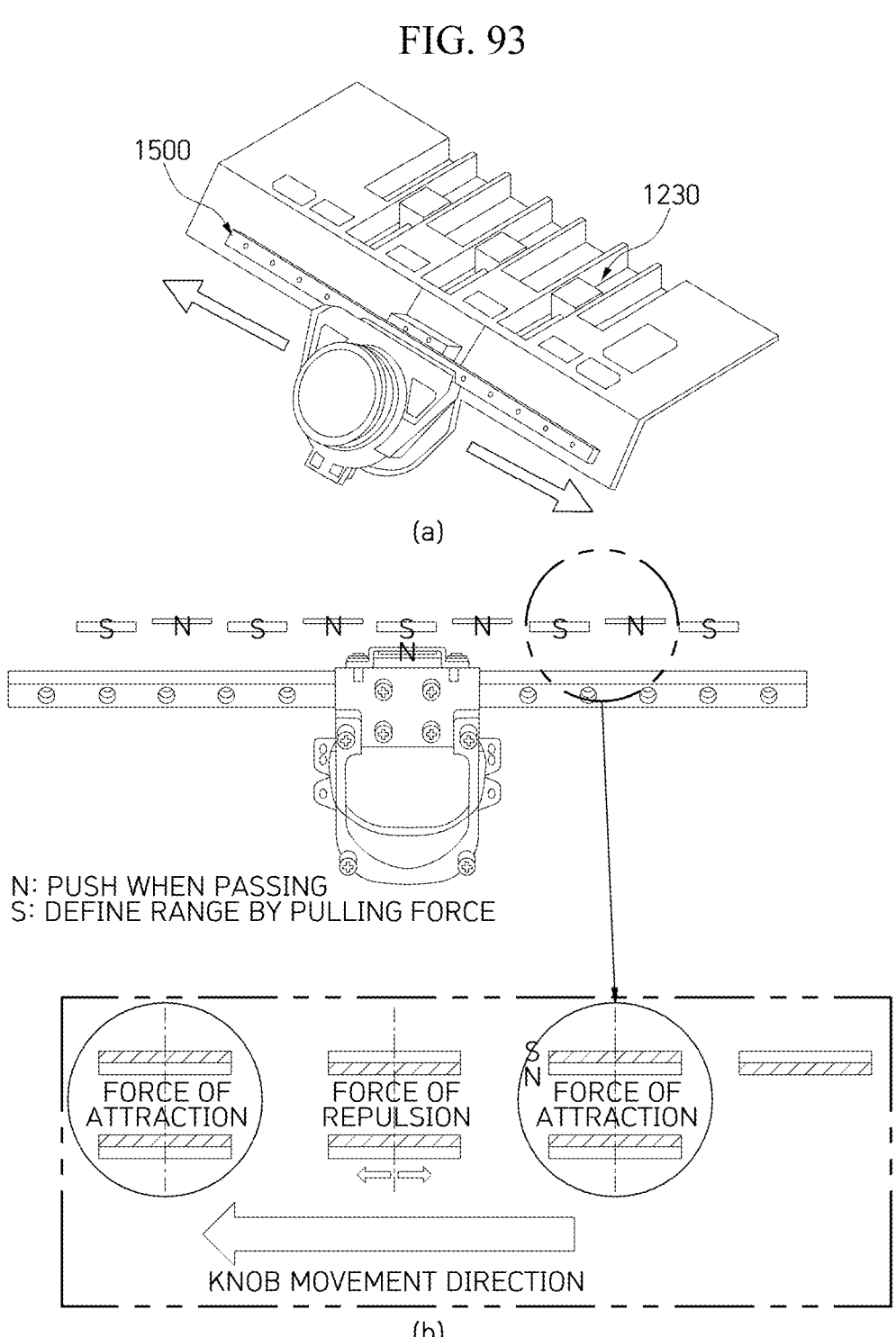

FIGS. 92 and 93 are views for explaining an operation of the console operation device using actuators according to the embodiment of the present disclosure.

Referring to FIG. 92(*a*), the actuator 1230 may be equipped with an ND magnet at the end of the rod thereof, and may axially rotate by straightly reciprocating in response to the electric signal to regulate the position of the operation mechanism 1500 or physically regulate the body of the operation mechanism 1500.

For example, when a (+) electric signal is input to the actuator 1230, the shaft of the actuator 1230 rotates clockwise and moves forward, allowing the magnet at the end of the rod to move forward. When a (−) electric signal is input to the actuator 1230, the shaft of the actuator 1230 rotates counterclockwise and moves backward, allowing the magnet at the end of the rod to move backward.

Referring to FIG. 93(*a*), when the operation mechanism 1500 moves left and right using the guide rail, forces of attraction and repulsion may be generated in the operation mechanism 1500 depending on the polarity of the ND magnet 1410 and the magnet of the operation mechanism 1500.

Referring to FIG. 93(*b*), the ND magnet 1410 may have S poles and N poles alternately arranged, and the magnet of the operation mechanism 1500 may have either an N pole or an S pole.

For example, when the ND magnet 1410 has an S pole and the magnet of the operation mechanism 1500 has an N pole, the position of the operation mechanism 1500 may be fixed by the force of attraction. Then, when the knob moves in one direction, it passes through the N-pole area of the ND magnet 1410 to generate a force of repulsion, and when the knob passes through the center point of the N pole, it may move to the position of the other S pole of the ND magnet 1410.

Figure 94:
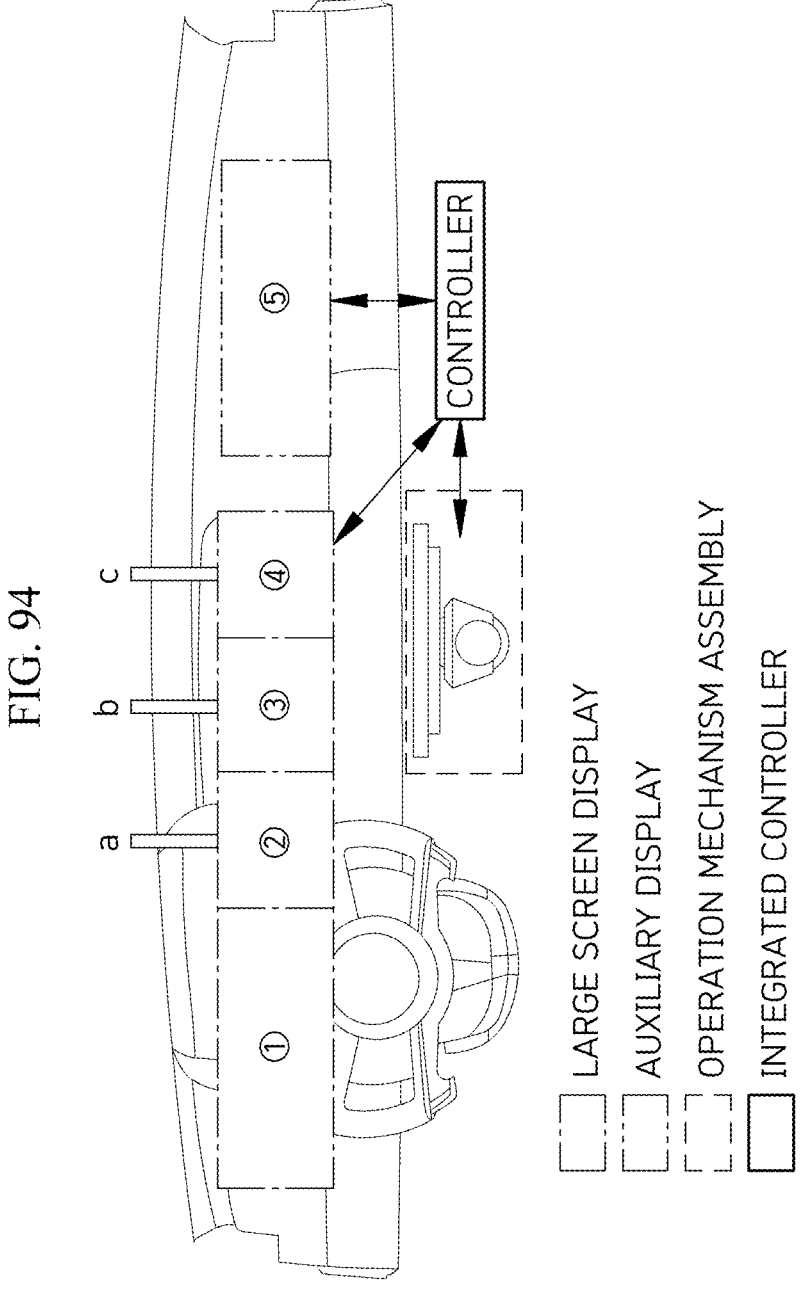
FIG. 94 is a view for explaining the operation of the console operation device using actuators according to the embodiment of the present disclosure.

FIG. 94 is a view for explaining the operation of the console operation device using actuators according to the embodiment of the present disclosure.

Referring to FIG. 94, assuming that five types of information are viewable on the large screen display, vehicle information may be controlled by the operation mechanism 1500. The vehicle information may include at least one of vehicle driving information (cluster), navigation (traffic information), multimedia, air-conditioning system, currency, and weather.

The operation mechanism 1500 may control all items transmitted to the display in conjunction with the flexible GUI of the vehicle information.

For example, the item that may be transmitted to the display and selected by the operation mechanism 1500 may be 4 in number by default, and the item that may be transmitted to the auxiliary display and selected by the operation mechanism 1500 may be 1 in number by default, which may have a number of expandability. However, the number of screens and the number of ranges of the operation mechanism 1500 may be expanded depending on the flexible UI, and the present disclosure is not limited thereto.

The operating area of the operation mechanism 1500 may be divided within the guide by three actuators (a, c, e, g, and i). As a result, the range that is operable by the operation mechanism 1500 within the guide may be divided into a total of five areas, including four areas from the first area on the leftmost to the fifth area on the rightmost of the large screen display, and one auxiliary display area.

Figure 95:
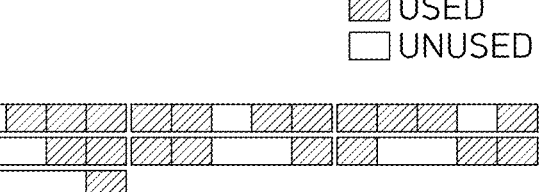
FIG. 95 is a diagram for explaining display control division of the console operation device using actuators according to the embodiment of the present disclosure.

FIG. 95 is a diagram for explaining display control division of the console operation device using actuators according to the embodiment of the present disclosure.

Referring to FIG. 95, using five screens may be an operation method for using at least 80 screens in relation to operation of the operation mechanism 1500.

The operation mechanism 1500 may be operated by dividing the five areas of the display into one of the first area and the third to fifth area, the first to second area and the fourth to fifth area, the first to third area and the fifth area, the first area and the fourth to fifth area, the first to second area and the fifth area, the fifth area and the fourth to fifth area, and the first area and the fifth area.

Figure 96:
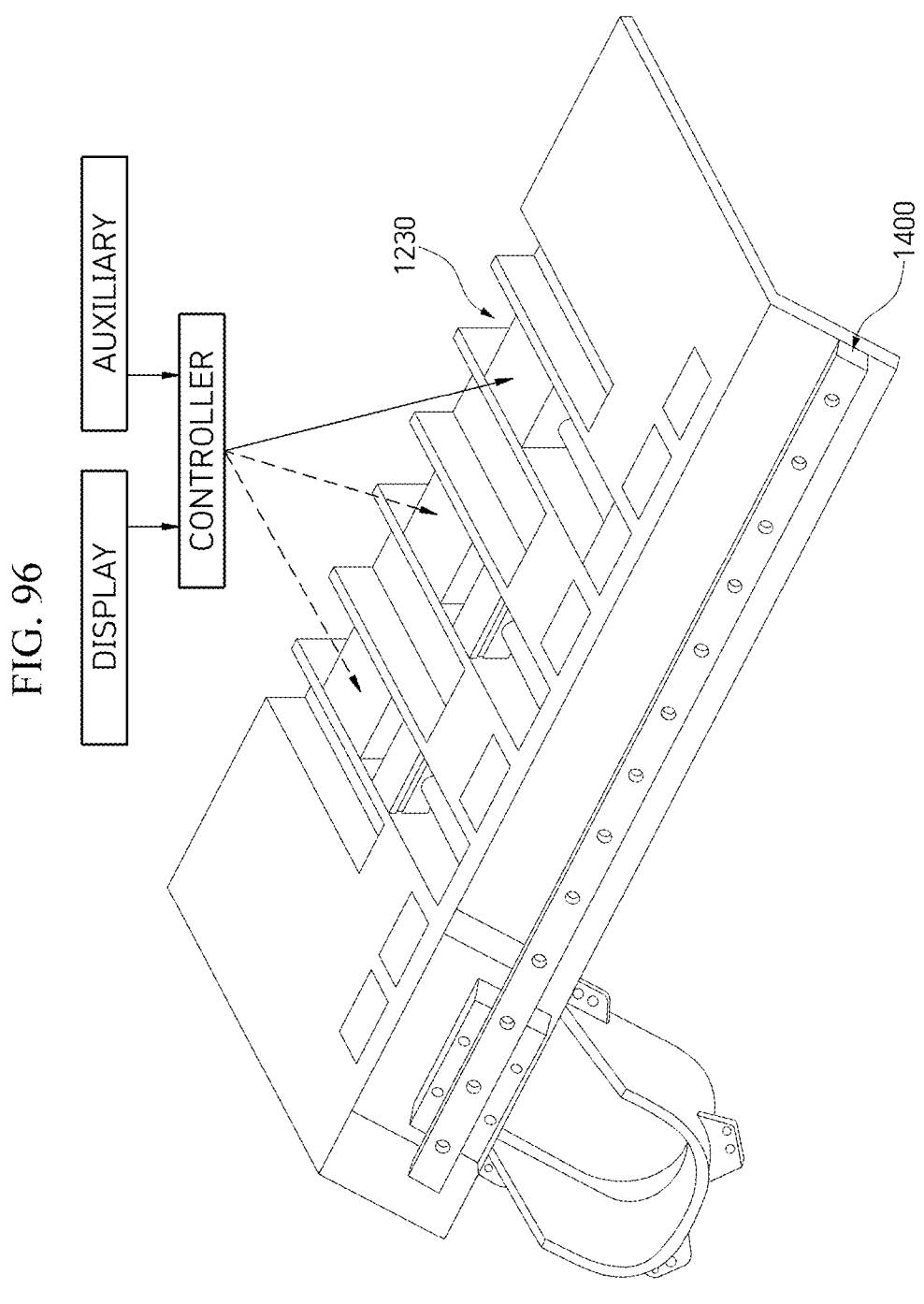
FIGS. 96 to 97 are views for explaining control of operation mechanism of the console operation device using actuators according to the embodiment of the present disclosure.
Figure 97:
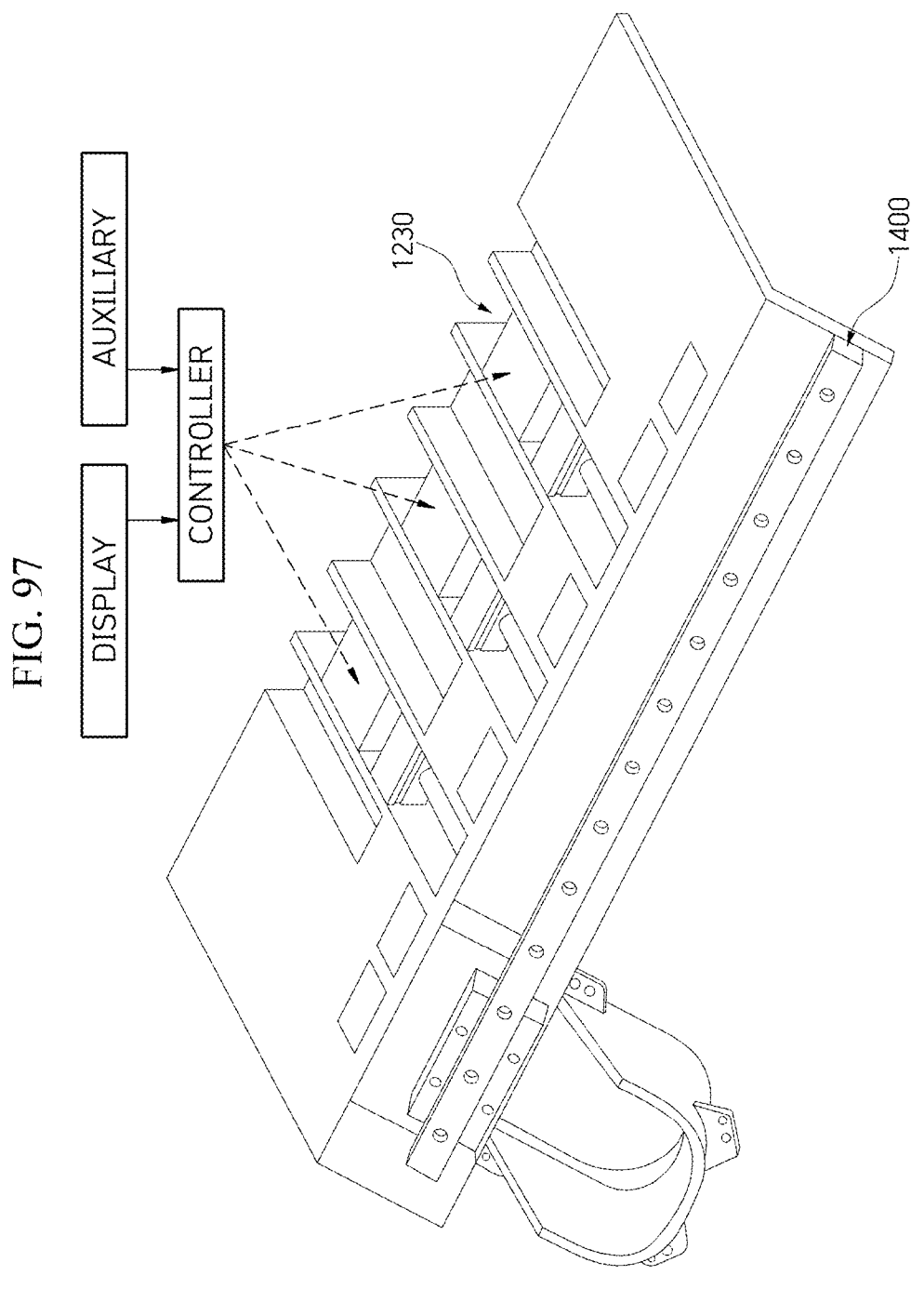

FIGS. 96 to 97 are views for explaining control of the operation mechanism of the console operation device using actuators according to the embodiment of the present disclosure.

FIGS. 96 and 97 are views illustrating that the operation mechanism 1500 is collectively used in ranges.

Referring to FIG. 96, when the display is controlled in the first area and the fourth to fifth area, the middle range is removed and only the outer range is used.

The console operation device may control the actuator (a) to move backward, the actuator (b) to move backward, and the actuator (c) to move forward. As a result, the operation mechanism 1500 may control the first and fourth areas of the large screen display and the fifth area of the auxiliary display.

Referring to FIG. 97, when the display is controlled in the first area and the fifth area, the middle range is removed and only the outer range is used.

The console operation device may control the actuator (a) to move backward, the actuator (b) to move backward, and the actuator (c) to move backward. As a result, the operation mechanism 1500 may control the first area of the large screen display and the fifth area of the auxiliary display.

FIG. 98 is a flowchart for explaining a basic operation method of the console operation device using actuators according to the embodiment of the present disclosure.

Referring to FIG. 98, the driver or passenger seat user may use the console operation device in its default state while driving (S2010).

After step S2010, when the proximity sensor 1560 recognizes the hand or the operation mechanism 1500 moves (S2020), the position recognition sensor may transmit the position information of the operation mechanism to the integrated controller (S2030).

After step S2030, the console operation device may transmit a signal from the integrated controller to the display (S2040).

After step S2040, the console operation device may transmit the flexible GUI to the display screen according to the position of the operation mechanism 1500 (S2050).

After step S2050, the console operation device may be linked to the display screen in response to the operation of the operation mechanism 1500 (S2060).

FIG. 99 is a flowchart for explaining a method of limiting and controlling the operation mechanism of the console operation device using actuators according to the embodiment of the present disclosure.

Referring to FIG. 99, the driver or passenger seat user may use the console operation device to select the specific UI while driving (S2110).

After step S2110, when the specific function expansion button is touched (S2120), the console operation device may determine whether it has been touched at a correct position (S2130).

After step S2130, when the touch is performed at the correct position (YES in S2130), the console operation device may transmit the signal received from the touch panel to the integrated controller (S2140).

After step S2140, the console operation device may transmit a signal from the controller that receives the signal to the corresponding actuator 1230 in conjunction with the flexible GUI (S2150).

After step S2150, the console operation device may control the rotary-type actuator 1230 and the straight-type actuator 1230 in response to the signal (S2160).

After step S2160, the console operation device may actuate the actuator 1230 to move the position of the magnet backward to delete the N/S range of a different polarity in the middle (S2170).

After step S2170, when the proximity sensor recognizes the hand and the operation mechanism 1500 moves (S2180), the console operation device may allow the user to intuitively use the operation mechanism 1500 in a fixed range (S2190).

A detailed description of the preferred embodiment of the present disclosure has been provided to enable any person skilled in the art to make or practice the disclosure. Although the present disclosure has been described with respect to the preferred embodiments, it will be understood by those skilled in the art that various modifications and variations can be made without departing from the spirit and scope of the disclosure. For example, each configuration described in the above embodiment may be used in combination with each other by those skilled in the art.

Accordingly, the present disclosure is not intended to be limited to the embodiment shown herein but is to be accorded the widest scope consistent with the principles and novel features disclosed herein.

Figure 100:
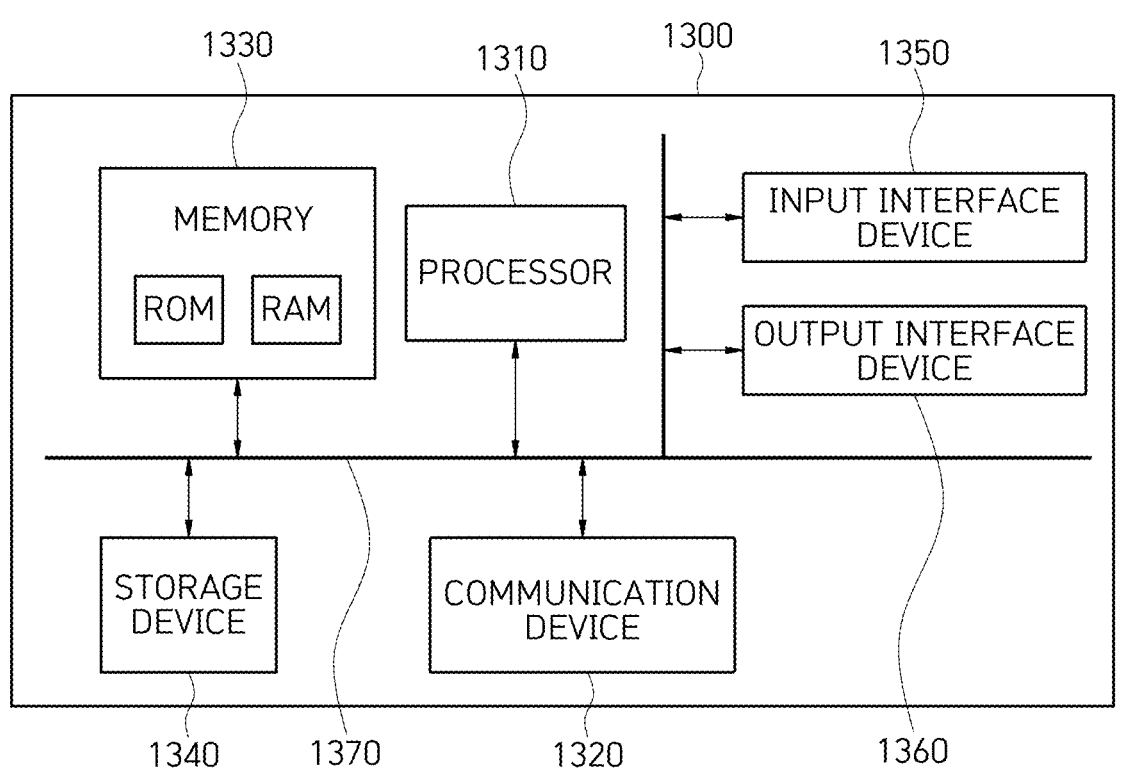
FIG. 100 is a block diagram illustrating a computer system for implementing the method according to the embodiment of the present disclosure.

FIG. 100 is a block diagram illustrating a computer system for implementing the method according to the embodiment of the present disclosure.

Referring to FIG. 100, the computer system, which is designated by reference numeral 1300, may include at least one of a processor 1313, a memory 1330, an input interface device 1350, an output interface device 1360, and a storage device 1340 that communicate with each other through a bus 1370. The computer system 1300 may also include a communication device 1320 coupled to a network. The processor 1310 may be a central processing unit (CPU) or a semiconductor device that executes instructions stored in the memory 1330 or the storage device 1340. The memory 1330 and the storage device 1340 may include various types of volatile or non-volatile storage media. For example, the memory may include a read only memory (ROM) and a random access memory (RAM). In the embodiment of the present disclosure, the memory may be located inside or outside the processor, and the memory may be connected to the processor through various known means. The memory may include various types of volatile or non-volatile storage media. For example, the memory may be a read only memory (ROM) or a random access memory (RAM).

Accordingly, the embodiment of the present disclosure may be embodied by a computer-implemented method or by a non-transitory computer-readable medium storing computer-executable instructions. In an embodiment, computer readable instructions may perform, when executed by a processor, a method according to at least one aspect of the present disclosure.

The communication device 1320 may transmit or receive a wired signal or a wireless signal.

In addition, the method according to the embodiment of the present disclosure may be implemented in the form of program instructions that can be executed through various computer means and recorded on a computer-readable medium.

The computer-readable medium may include program instructions, data files, data structures, etc., alone or in combination. The program instructions recorded on the computer-readable medium may be specially designed and configured for embodiments of the present disclosure, or may be known and usable by those skilled in the art of computer software. The computer-readable recording medium may include a hardware device configured to store and perform program instructions. For example, The computer-readable recording media may be a magnetic medium such as hard disk, floppy disk, or magnetic tape, an optical medium such as CD-ROM or DVD, a magneto-optical medium such as floptical disk, ROM, RAM, flash memory, etc. The program instruction may include not only machine language code such as that created by a compiler, but also high-level language code that can be executed by a computer through an interpreter or the like.

As is apparent from the above description, the present disclosure has an effect of varying knob operating ranges in the autonomous and manual driving modes of the vehicle and supporting intuitive control of a wide variety of vehicle functions.

The present disclosure is not limited to the above effect, and other effects of the present disclosure will be clearly understood by those skilled in the art from the above description.

Although the specific embodiments have been described with reference to the drawings, the present disclosure is not limited thereto. It will be apparent to those skilled in the art that various changes and modifications may be made without departing from the spirit and scope of the disclosure as defined in the following claims.

As is apparent from the above description, the present disclosure has an effect of ensuring convenience and driving safety for occupants by automatically adjusting the layout of the in-vehicle display, the steering wheel, and the seat for the vehicle driving mode.

The present disclosure is not limited to the above effect, and other effects of the present disclosure will be clearly understood by those skilled in the art from the above description.

What is claimed is:

1. A layout control system for a vehicle mode, the layout control system comprising:
   an input interface, including at least one of a front display or audio device, configured to receive information on a vehicle driving mode;

43 a memory configured to store a instructions for controlling a layout of at least one of an in-vehicle display, a steering wheel, or a seat for the vehicle driving mode; and a processor electrically connected to the memory, wherein, upon execution of the instructions, the processor is configured to control the layout in at least one of a manual driving mode, a passenger seat entertainment display attachment mode, an operation mode during autonomous driving, a theater mode, or a relax mode.

2. The layout control system according to claim 1, wherein, in response to the processor being configured to control the layout in the manual driving mode, the processor is further configured to:

transmit a command to cause the in-vehicle display to be in a backward state, the in-vehicle display being located in a first preset area, to cause the steering wheel to be in an out state where the steering wheel protrudes out of a cockpit; and control a position of the seat.

3. The layout control system according to claim 1, wherein, in response to the processor being configured to control the layout in the passenger seat entertainment display attachment mode, the processor is further configured to transmit a command to allocate a range for controlling an operation of a passenger seat entertainment display among operating ranges of a sliding knob.

4. The layout control system according to claim 1, wherein, in response to the processor being configured to control the layout in the operation mode during autonomous driving, the processor is further configured to:

transmit a command to cause the in-vehicle display to be in a forward state where the in-vehicle display is located in a second preset area; and cause the steering wheel to be in an in state where the steering wheel is positioned in a cockpit.

5. The layout control system according to claim 1, wherein, in response to the processor being configured to control the layout in the theater mode, the processor is further configured to:

transmit a command to cause the in-vehicle display to be in a backward state where the in-vehicle display is located in a first preset area;

cause the steering wheel to be in an in state where the steering wheel is stored in a cockpit; and control a position of the seat such that the distance between the seat and the in-vehicle display comprises a preset distance.

6. The layout control system according to claim 1, wherein, in response to the processor being configured to control the layout in the relax mode, the processor is further configured to:

transmit a command to cause the in-vehicle display to be in a backward state where the in-vehicle display is located in a first preset area;

cause the steering wheel to be in an in state where the steering wheel is positioned in a cockpit;

cause the distance between the seat and the in-vehicle display to be a preset distance; and control a backrest of the seat at a preset angle.

7. The layout control system according to claim 1, wherein the processor is further configured to:

automatically convert the vehicle driving mode based on driving situation monitoring information; and

44 transmit a command to control the layout of the in-vehicle display, the steering wheel, and the seat in response to the converted vehicle driving mode.

8. A method for a layout control system for a vehicle mode, the method comprising:

receiving information on a vehicle driving mode;

storing a instructions in memory for controlling a layout of at least one of an in-vehicle display, a steering wheel, or a seat for the vehicle driving mode; and upon execution of the instructions, controlling the layout in at least one of a manual driving mode, a passenger seat entertainment display attachment mode, an operation mode during autonomous driving, a theater mode, or a relax mode.

9. The method according to claim 7, wherein, in response to the controlling of the layout in the manual driving mode, the method further comprises:

transmitting a command to cause the in-vehicle display to be in a backward state, the in-vehicle display being located in a first preset area, to cause the steering wheel to be in an out state where the steering wheel protrudes out of a cockpit; and controlling a position of the seat.

10. The method according to claim 7, wherein, in response to the controlling of the layout in the passenger seat entertainment display attachment mode, the method further comprises:

transmitting a command to allocate a range for controlling an operation of a passenger seat entertainment display among operating ranges of a sliding knob.

11. The method according to claim 7, wherein, in response to the controlling of the layout in the operation mode during autonomous driving, the method further comprises:

transmitting a command to cause the in-vehicle display to be in a forward state where the in-vehicle display is located in a second preset area; and causing the steering wheel to be in an in state where the steering wheel is positioned in a cockpit.

12. The method according to claim 7, wherein, in response to the controlling of the layout in the theater mode, the method further comprises:

transmitting a command to cause the in-vehicle display to be in a backward state where the in-vehicle display is located in a first preset area;

causing the steering wheel to be in an in state where the steering wheel is stored in a cockpit; and controlling a position of the seat such that the distance between the seat and the in-vehicle display comprises a preset distance.

13. The method according to claim 7, wherein, in response to the controlling of the layout in the relax mode, the method further comprises:

transmitting a command to cause the in-vehicle display to be in a backward state where the in-vehicle display is located in a first preset area;

causing the steering wheel to be in an in state where the steering wheel is positioned in a cockpit;

causing the distance between the seat and the in-vehicle display to be a preset distance; and controlling a backrest of the seat at a preset angle.

14. The method according to claim 7, wherein the method further comprises:

automatically converting the vehicle driving mode based on driving situation monitoring information; and transmitting a command to control the layout of the in-vehicle display, the steering wheel, and the seat in response to the converted vehicle driving mode.

\* \* \* \* \*